US012013476B2

(12) United States Patent
Sanji et al.

(10) Patent No.: US 12,013,476 B2
(45) Date of Patent: Jun. 18, 2024

(54) POSITIONING SYSTEM

(71) Applicant: DENSO CORPORATION, Kariya (JP)

(72) Inventors: Kenichirou Sanji, Nisshin (JP);
Nobuyasu Okabe, Kariya (JP);
Masakazu Ikeda, Nisshin (JP); Yuuji Kakuya, Nisshin (JP)

(73) Assignee: DENSO CORPORATION, Kariya (JP)

( * ) Notice: Subject to any disclaimer, the term of this patent is extended or adjusted under 35 U.S.C. 154(b) by 428 days.

(21) Appl. No.: 17/508,168

(22) Filed: Oct. 22, 2021

(65) Prior Publication Data

US 2022/0043101 A1 Feb. 10, 2022

Related U.S. Application Data

(63) Continuation of application No. PCT/JP2020/010097, filed on Mar. 9, 2020.

(30) Foreign Application Priority Data

Apr. 26, 2019 (JP) ................. 2019-085382

(51) Int. Cl.
*G01S 5/02* (2010.01)
*B60R 25/01* (2013.01)
(Continued)

(52) U.S. Cl.
CPC ............ *G01S 5/0284* (2013.01); *G01S 5/012* (2020.05); *H01Q 1/3241* (2013.01);
(Continued)

(58) Field of Classification Search
CPC .... H01Q 1/3241; H01Q 9/0421; H01Q 21/24; G01S 5/012; G01S 5/0284
See application file for complete search history.

(56) References Cited

U.S. PATENT DOCUMENTS 5,767,807 A   6/1998 Pritchett
10,411,337 B2  9/2019 Ikeda et al.
(Continued)

FOREIGN PATENT DOCUMENTS

JP   2000151254 A   5/2000
JP   2001244721 A   9/2001
(Continued)

OTHER PUBLICATIONS

U.S. Appl. No. 17/508,107, filed Oct. 2021, Sanji et al.
U.S. Appl. No. 17/508,107, filed Oct. 22, 2021, Sanji et al.

*Primary Examiner* — Bernarr E Gregory
*Assistant Examiner* — Fred H Mull
(74) *Attorney, Agent, or Firm* — Harness, Dickey & Pierce, P.L.C.

(57) ABSTRACT

A positioning system executes wireless communication with a portable terminal by adopting a radio wave of 1 GHz or higher to determine a position of the portable terminal relative to a vehicle. The positioning system includes a vehicle exterior communication device and a positioning device. The positioning device determines whether the portable terminal exists at an exterior operating area being a region outside a vehicle compartment within a predetermined operating distance from the vehicle, based on a reception status of the wireless signal received by the vehicle exterior communication device from the portable terminal in a first mode of the vehicle exterior communication device, and determines whether the portable terminal exists inside the vehicle compartment, based on the reception status of the wireless signal received by the vehicle exterior communication device from the portable terminal in a second mode of the vehicle exterior communication device.

13 Claims, 24 Drawing Sheets

(51) Int. Cl.
  *B60R 25/24* (2013.01)
  *G01S 5/00* (2006.01)
  *H01Q 1/32* (2006.01)
  *H01Q 9/04* (2006.01)

(52) U.S. Cl.
  CPC ............ *H01Q 9/0421* (2013.01); *B60R 25/01* (2013.01); *B60R 25/245* (2013.01)

(56) References Cited

U.S. PATENT DOCUMENTS

| | | |
|---|---|---|
| 10,727,589 B2 | 7/2020 | Ikeda et al. |
| 10,879,611 B2 | 12/2020 | Sugimoto et al. |
| 2003/0184492 A1 | 10/2003 | Chiang et al. |
| 2004/0046694 A1 | 3/2004 | Chiang et al. |
| 2005/0024286 A1 | 2/2005 | Fukuda |
| 2005/0052332 A1 | 3/2005 | Chiang et al. |
| 2005/0156797 A1 | 7/2005 | Chiang et al. |
| 2007/0152892 A1 | 7/2007 | Chiang et al. |
| 2007/0182657 A1 | 8/2007 | Chiang et al. |
| 2008/0048917 A1 | 2/2008 | Achour et al. |
| 2008/0258981 A1 | 10/2008 | Achour et al. |
| 2010/0238081 A1 | 9/2010 | Achour et al. |
| 2010/0283692 A1 | 11/2010 | Achour et al. |
| 2010/0283705 A1 | 11/2010 | Achour et al. |
| 2011/0039501 A1 | 2/2011 | Achour et al. |
| 2013/0002377 A1 | 1/2013 | Toyao et al. |
| 2015/0214630 A1 | 7/2015 | Shimura |
| 2016/0150356 A1 | 5/2016 | Matsushita et al. |
| 2017/0149137 A1 | 5/2017 | Ikeda et al. |
| 2017/0288299 A1 | 10/2017 | Ikeda et al. |
| 2018/0316445 A1 | 11/2018 | Hamada et al. |
| 2019/0375372 A1 | 12/2019 | Sanji et al. |
| 2020/0233072 A1 | 7/2020 | Osai et al. |
| 2021/0184356 A1 | 6/2021 | Ikeda et al. |

FOREIGN PATENT DOCUMENTS

| | | | |
|---|---|---|---|
| JP | 3294155 | B2 | 6/2002 |
| JP | 2003078327 | A | 3/2003 |
| JP | 2003243927 | A | 8/2003 |
| JP | 2003347838 | A | 12/2003 |
| JP | 2004201023 | A | 7/2004 |
| JP | 2005020301 | A | 1/2005 |
| JP | 2005509345 | A | 4/2005 |
| JP | 2005521289 | A | 7/2005 |
| JP | 2008061080 | A | 3/2008 |
| JP | 4337457 | B2 | 9/2009 |
| JP | 2010133099 | A | 6/2010 |
| JP | 2010233124 | A | 10/2010 |
| JP | 4649054 | B2 | 3/2011 |
| JP | 4723415 | B2 | 7/2011 |
| JP | 2011259273 | A | 12/2011 |
| JP | 2012010064 | A | 1/2012 |
| JP | 2013192073 | A | 9/2013 |
| JP | 2013239956 | A | 11/2013 |
| JP | 2014003670 | A | 1/2014 |
| JP | 5438048 | B2 | 3/2014 |
| JP | 5449231 | B2 | 3/2014 |
| JP | 2015021245 | A | 2/2015 |
| JP | 2015023346 | A | 2/2015 |
| JP | 2015026988 | A | 2/2015 |
| JP | 2015030381 | A | 2/2015 |
| JP | 2015052223 | A | 3/2015 |
| JP | 2015059396 | A | 3/2015 |
| JP | 2015059397 | A | 3/2015 |
| JP | 2015142367 | A | 8/2015 |
| JP | 2015145578 | A | 8/2015 |
| JP | 2016015688 | A | 1/2016 |
| JP | 2016094801 | A | 5/2016 |
| JP | 2016181755 | A | 10/2016 |
| JP | 2017005663 | A | 1/2017 |
| JP | 2017079430 | A | 4/2017 |
| JP | 2017152878 | A | 8/2017 |
| JP | 6313114 | B2 | 4/2018 |
| JP | 6393426 | B2 | 9/2018 |
| JP | 2019062372 | A | 4/2019 |
| JP | 2019062373 | A | 4/2019 |
| JP | 2019158765 | A | 9/2019 |
| JP | 2020010135 | A | 1/2020 |
| WO | WO-2011114746 | A1 | 9/2011 |
| WO | WO-2014171081 | A1 | 10/2014 |
| WO | WO-2015049816 | A1 | 4/2015 |
| WO | WO-2015159505 | A1 | 10/2015 |
| WO | WO-2016056190 | A1 | 4/2016 |
| WO | WO-2019146467 | A1 | 8/2019 |
| WO | WO-2020121808 | A1 | 6/2020 |

POSITIONING SYSTEM

CROSS REFERENCE TO RELATED APPLICATIONS

The present application is a continuation application of International Patent Application No. PCT/JP2020/010097 filed on Mar. 9, 2020, which designated the U.S. and claims the benefit of priority from Japanese Patent Application No. 2019-085382 filed on Apr. 26, 2019. The entire disclosures of all of the above applications are incorporated herein by reference.

TECHNICAL FIELD

The present disclosure relates to a positioning system.

BACKGROUND

There has been known a positioning system that estimates a relative position of a portable terminal in relation to a vehicle, based on a wireless signal with a radio wave from the portable terminal carried by a user.

SUMMARY

The present disclosure describes a positioning system including a vehicle exterior communication device and a positioning device.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
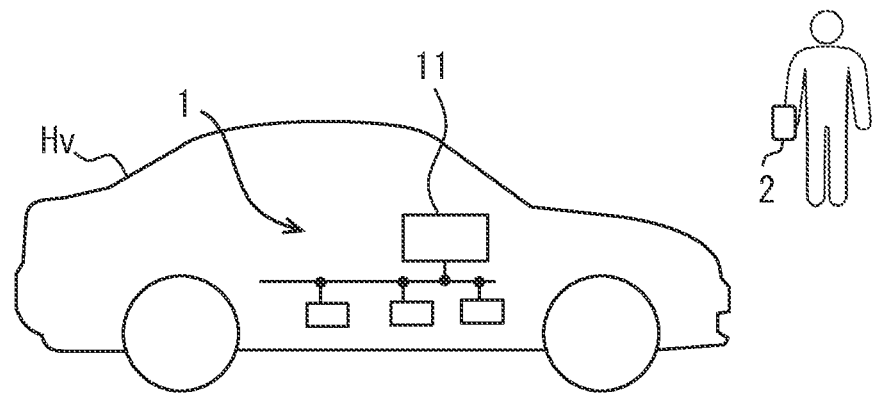
FIG. 1 illustrates a schematic configuration of a vehicle electronic key system.

In a first comparative example, a positioning system may transmit a response request signal with a radio in an LF (Low Frequency) band from a vehicle to a portable terminal and determining whether or not the portable terminal exists in the vicinity of the vehicle outside the compartment (hereinafter referred to an exterior operating area) based on the reception of a response signal corresponding to the response request signal.

The exterior operating area corresponds to an area that allows automatic unlocking of a door through the wireless communication executed by the portable terminal. The exterior operating area is generally set within 1 meter or 0.7 meter from the vehicle. The reason why a radio wave in the LF band is adopted for signal transmission to a portable device from a vehicle is because of limiting the arrival range of the wireless signal to the vicinity of the vehicle. The antenna for transmitting the radio wave in the LF band in the vehicle is adjusted in, for example, transmission power to allow the wireless signal reach only in the exterior operating area.

Such a positioning system is adopted in a vehicular electronic key system for a predetermined vehicular control according to the position of the portable terminal. The vehicular electronic key system is a passive entry passive start (PEPS) system that executes predetermined vehicle control according to the position of the portable terminal.

Portable information processing terminals such as smartphones or wearable terminals may be functioned as vehicle keys. Along with this situation, there is a demand for a configuration that can determine the position of a portable terminal relative to a vehicle by adopting the reception strength of the high frequency radio wave used for a short-range communication such as Bluetooth. Smartphones generally do not have a function of transmitting or receiving a radio wave in the LF band. However, the smartphones usually have a function of short-range communication such as Bluetooth (Trademark) or Wi-Fi (Trademark) as standard equipment.

In a second comparative example, an in-vehicle device provided. The in-vehicle device executes wireless communication according to Bluetooth (Trademark) standard with the portable terminal carried by a user of a vehicle to estimate the position of the portable terminal relative to the vehicle. The following describes specific examples. The in-vehicle device according to the second comparative example periodically transmits a request signal from a communication device (hereinafter referred to as an in-vehicle communication device) to the portable terminal for requesting the portable terminal to return the response signal. The in-vehicle communication device is disposed at the floor surface inside a vehicle compartment such as a location around a foot position of a driver seat. The portable terminal returns a response signal including an RSSI (Received Signal Strength Indication) of a request signal when receiving the request signal requesting a return of the response signal from the in-vehicle communication device. The in-vehicle device stores, in the memory, the RSSI included in the response signal returned from the portable terminal. The in-vehicle device determines that the portable terminal is present in a vehicle compartment when an average value of the RSSIs for last five times stored in a memory exceeds a predetermined threshold. On the other hand, when the average value of the RSSIs for the last five times is equal to or less than the threshold, the in-vehicle device determines that the vehicle is present outside the vehicle compartment.

Hereinafter, a communication based on a predetermined wireless communication standard having a communication range of, for example, about several tens of meters, such as Bluetooth, will be referred to as a short-range communication. A radio wave with 1 GHz or higher (such as 2.4 GHz) may be adopted for the short-range communication. Hereinafter, the radio wave is referred to as a high-frequency radio wave. Such a high-frequency radio wave has a stronger straightness than radio wave in the LF band and is easily reflected at a metal body such as a vehicle body.

In the configuration related to the above determination, the communication area of the in-vehicle device according to the second comparative example is limited within 1 meter from the vehicle by adjusting the output of the antenna for a near field communication disposed inside the vehicle compartment. However, the high-frequency radio wave adopted in the short-range communication such as Bluetooth has stronger straightness as compared with the radio wave in the LF band, and is easily reflected at a metal plate such as a vehicle body. Therefore, it may be practically difficult for setting the communication area outside the vehicle compartment to 1 meter while maintaining the signal strength over the entire region inside the vehicle compartment at a high level. In other words, the configuration in the second comparative example cannot determine whether the portable terminal exists at the exterior operating area or the prohibiting area.

As one of solutions, it has been considered that whether the portable terminal is present at the exterior operating area outside the vehicle compartment or the prohibiting area by adopting the reception strength of the signal received by the portable terminal sent from the vehicle, as similar to the determination of whether or not the portable terminal being inside the vehicle compartment. However, a structure such as the body of a vehicle does not exist between the exterior operating area outside the vehicle compartment and the prohibiting area. The radio wave from the antenna disposed inside the vehicle compartment continuously attenuates from the exterior operating area towards the prohibiting area. In addition, for the antenna inside the vehicle compartment, the rear side of the door module, in other words, the lower side of the exterior operating area is out of sight, so that the reception intensity of the portable terminal is at a low level. Therefore, there may be no meaningful difference in the strength of the signal sent from the antenna inside the vehicle compartment between the exterior operating area and the prohibiting area.

It may be practically difficult to determine whether the portable terminal exists in the exterior operating area or the prohibiting area outside the vehicle compartment the based on the reception strength of the signal received by the portable terminal from the communication device disposed in the vehicle compartment. Even though the portable terminal exists at the exterior operating area, the portable terminal may be erroneously determined to be present at the prohibiting area. Since the door will not be unlocked if the portable terminal is erroneously determined to be present at the prohibiting area, it may impair the convenience for the user.

In order to enhance the convenience for the user to utilize the vehicle, it is required to detect the presence at least in the exterior operating area with higher precision. In order to ensure the security of the vehicle, it is necessary to reduce the possibility of erroneously determining that the portable terminal exists in the exterior operating area even though the portable terminal exists in the prohibiting area. In order to enhance the accuracy of determining the presence in the exterior operating area, it may be preferable that an antenna is installed at the outer surface of the vehicle so that the exterior operating area is evenly set as a strong electric field area and the electric field level is weaker in the area farther away from the vehicle.

Based on the above thought, the inventors in the present application conducted a variety of tests, and found out that if the dipole antenna is installed in a posture perpendicular to the side surface of the vehicle, it is possible to set the strong electrical field area evenly at the exterior operating area while suppressing the electrical field strength at the prohibiting area to a sufficiently low level. According to the mode in which the dipole antenna is installed in the above posture, it is considered that the electrical field whose electrical field starting direction is perpendicular to the side surface portion in a direction parallel to the side surface portion of the vehicle. Radio waves whose electrical field vibration direction is perpendicular to the metal surface propagate along the metal plate. Therefore, it is possible to set the strong electrical field area evenly at the exterior operating area.

Since the radio waves whose electrical field vibration direction is perpendicular to the metal surface, it is possible to set the strong electrical field area not only at the exterior operating area but also inside the vehicle compartment. In the configuration where the dipole antenna is installed in a posture perpendicular to the side surface portion of the vehicle, it may be difficult to determine whether the portable terminal is inside the vehicle compartment or the exterior operating area since the meaningful difference between the exterior operating area and the vehicle compartment is not easily generated.

A positioning system for a vehicle according to an aspect of the present disclosure executes wireless communication with a portable terminal carried by a user of the vehicle by adopting a radio wave of 1 GHz or higher to determine a position of the portable terminal relative to the vehicle. The positioning system includes a vehicle exterior communication device and a positioning device. The vehicle exterior communication device is disposed at an outer surface portion of the vehicle being at least one of a side surface portion or a rear side surface portion of the vehicle, and includes an antenna receiving a wireless signal transmitted from the portable terminal. The positioning device determines the position of the portable terminal, based on a reception status of the wireless signal received by the vehicle exterior communication device from the portable terminal. The vehicle exterior communication device includes an operation mode having a first mode and a second mode. In the first mode of the operation mode, a linearly polarized wave whose electrical field vibration direction is perpendicular to the outer surface portion is radiated toward a direction parallel to the outer surface portion at which the vehicle exterior communication device is attached. In the second mode of the operation mode, a linearly polarized wave whose electrical field vibration direction is parallel to the outer surface portion is radiated. The positioning device determines whether the portable terminal exists at an exterior operating area being a region outside a vehicle compartment within a predetermined operating distance from the vehicle, based on the reception status of the wireless signal received by the vehicle exterior communication device from the portable terminal in the first mode of the operation mode. The positioning device determines whether the portable terminal exists inside the vehicle compartment, based on the reception status of the wireless signal received by the vehicle exterior communication device from the portable terminal in the second mode of the operation mode.

The linearly polarized wave whose electrical field vibration direction is perpendicular to the metal surface is likely to propagate along the metal. Therefore, when the vehicle exterior communication device operates in the first mode, it is possible to set the strong electrical field area evenly in the vicinity of the vehicle outside the vehicle compartment. Therefore, it is possible to enhance the detection rate of the portable terminal being present at the exterior operating area for determining whether the portable terminal is present at the exterior area, by adopting the reception status of the wireless signal from the portable terminal when the vehicle exterior communication device operates in the first mode.

The linearly polarized waves to be transmitted or received by the vehicle exterior communication device at the first mode are easily transmitted through the metal made for the side surface portion of the vehicle and then enter the vehicle compartment. Therefore, the strong electrical field area can also be formed inside the vehicle compartment at the first mode. Since the propagation path of the wireless signal is reversible, it means that the vehicle exterior device is likely to receive the signal from the portable terminal existing inside the vehicle compartment when the vehicle exterior communication device operates in the first mode.

The linearly waves transmitted from or received from the vehicle exterior communication device in the second mode are unlikely to wrap around inside the vehicle compartment. The linearly polarized waves whose electrical field vibration direction parallel to the metal provided for the outer surface portion of the vehicle are likely to be repelled by the metal. As a result, the electrical field level inside the vehicle compartment at the second mode is to be at a low level. Since the propagation path of the wireless signal is reversible, it means that the vehicle exterior device is unlikely to receive the signal from the portable terminal existing inside the vehicle compartment when the vehicle exterior communication device operates in the second mode.

Therefore, it is possible to enhance the detection rate of the portable terminal being present inside the vehicle compartment for determining whether the portable terminal is present inside the vehicle compartment, by adopting the reception status of the wireless signal from the portable terminal when the vehicle exterior communication device operates in the second mode. According to the above configuration, it is possible to reduce erroneous determination of the portable terminal being present at the exterior operating area even though the portable terminal is present inside the vehicle compartment while enhancing the detection rate such that the portable terminal exists in the exterior operating area.

The following will describe an embodiment of a position determination system according to the present disclosure with reference to the drawings. FIG. 1 is a diagram showing an example of a schematic configuration of a vehicle electronic key system to which the position determination system according to the present disclosure is applied. As shown in FIG. 1, the vehicle electronic key system includes an in-vehicle system 1 equipped to a vehicle Hv and a portable terminal 2 which is a communication terminal carried by a user of the vehicle Hv.

(Entire Outline)

The in-vehicle system 1 executes predetermined vehicle control according to the position of the portable terminal 2 by executing wireless communication using a radio wave in a predetermined frequency band. For example, the in-vehicle system 1 locks and opens the door, based on a condition that the portable terminal 2 exists in the exterior operating area Rx that is preset for the vehicle Hv.

The exterior operating area Rx corresponds to an area outside the vehicle compartment that allows the execution of the vehicle control through the in-vehicle system 1. The exterior operating area Rx as an example in the present disclosure is set to an area that allows the execution of the vehicle control such as locking and unlocking of the door through the in-vehicle system 1. The exterior operating area Rx is limited to a region in the vicinity of the vehicle Hv. As an example of the present embodiment, the region outside the vehicle compartment within a predetermined distance (for example, 0.7 meter) from the door handle for the driver seat and the door handle for the driver's assistant seat is set as the exterior operating area Rx. The exterior operating distance defining the magnitude of the operating area Rx may be 1 meter, or may also be 1.5 meter. The operating distance may be set to be shorter than a prohibiting distance (for example, 2 meters) defining as the magnitude of a prohibiting area described hereinafter. The outer door handle indicates a gripping member provided on the outer side surface of the door for opening and closing the door. The outer door handle may be a door handle stored in the door panel such as a flush handle or a pop-up handle.

Each of the in-vehicle system 1 and the portable terminal 2 in the present embodiment is configured to be capable of performing a communication (hereinafter, referred to as short range communication) with one another based on a predetermined short range wireless communication standard which has a communication range of, for example, about ten meters. In this example, as the short-range wireless communication standard, for example, Bluetooth Low Energy (Bluetooth is a registered trademark, Wi-Fi (registered trademark), ZigBee (registered trademark), or the like can be adopted. The short-range wireless communication standard may be any one that can provide a communication distance of, for example, several meters to several tens of meters. As an example, the in-vehicle system 1 and the portable terminal 2 in the present embodiment are configured to perform the wireless communication based on the Bluetooth Low Energy standard.

The portable terminal 2 is correlated with the in-vehicle system 1, and functions as an electronic key of the vehicle Hv. The portable terminal 2 is a communication device that can be carried by a user and has the short range communication function described above. For example, a smartphone can be used as the portable terminal 2. As another example, the portable terminal 2 may be a tablet terminal, a wearable device, a portable music player, a portable game device, or the like. The signal transmitted from the portable terminal 2 based on the short range communication includes transmission source information. The transmission source information is, for example, predetermined identification information (hereinafter, referred to as a terminal ID) preliminarily assigned to the portable terminal 2. The terminal ID functions as identification information of the portable terminal 2 from another communication terminal.

The portable terminal 2 wirelessly transmits a communication packet including transmission source information at a predetermined transmission interval, thereby notifying, to a surrounding communication terminal having the short range communication function, of a presence of the portable terminal 2 itself (that is, advertising). In the following description, for convenience, the communication packets periodically transmitted for advice are referred to as advertisement packets.

The in-vehicle system 1 receives a signal (for example, an advertisement packet) transmitted from the portable terminal 2 by the short-range communication function described above, thereby detecting that the portable terminal 2 is present within a range in which the in-vehicle system 1 can execute a short-range communication. In the following description, a range in which the in-vehicle system 1 can mutually communicate data with the portable terminal 2 based on the short range communication function is also referred to as a communication area.

In the present embodiment, as an example, the in-vehicle system 1 is configured to detect the presence of the portable terminal 2 in the communication area by receiving the advertisement packets sequentially transmitted from the portable terminal 2, but the present disclosure is not limited to the above configuration. As another example, the in-vehicle system 1 may be configured to sequentially transmit the advertisement packet and detect the presence of the portable terminal 2 in the communication area based on an establishment of a communication connection (so-called connection) with the portable terminal 2.

(Configuration of Vehicle Hv)

Figure 2:
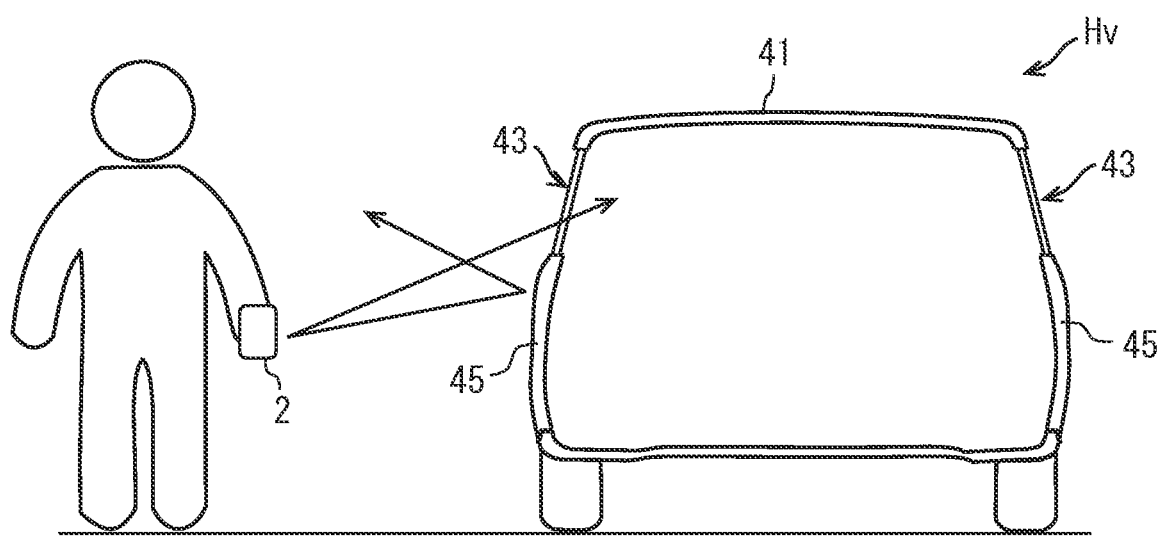
FIG. 2 illustrates a configuration of a vehicle.

First, the configuration of the vehicle Hv will be described with reference to FIG. 2. For example, the vehicle Hv is a passenger car having a passenger capacity of five. As an example, the vehicle Hv includes a front seat and a rear seat, and a driver's seat (in other words, a steering wheel) is provided on the left side. For example, the vehicle Hv may be a vehicle provided with the driver's seat on the right side. The vehicle Hv may be a vehicle without a rear seat. The vehicle Hv may be a motor truck such as a truck. The vehicle Hv may be a taxi or a camping vehicle. In addition, the vehicle Hv may be a vehicle provided for a vehicle rental service (so-called rental vehicle) or a vehicle provided for a car-sharing service (so-called shared vehicle). The share car also includes a vehicle used for a service of lending a personally owned vehicle to another person during a time period when the administrator of the vehicle is not using the vehicle. In the case where the vehicle Hv is a vehicle provided with the above service (hereinafter, referred to as a service vehicle), a person who is contracting to use the service may be a user. In other words, a person who has the right to use the vehicle Hv can be a user.

The body of the vehicle includes metal members. The body described in this specification includes a frame providing a body main portion such as a B pillar, and also includes a body panel. The body panels include side body panels, a roof panel, a rear end panel, an engine hood panel, door panels, and the like. However, as an example in the present disclosure, it is assume that a portion of the door panel that overlaps the B pillars 42B or a portion of the door panel that functions as the window frame portion is made of resin.

Since the metal plate has a property of reflecting radio waves, the body of the vehicle Hv reflects radio waves used. In other words, the vehicle Hv includes the body that blocks the linear propagation of the radio waves. In this example, the radio wave refers to a radio wave in a frequency band used for a wireless communication between the in-vehicle system 1 and the portable terminal 2. Hereinafter, the radio wave is referred to as a radio wave used for a system. The radio wave adopted by the system here refers to a radio wave in the 2.4 GHz band. The blocking referred to in the present specification is ideally reflection, but is not limited to the reflection. A configuration capable of attenuating the radio wave to a predetermined level (hereinafter, referred to as target attenuation level) or more corresponds to a configuration for blocking propagation of the radio wave. The target attenuation level may be a value at which a significant difference occurs between the signal strength of the radio wave inside the vehicle compartment and the signal strength of the radio wave outside the vehicle compartment. For example, the target attenuation level is set to 10 db. Alternatively, the target attenuation level may be set equal to or higher than 5 dB (for example, 10 dB or 20 dB).

The vehicle Hv has a roof portion 41 provided by the roof panel, and includes multiple pillars 42 for supporting the roof panel. The vehicle Hv includes A pillars 42A, B pillars 42B, and C pillars 42C as pillars 42. The A pillars 42A are pillars provided in front of the front seats. The B pillars 42B are pillars 42 provided between the front seats and the rear seats. The C pillars 42C are pillars 42 provided diagonally behind the rear seats. Part or all of each pillar 42 is formed of a metal member such as a high tensile strength steel plate. As another mode, the pillar 42 may be made of carbon fiber or resin. In addition, the pillar may be made of the combination of various materials.

The vehicle Hv as a whole is configured such that, when all the doors are closed, the radio wave used in the system enters the vehicle compartment from the vehicle exterior only through the windows 43, or leaks from the vehicle compartment to the vehicle exterior. In other words, the windows 43 are configured to act as paths for the radio wave used in the system. In this example, the windows 43 are a front window, windows provided on side surfaces of the vehicle Hv (so-called side windows), a rear window, or the like.

As another mode, window glasses provided on doors of the vehicle Hv or the like may also be configured to block the linear propagation of the radio wave used in the system. In this example, the window glasses are transparent members disposed in the windows 43 provided in the vehicle Hv, and a material of the window glasses do not have to be strictly glass. For example, the window glasses may be made of an acrylic resin or the like. In other words, the window glasses in this example are transparent members which function as a windshield.

(Configuration of In-Vehicle System 1)

Figure 3:
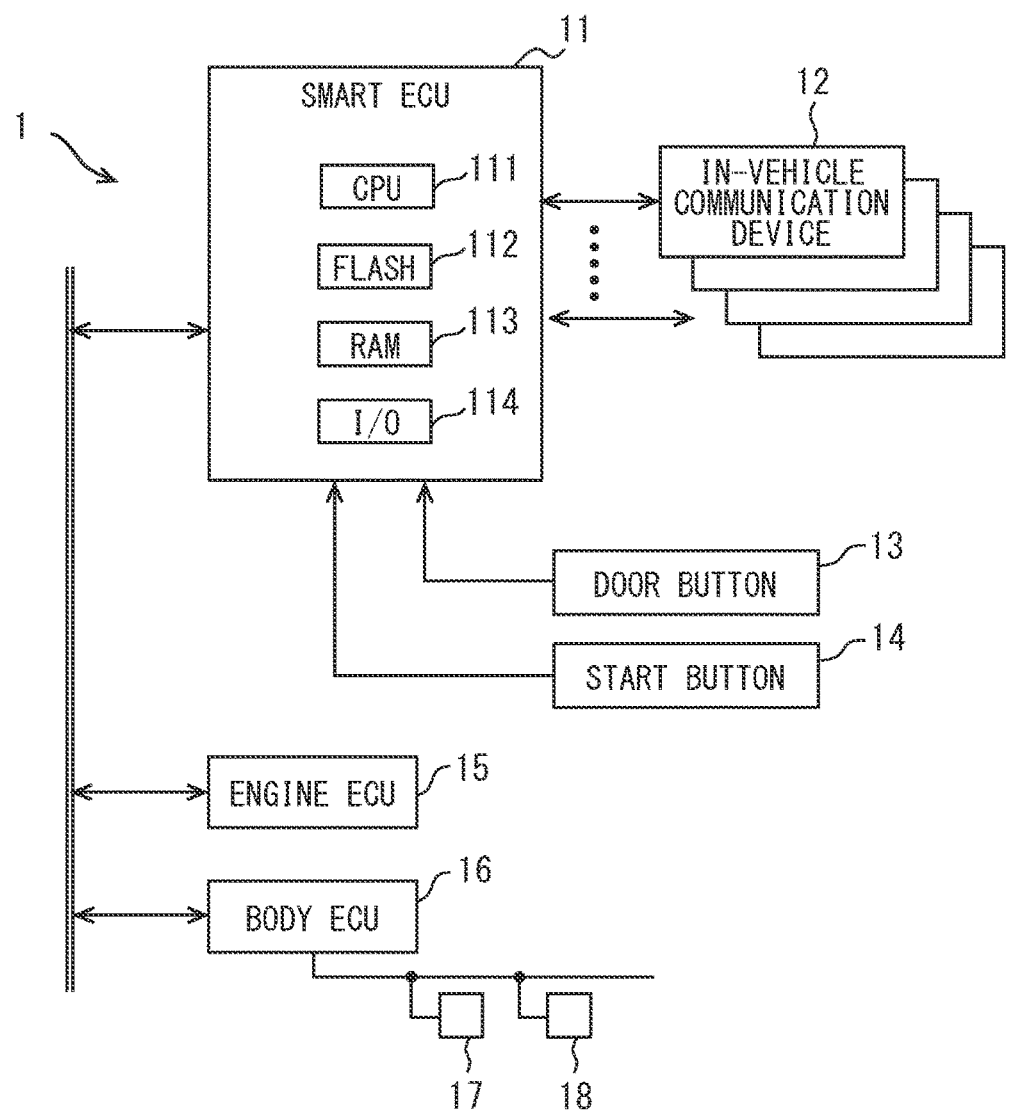
FIG. 3 is a block diagram showing a schematic configuration of an in-vehicle system.

The following will describe a configuration and an operation of the in-vehicle system 1. As shown in FIG. 3, the in-vehicle system 1 includes a smart ECU 11, in-vehicle communication devices 12, a door button 13, a start button 14, an engine ECU 15, and a body ECU 16. The ECUs in the member names are abbreviations of Electronic Control Unit and mean electronic control units.

The smart ECU 11 is an electronic control unit (ECU) that executes wireless communication with the portable terminal 2 to execute vehicular control for locking and unlocking the door, starting engine or the like. The smart ECU 11 is realized by use of a computer. In other words, the smart ECU 11 includes, for example, a CPU 111, a flash memory 112, a RAM 113, an I/O 114, and a bus line for connecting those components. The CPU 111 is an arithmetic processing unit that executes various calculation processing. The flash memory 112 is a rewritable nonvolatile storage medium. The RAM 113 is a volatile storage medium. The I/O 114 is a circuit module that functions as an interface for the smart ECU 11 to communicate with other devices mounted on the vehicle Hv, such as the in-vehicle communication device 12. The I/O 114 may be implemented by use of an analogue circuit element, an IC, or the like.

A terminal ID assigned to the portable terminal 2 owned by the user is registered in the flash memory 112. The flash memory 112 further stores a program (hereinafter, referred to as a position determination program) for controlling a general purpose computer to function as the smart ECU 11. It should be noted that the position determination program described above may be stored in a non-transitory tangible storage medium. The execution of the position determination program by the CPU 111 corresponds to the execution of a process corresponding to the position determination program.

The flash memory 112 stores two parameters, that is, an interior corresponding value Pin and an operating threshold value Prx, as thresholds (hereinafter, referred to as determination threshold) based on which the smart ECU 11 determines whether the portable terminal 2 is present inside the vehicle compartment with reference to the reception strength of the signal transmitted from the portable terminal 2. The interior corresponding value Pin is a threshold based on which the authentication ECU determines that the portable terminal 2 is present inside the vehicle compartment. The operating threshold value Prx is a threshold value for determining whether or not the portable terminal 2 exists in the exterior operating area Rx outside the vehicle compartment. The interior corresponding value Pin corresponds to an inside determination value. The technical significance and setting method for the interior corresponding value Pin and the operating threshold value Prx as well as the description of the smart ECU 11 are described hereinafter.

The in-vehicle communication device 12 is a communication module mounted on the vehicle Hv for executing short-range communication. Each in-vehicle communication device 12 can transmit and receive radio waves of 2400 MHz to 2500 MHz (in other words, 2.4 GHz-ISM band radio wave). Each in-vehicle communication device 12 may be connected to the smart ECU 11 through a dedicated communication line or an in-vehicle network so that each in-vehicle communication device is mutually communicable with the smart ECU 11. Each of the in-vehicle communication devices 12 is assigned with a unique communication device number. The communication device number is information corresponding to the terminal ID of the portable terminal 2. The communication device number functions as information for identifying the in-vehicle communication devices 12.

Figure 4:
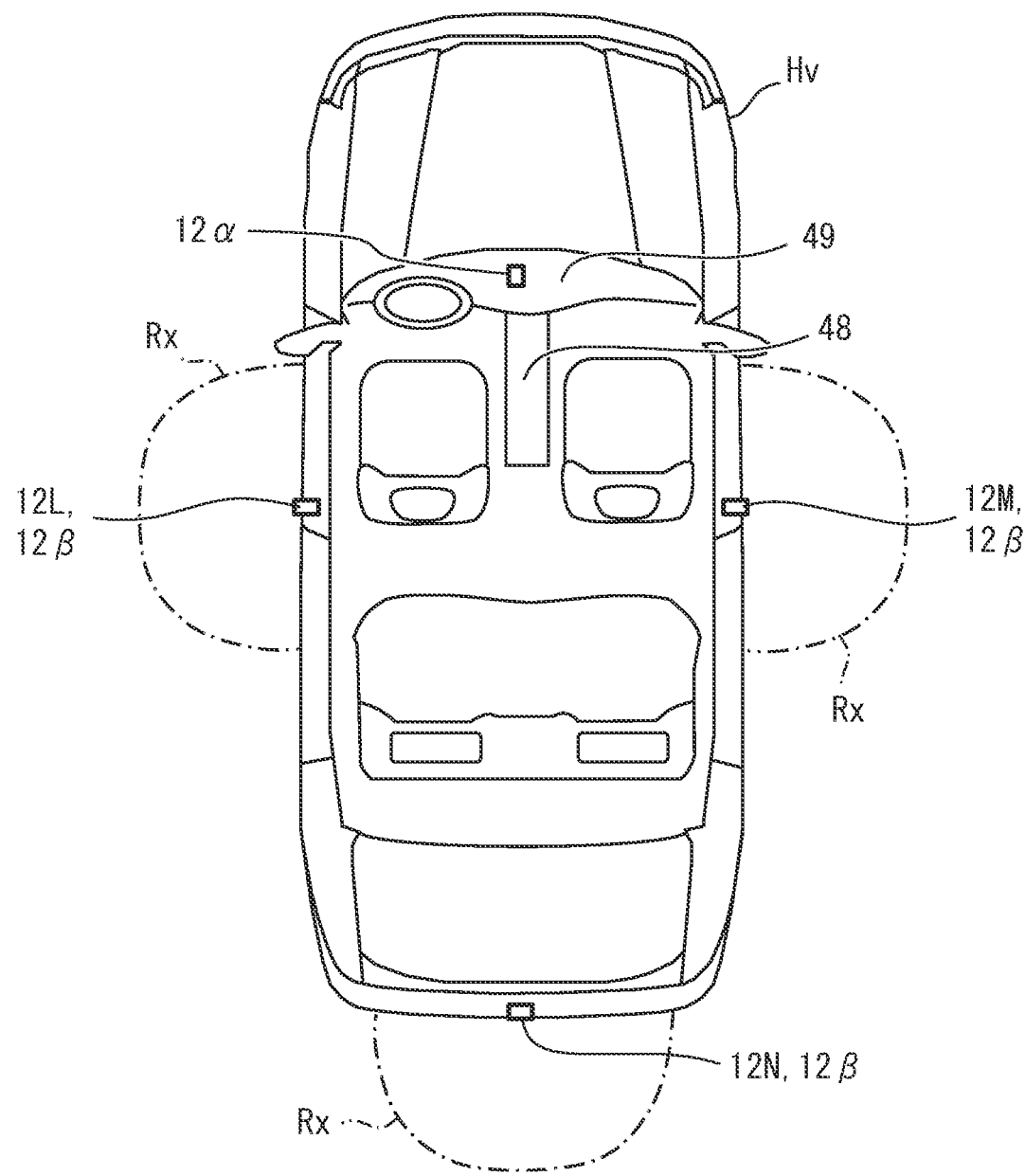
FIG. 4 conceptually illustrates an example of a mounting position of the in-vehicle communication device.

The in-vehicle system 1 in the present embodiment includes at least one vehicle interior communication device 12α and multiple vehicle exterior communication devices 12β as the in-vehicle communication device 12 shown in FIG. 4. The vehicle interior communication device 12α is the in-vehicle communication device 12 disposed inside the vehicle compartment, and the vehicle exterior communication device 12β is the in-vehicle communication device 12 disposed at an outer surface portion of the vehicle Hv. In the present disclosure, the outer surface portion is a body portion which is in contact with a vehicle exterior space of the vehicle Hv, and includes a side surface, a rear surface, and a front surface of the vehicle Hv. The in-vehicle system 1 according to the present embodiment includes a left exterior communication device 12L, a right exterior communication device 12M, and a rear exterior communication device 12N as the vehicle exterior communication devices 12β.

The respective in-vehicle communication devices 12 provide the reception strength of the signals transmitted from the portable terminal 2 to the smart ECU 11. The vehicle interior communication device 12α, as a data communication device, transmits data to or receives data from the portable terminal 2 by the smart ECU 11. FIG. 4 is a conceptual top view of the vehicle Hv, and shows a roof portion 41 in a transparent manner in order to describe the installation positions of various vehicle interior communication devices 12.

Figure 5:
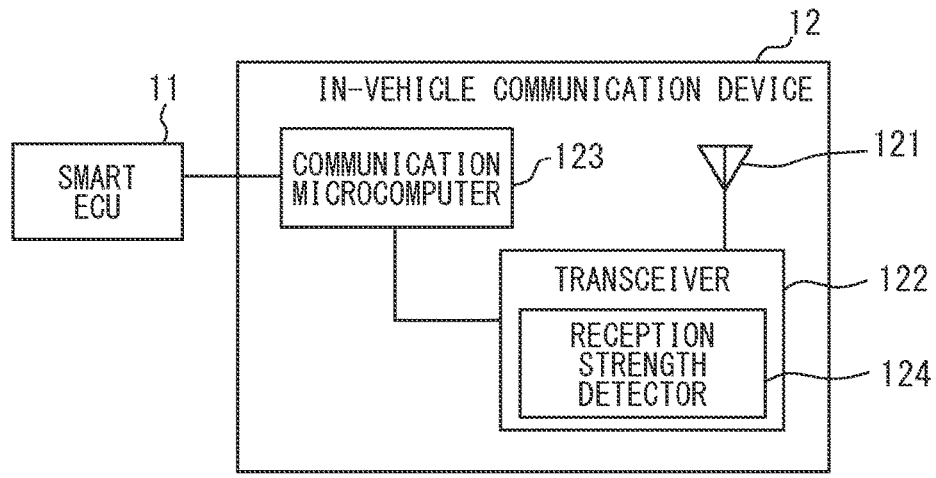
FIG. 5 is a block diagram showing a schematic configuration of an in-vehicle communication device.

FIG. 5 is a diagram schematically showing an electrical configuration of the in-vehicle communication device 12. As shown in FIG. 5, the in-vehicle communication device 12 includes an antenna 121, a transceiver 1222, and a communication microcomputer 123.

The antenna 121 is an antenna for transmitting and receiving the radio wave in a frequency band used for communication with the portable terminal 2 (that is, radio wave used in the system). The frequency band used by the system here is a 2.4 GHz band from 2400 MHz to 2500 MHz. The frequency band used by the system corresponds to the operating band for the antenna 121. The frequency band used by the system may include 2400 MHz to 2480 MHz used in the Bluetooth standard. The upper limit frequency and the lower limit frequency of the frequency band used by the system can be appropriately changed according to the communication standard with the portable terminal 2.

The antenna 121 is electrically connected to the transceiver 122. A specific configuration of the antenna 121 will be described later. The transceiver 122 demodulates a signal received by the antenna 121 and outputs the demodulated signal to the communication microcomputer 123. Further, the transceiver 122 modulates the signal input from the smart ECU 11 through the communication microcomputer 123, and outputs the modulated signal to the antenna 121, and radiates the output signal as a radio wave. The transceiver 122 is connected to the communication microcomputer 123 in a mutually communicable manner.

In addition, the transceiver 122 includes a reception strength detector 124 that sequentially detects the strength of the signal received by the antenna 121. The reception strength detector 124 can be implemented by various circuit configurations. The reception strength detected by the reception strength detector 124 is sequentially provided to the communication microcomputer 123 in association with the terminal ID included in the reception data. The channel number indicates a frequency adopted in the communication with the portable terminal 2. The reception strength may be expressed by, for example, a unit [dBm] of power. Data in which the reception strength and the terminal ID are associated with each other is referred to as reception strength data. The reception strength detector 124 corresponds to a strength detector.

The communication microcomputer 123 is a microcomputer for controlling the operation of the transceiver 122. Based on other aspects, the communication microcomputer 123 corresponds to a microcomputer for controlling the transfer of data with the smart ECU 11. The communication microcomputer 123 provides the reception data input from the transceiver 122 to the smart ECU 11 based on the correspondence to the reception strength. The communication microcomputer 123 also has a function of authenticating the terminal ID of the portable terminal 2, and performing a cryptographic communication with the portable terminal 2 on the basis of a request from the smart ECU 11. As an encryption method, various methods such as a method specified by Bluetooth can be used. Various methods, such as the method specified in Bluetooth, can also be used for the ID-authentication method.

The door button 13 is a button for the user to unlock and lock the door of the vehicle Hv. The door button 13 is placed on, for example, an outer door handle or near the outer door handle of each door of the vehicle Hv. When the user presses the door button 13, the door button 13 outputs an electrical signal indicative of the instruction to the smart ECU 11. The door button 13 corresponds to a configuration in which the smart ECU 11 receives a user's instruction of locking and unlocking. A touch sensor may be employed as a configuration for receiving at least one of the unlocking instruction and the locking instruction from the user. The start button 14 is a push switch for the user to start a driving source (for example, an engine). When the user performs a push operation on the start button 14, the start button 14 outputs an electrical signal indicating the push operation to the smart ECU 11. As an example, the vehicle Hv is a vehicle provided with an engine as a power source, but the present disclosure is not limited to the above example. The vehicle Hv may be an electric vehicle or a hybrid vehicle. When the vehicle Hv is a vehicle provided with a motor as a driving source, the start button 14 is a switch for starting the motor for driving.

The engine ECU 15 is an ECU for controlling the operation of an engine mounted on the vehicle Hv. For example, when the engine ECU 15 acquires a start instruction signal that instructs starting of the engine from the smart ECU 11, the engine ECU 15 starts the engine.

The body ECU 16 is an ECU configured to control in-vehicle actuator 17 in response to a request from the smart ECU 11. The body ECU 16 is communicably connected to various in-vehicle actuators 17 and various in-vehicle sensors 18. In this example, the in-vehicle actuators 17 include, for example, a door lock motor configuring a locking mechanism of each door, an actuator for adjusting a seat position (hereinafter, referred to as a seat actuator), and the like. In this example, the vehicle-mounted sensors 18 are courtesy switches or the like disposed for the respective doors. The courtesy switches are sensors for detecting opening and closing of the door. The body ECU 16, for example, outputs a predetermined control signal to the door lock motors provided on the respective doors of the vehicle Hv based on a request from the smart ECU 11, thereby locking and unlocking the doors of the vehicle Hv.

(The Role and Configuration of Vehicle Interior Communication Device 12α)

The vehicle interior communication device 12α is disposed at a predetermined position inside the vehicle compartment so that a strong electric field area is formed inside the vehicle compartment. The strong electric field area is an area in which a signal transmitted from the in-vehicle communication device 12 propagates while maintaining a strength equal to or higher than a predetermined threshold (hereinafter, referred to as a strong electric field threshold). The strong electric field threshold is set to a sufficiently strong level as a signal for the short-range communication. For example, the strong electric field threshold is −35 dBm (−0.316 µW). Since the propagation path of the radio signal is reversible, according to another aspect, the strong electric field area is also an area in which the reception strength of the signal, which is transmitted from the portable terminal 2 and received by the in-vehicle communication device 3, is equal to or higher than a threshold.

The vehicle interior communication device 12α may be disposed at an arbitrary position inside the vehicle compartment. It may be preferable that the vehicle interior communication device 12α also functioning as a data communication device is disposed at a position where the vicinity of the door at the interior of the vehicle compartment and the exterior of the vehicle compartment can come in sight. The position at which the vicinity of the door in the vehicle interior and the vehicle exterior can come in sight is, for example, a ceiling portion in the vehicle compartment. As an example in the present disclosure, the vehicle interior communication device 12α is disposed at a central portion of the upper end of the window shield, in other words, near a rearview mirror. For example, a central portion of an instrumental panel 49 in the vehicular width direction, an overhead console, or a central portion of the ceiling may also be adopted as the installation position of the vehicle interior communication device 12α. Even in a situation where the portable terminal 2 is present out of sight of the vehicle interior communication device 12α, the wireless communication can be executed between the portable terminal 2 and the vehicle interior communication device 12α through, for example reflection at a structure. Therefore, the vehicle interior communication device 12α may also be disposed at a position where the exterior of the vehicle compartment is out of sight such as the center console 48 or the foot position or floor portion of the driver seat.

The viewable range from the position of the in-vehicle communication device 2 refers to an area in which a signal transmitted from the in-vehicle communication device 12 can directly reach. Since the propagation path of the radio signal is reversible, the viewable range of the in-vehicle communication device 12 also refers to an area in which the in-vehicle communication device 12 can directly receive the signal transmitted from the portable terminal 2. An area beyond the viewable range of the in-vehicle communication device 12 is an area in which the signal transmitted from the in-vehicle communication device 12 cannot directly reach. Since the propagation path of the radio signal is reversible, the area beyond the viewable range of the in-vehicle communication device 12 also refers to an area in which the in-vehicle communication device 12 cannot directly receive the signal transmitted from the portable terminal 2. The signal transmitted from the portable terminal 2 can reach the area beyond the viewable range by reflection on various structures.

Terminal information is stored in the non-volatile memory included in the vehicle interior communication device 12α as the data communication device. The terminal information includes, for example, an authentication key or a terminal ID. The terminal information may be registered by a user performing an execution of the key exchange protocol, in other words, the pairing. When the vehicle Hv is a service vehicle, the terminal information may be sent from an external server that manages the operation (for example, reservation condition or driving condition) of the service vehicle through the user. In a case where the vehicle Hv is used by multiple users, the terminal information of the portable terminal 2 carried by each user is stored in the communication microcomputer.

When the vehicle interior communication device 12α as a data communication device receives the advertisement packet from the portable terminal 2, the vehicle interior communication device 12α automatically establishes a communication connection with the portable terminal 2 by use of the storage terminal information. Then, the smart ECU 11 transmits and receives data to/from the portable terminal 2. When establishing the communication connection with the portable terminal 2, the vehicle interior communication device 12α provides the terminal ID of the portable terminal 2 which is in a communication connection to the smart ECU 11.

According to the Bluetooth standard, an encrypted data communication is performed by a frequency hopping method. The frequency hopping method is a communication system in which channels to be used for a communication are successively switched to another with time. Specifically, in the Bluetooth standard, the data communication is performed by a frequency hopping spread spectrum method (FHSS: Frequency Hopping Spread Spectrum). In the Bluetooth Low Energy (hereinafter, referred to as Bluetooth LE), 40 channels from No. 0 to No. 39 are prepared, and 37 channels from No. 0 to No. 36 are available for a data communication. The three channels from No. 37 to No. 39 are used for transmission of the advertisement packets (hereinafter referred to as advertising channels).

In a state where the communication connection with the portable terminal 2 is established, the vehicle interior communication device 12α performs transmission and reception of data with the portable terminal 2 while sequentially changing 37 channels. At that time, the vehicle interior communication device 12α sequentially provides information indicating a channel used for a communication with the portable terminal 2 (hereinafter, referred to as channel information) to the smart ECU 11. The channel information may be a specific channel number, or may be a parameter (so-called Hop Increment) indicating a transition rule of a used channel. The Hop Increment is a number from 5 to 16 that is randomly determined during the communication connection. The channel information preferably includes a present channel number and a Hop Increment.

The number of the in-vehicle communication devices 12α may be more than one. For example, the number of the in-vehicle communication devices 12α may be two, three, four or more. For example, two vehicle interior communication devices 12α may be respectively provided as the in-vehicle communication device 12 arranged near a foot position of the driver seat and the in-vehicle communication device 12 arranged at the floor portion of the trunk area. The vehicle interior communication devices 12α may be provided one respectively at the side surfaces of left and right B pillars 42B inside the compartment. In addition, the vehicle interior communication device 12α may be provided at the side surface of the door for the rear seat or the floor surface of the rear seat. The vehicle interior communication device 12α that may serve as a data communication device may be preferably disposed at a position where the outside of the vehicle compartment becomes the area beyond the viewable range of the vehicle interior communication device 12α. One or more of the vehicle interior communication devices 12α may be disposed at predetermined positions so that most of the area inside the vehicle compartment or preferably the entire area inside the vehicle compartment forms the strong electrical field area.

As the antenna 31, a variety of antenna structures such as a patch antenna, a dipole antenna, a monopole antenna, a plate-shaped or line-shaped inverted-F antenna, an inverted-L antenna or a zeroth-order resonant antenna may be adopted. The antenna 121 of the vehicle interior communication device 12α may be a ground plate extension zeroth-order antenna or a half-wave zeroth-order antenna. The installation position, the installation posture or the number of installations for the vehicle interior communication device 12α may be properly designed in view of the shape inside the vehicle compartment.

(The Structure of Vehicle Exterior Communication Device 12β)

The following described the structure of the vehicle exterior communication device 12β. As the vehicle exterior communication devices 12β, a left exterior communication device 12L, a right exterior communication device 12M, and a rear exterior communication device 12N have the similar antenna structure. Hereinafter, "λ" represents the wavelength of the radio wave of the center frequency (2.45 GHz herein) adopted in the system. For example, "λ/2" and "0.5λ" refer to a half of the length of the target wavelength, and "λ/4" and "0.25 Å" refer to the length of one quarter of the target wavelength. The wavelength of the 2.45 GHz radio wave (that is, λ) in vacuum and air is 122 mm.

Figure 6:
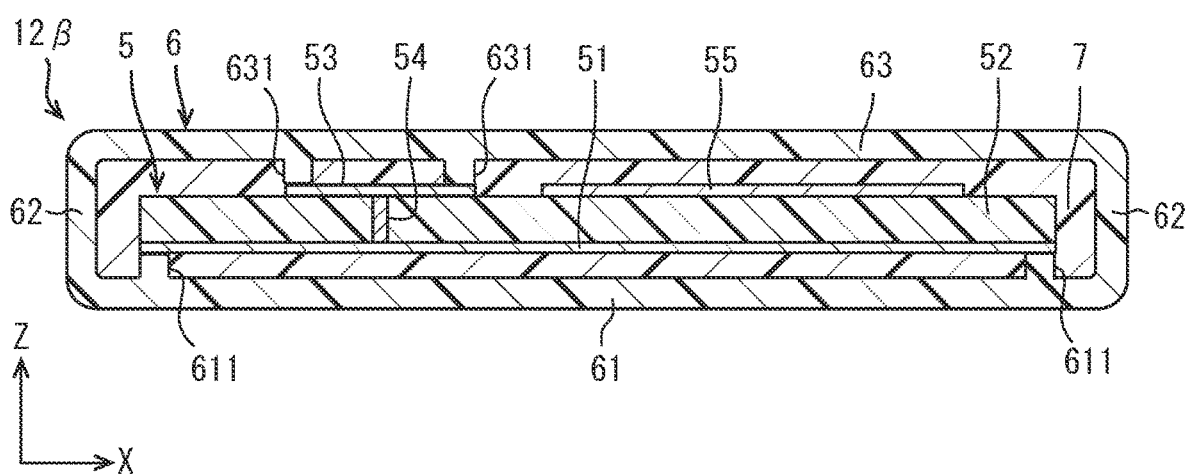
FIG. 6 is a diagram that illustrates an example of the configuration of a vehicle exterior communication device.
Figure 7:
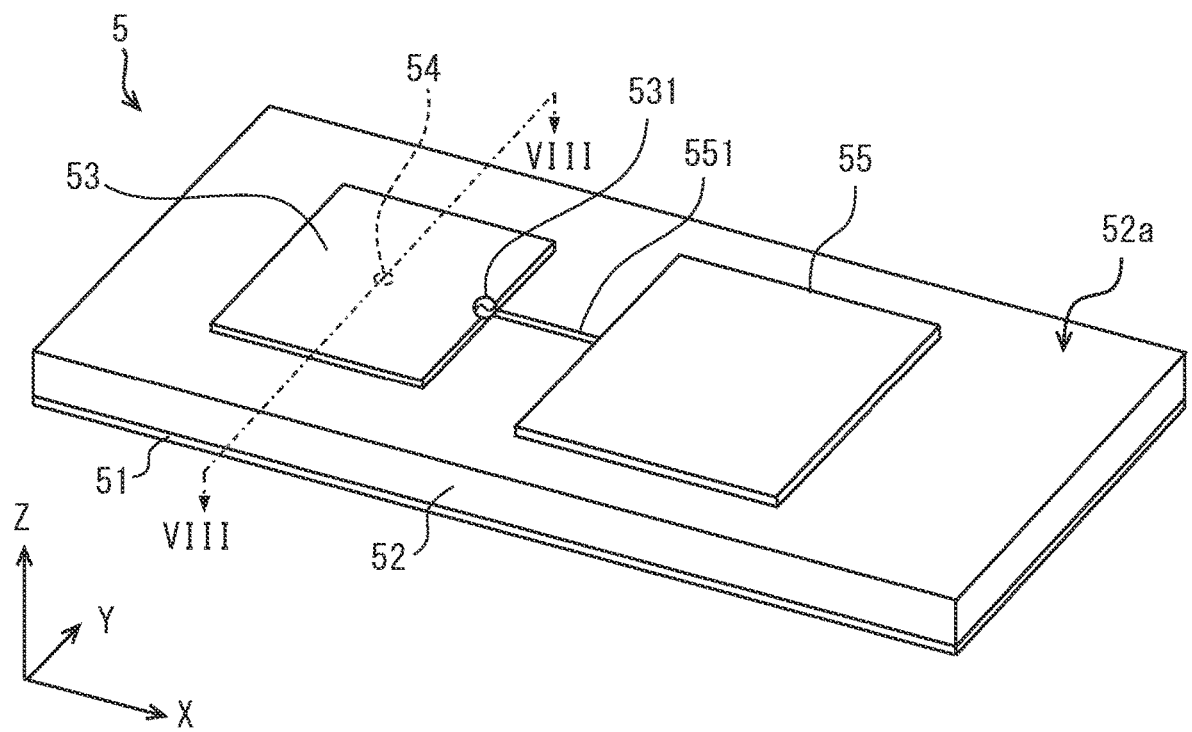
FIG. 7 is an external perspective view of the configuration of a circuit board.
Figure 8:
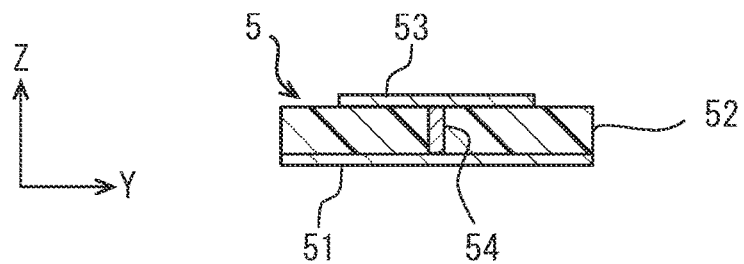
FIG. 8 is a cross-sectional view taken along a line VIII-VIII of FIG. 7.

As illustrated in FIG. 6, the vehicle exterior communication device 12β includes a circuit board 5 and a case 6. The circuit board 5 includes a ground plate 51, a support plate 52, an opposing conductive plate 53, a short-circuit portion 54, and a circuit portion 55. The configuration with the communication of the ground plate 51, the opposing conductive plate 53 and the short-circuit portion 54 corresponds to the antenna 121 (hereinafter also referred to as a vehicle exterior antenna 121β) for the vehicle exterior communication device 12β. FIG. 7 is an external perspective view of the configuration of the circuit board 5. FIG. 8 is a cross-sectional view taken along a line VIII-VIII shown in FIG. 7. In FIGS. 7 and 8, the illustration of the case 6 is omitted. For convenience, each part will be described below with the side where the opposing conductive plate 53 is provided with respect to the ground plate 51 as the upper side for the vehicle exterior communication device 12β. That is, the direction from the ground plate 51 to the opposing conductive plate 53 corresponds to the upward direction for the vehicle exterior communication device 12β. The direction from the opposing conductive plate 53 toward the ground plate 51 corresponds to the downward direction for the vehicle exterior communication device 12β.

The ground plate 51 is a conductive member having a plate shape and made of conductor such as copper. The ground plate 51 is provided along the lower side surface of the support plate 52. The plate shape here also includes a thin film shape such as a metal foil. That is, the ground plate 51 may be a pattern formed on the surface of a resin plate such as a printed wiring board by electroplating or the like. The ground plate 51 is electrically connected to an external conductor that is the coaxial cable or a ground layer included in the support plate 52, and provides a ground electrical potential (in other words, ground electrical potential) in the vehicle exterior communication device 12β.

The ground plate 51 is formed in a rectangular shape. The length of the short side of the ground plate 51 is electrically set to a value corresponding to 0.4λ, for example. Further, the length of the long side of the ground plate 51 is electrically set to 1.2λ. In this case, the electrical length is an effective length in consideration of a fringing electric field, a wavelength shortening effect by a dielectric substance, and the like. When the support plate 52 is formed by using a dielectric material having a relative permittivity of 4.3, the wavelength on the surface of the ground plate 10 is about 60 mm due to the wavelength shortening effect of the dielectric material as the support plate 20. Therefore, the length electrically corresponding to 1.2λ is 72 mm.

The X-axis shown in various drawings such as FIG. 6 represents the longitudinal direction of the ground plate 51, the Y-axis represents the lateral direction of the ground plate 51, and the Z-axis represents the vertical direction. The three-dimensional coordinate system (hereinafter referred to as an antenna coordinate system) including the X-axis, the Y-axis, and the Z-axis is a concept for explaining the configuration of the exterior communication device 12β. As another aspect, when the ground plate 52 has a square shape, the direction along any one side can be the X-axis. Further, when the ground plate 51 is circular, an arbitrary direction parallel to the ground plate 51 can be set as the X-axis. The Y-axis may be in a direction parallel to the ground plate 51 and orthogonal to the X-axis. When the ground plate 51 has a shape such as a rectangle or an ellipse in which a longitudinal direction and a lateral direction exist, the longitudinal direction can be the X-axis direction. The Z-axis is set so that the upward direction for the antenna 121 is a positive direction.

It may be preferable that the ground plate 51 has a line-symmetrical shape (hereinafter, a bi-directional line-symmetric shape) with each of two straight lines orthogonal to each other as axes of symmetry. The bidirectional line symmetrical shape refers to a figure that is line-symmetric with a first straight line as an axis of symmetry, and that is further line-symmetric with respect to a second straight line that is orthogonal to the first straight line. The bidirectional line symmetrical shape corresponds to, for example, an ellipse, a rectangle, a circle, a square, a regular hexagon, a regular octagon, a rhombus, or the like. The ground plate 51 may be formed to have a size larger than a circle having a diameter of one wavelength. The planar shape of a member refers to the shape of the member as viewed from above.

The support plate 52 is a rectangular flat plate member. The support plate 52 is a plate-shaped member for arranging the ground plate 51 and the opposing conductive plate 53 so as to face each other at a predetermined interval. The support plate 52 may be formed to have a size substantially identical to the size of the ground plate 51. The support plate 20 is realized by using a dielectric material having a predetermined relative permittivity. For example, a printed circuit board having base material such as glass epoxy resin may be used for the support plate 52. Here, as an example, the support plate 52 is realized by using a glass epoxy resin having a relative permittivity of 4.3 (in other words, FR4: Flame Retardant Type 4).

In the present embodiment, as an example, the thickness of the support plate 52 is formed to be, for example, 1.5 mm. The thickness of the support plate 52 corresponds to the distance between the ground plate 51 and the opposing conductive plate 53. By adjusting the thickness of the support plate 52, the distance between the opposing conductive plate 53 and the ground plate 51 can be adjusted. The specific value of the thickness of the support plate 52 may be appropriately determined by simulations or experiments. The thickness of the support plate 52 may be 2.0 mm, 3.0 mm, or the like. The wavelength of the support plate 52 is about 60 mm due to the wavelength shortening effect of the dielectric material. Therefore, the value of 1.5 mm in thickness electrically corresponds to $1/40$ of the target wavelength (that is, $\lambda/40$). Further, in the present embodiment, a configuration in which a resin as the support plate 52 is filled is adopted between the ground plate 51 and the opposing conductive plate 53, alternatively, the present embodiment may not be limited to this. The space between the ground plate 51 and the opposing conductive plate 53 may be hollow or vacuum. In addition, the structures exemplified above may be combined.

The opposing conductive plate 53 is a conductive member having a plate shape and made of conductor such as copper. As described above, the plate shape here also includes a thin film shape such as copper foil. The opposing conductive plate 53 is arranged so as to face the ground plate 51 via the support plate 52. Similar to the ground plate 51, the opposing conductive plate 53 may also have a pattern formed on the surface of a resin plate such as a printed wiring board. The term "parallel" here is not limited to perfect parallel. The opposing conductive plate 53 may be inclined from several degrees to about ten degrees with respect to the ground plate 51. That is, the term "parallel" includes a substantially parallel state.

By arranging the opposing conductive plate 53 and the ground plate 51 so as to face each other, a capacitance is formed according to the area of the opposing conductive plate 53 and the distance between the opposing conductive plate 53 and the ground plate 51. The opposing conductive plate 53 is formed to have a size that forms a capacitance that resonates in parallel with the inductance of the short-circuit portion 54 at a predetermined first frequency. The first frequency is an arbitrary frequency belonging to the frequency band adopted in the system. For example, the first frequency is 2420 MHz. As another aspect, the first frequency may be set to an advertising channel such as 2402 MHz, 2426 MHz, or 2480 MHz. When it is necessary to distinguish between the wavelength of the radio wave of the first frequency and the target wavelength in the following, the wavelength of the radio wave of the first frequency may be also referred to as "$\lambda_1$" in the following. However, the difference between $\lambda_1$ and $\lambda$ in air is about 1.5 mm, and the difference may be neglected in this embodiment.

The area of the opposing conductive plate 53 may be appropriately designed to provide the desired capacitance (and thus to operate at the target frequency). For example, the opposing conductive plate 53 is electrically formed in a square shape having a side of 12 mm. Since the wavelength on the surface of the opposing conductive plate 53 is about 60 mm due to the wavelength shortening effect of the support plate 52, the value of 12 mm electrically corresponds to $0.2\lambda$. Of course, the length of one side of the opposing conductive plate 53 may be changed as appropriate, and may be 14 mm, 15 mm, 20 mm, 25 mm, or the like.

Here, the shape of the opposing conductive plate 53 is square as an example, alternatively, as another configuration, the planar shape of the opposing conductive plate 53 may be circular, regular octagon, regular hexagon, or the like.

Further, the opposed conductive plate 53 may have a rectangular shape or an oblong shape. The opposing conductive plate 53 may have a bidirectional line-symmetrical shape. The opposing conductive plate 53 may be a point-symmetrical figure such as a circle, a square, a rectangle, and a parallelogram.

The opposing conductive plate 53 may be provided with slits or may have rounded corners. An edge portion of the opposing conductive plate 53 may be partially or entirely formed in a meander shape. The bidirectional line-symmetrical shape also includes a shape in which minute irregularities (about several mm) may be provided at the edge of the bidirectional line-symmetrical shape. Irregularities provided at the edge portion of the opposing conductive plate 53 that do not affect the operation can be ignored. The technical idea for the planar shape of the opposing conductive plate 53 is similar to the above-mentioned ground plate 51.

The opposing conductive plate 53 is connected to the circuit portion 55 by using a microstrip line 551. The connection point between the opposing conductive plate 53 and the microstrip line 551 corresponds to the feeder point 531 for the antenna 121. The microstrip line 551 corresponds to a feeder line. As a power supply method to the opposing conductive plate 53, various methods such as a direct connection power supply method and an electromagnetic coupling method can be adopted. The electromagnetic coupling method refers to a power supply method using electromagnetic coupling between a microstrip line or the like for power supply and the opposing conductive plate 53. The feeder point 531 may be provided at a position where the input impedance and output impedance of the antenna 121 match when viewed from the circuit portion 55. In other words, the feeder point 531 may be provided at a position where the return loss becomes a predetermined allowable level. The feeder point 531 may be arranged at an arbitrary position, for example, in the central region or the edge portion of the opposing conductive plate 20.

Figure 9:
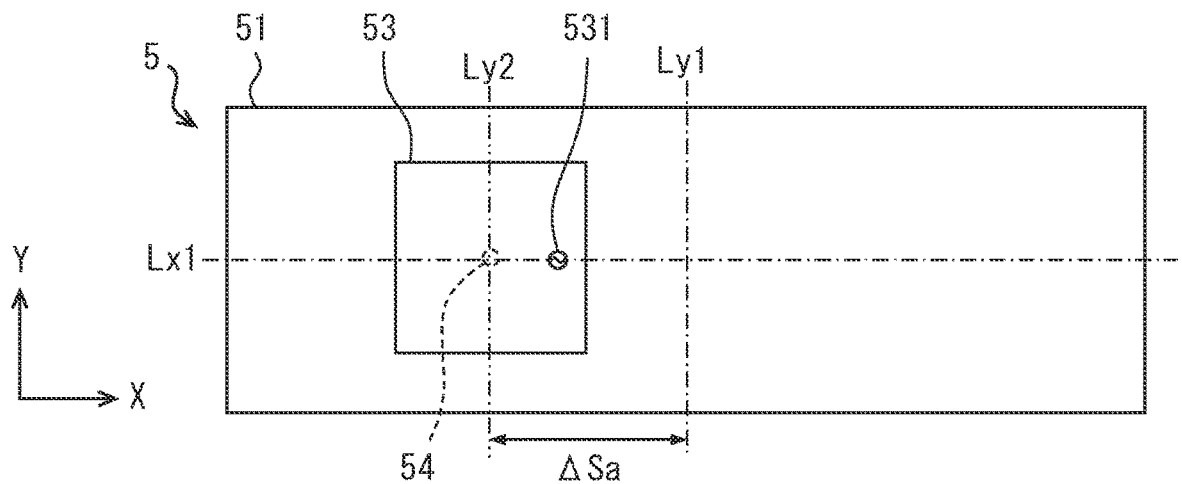
FIG. 9 is a diagram for explaining the positional relationship between the ground plate and the opposing conductive plate.

As shown in FIG. 9, the opposing conductive plate 53 is disposed to face the ground plate 51 in such a manner that one set of opposite sides is parallel to the X-axis and another set of opposite sides is parallel to the Y-axis. Here, the center thereof is arranged so as to deviate from the center of the ground plate 51 by a predetermined amount in the X-axis direction. Specifically, the opposing conductive plate 53 is arranged so that its center is electrically deviated from the center of the ground plate 51 in the X-axis direction by $\frac{1}{25}$ (that is, $0.04\lambda$) of the target wavelength. According to another viewpoint, this configuration corresponds to a configuration in which the ground plate 51 is arranged asymmetrically with respect to the opposing conductive plate 53.

The distance between the center of the ground plate 51 (hereinafter, the ground plate center) and the center of the opposing conductive plate 53 in the X-axis direction (hereinafter, the ground plate offset amount $\Delta Sa$) may not be limited to $0.05\lambda$. The ground plate offset amount $\Delta Sa$ may be $0.5\lambda$, $0.08\lambda$, $0.25\lambda$, or the like. The ground plate offset amount $\Delta Sa$ may be set to $0.125\lambda$ ($=\lambda/8$). The ground plate offset amount $\Delta Sa$ can be appropriately changed within a range in which the opposing conductive plate 53 does not protrude to the outside of the ground plate 51 when viewed from above. The opposing conductive plate 53 is arranged so that at least the entire region (in other words, the entire surface) faces the ground plate 51. The ground plate offset amount $\Delta Sa$ corresponds to the amount of deviation between the center of the ground plate 51 and the center of the opposing conductive plate 53. The ground plate offset amount $\Delta Sa$ may be designed such that the ground plate 51 functions as a radiation element in a second frequency described later.

In FIG. 9, the support plate 52 is drawn to be transparent (that is, not shown) in order to clarify the positional relationship between the ground plate 51 and the opposing conductive plate 53. The alternate long and short dash line Lx1 shown in FIG. 9 represents a straight line passing through the center of the ground plate 51 and parallel to the X-axis, and the alternate long and short dash line Ly1 represents a straight line passing through the center of the ground plate 51 and parallel to the Y-axis. The alternate long and short dash line Ly2 represents a straight line that passes through the center of the opposing conductive plate 53 and is parallel to the Y axis. From another point of view, the straight line Lx1 corresponds to the axis of symmetry for the ground plate 51 and the opposing conductive plate 53. The straight line Ly1 corresponds to the axis of symmetry for the ground plate 51. The straight line Ly2 corresponds to the axis of symmetry for the opposing conductive plate 53.

Since the opposing conductive plate 53 is arranged so as to be displaced by a predetermined amount in the X-axis direction from a position concentric with the ground plate 51, the alternate long and short dash line Lx1 also passes through the center of the opposing conductive plate 53. That is, the alternate long and short dash line Lx1 is a straight line parallel to the X axis and corresponds to a straight line passing through the center of the ground plate 51 and the opposing conductive plate 53. The intersection of the straight line Lx1 and the straight line Ly1 corresponds to the center of the ground plate, and the intersection of the straight line Lx1 and the straight line Ly2 corresponds to the center of the opposing conductive plate 53 (hereinafter, the conductive plate center). The conductive plate center corresponds to the center of gravity of the opposing conductive plate 53. Since the opposing conductive plate 53 has a square shape in the present embodiment, the center of the conductor plate corresponds to the intersection of two diagonal lines of the opposing conductive plate 53. The arrangement mode in which the ground plate 51 and the opposing conductive plate 53 are concentric corresponds to an arrangement mode in which the center of the opposing conductive plate 53 and the center of the ground plate 51 overlap in top view.

The short-circuit portion 54 is a conductive member that electrically connects the ground plate 51 and the opposing conductive plate 53. The short-circuit portion 54 may be a linear member having one end electrically connected to the ground plate 51 and the other end electrically connected to the opposing conductive plate 53. The short-circuit portion 54 adopts vias provided on the printed circuit board as, for example, the support plate 52. The short-circuit portion 54 may adopt a conductive pin. By adjusting the diameter and length of the short-circuit portion 54, the inductance provided in the short-circuit portion 54 can be adjusted.

The short-circuit portion 54 is provided, for example, so as to be located at a center of the conductor plate. Note that a position where the short-circuit portion 54 is formed does not need to exactly coincide with the center of the conductive plate. The short-circuit portion 54 may be deviated from the center of the conductive plate by about several millimeters. The short-circuit portion 54 may be formed in a center region of the opposing conductive plate 53. The central region of the opposing conductive plate 53 refers to a region inside the line connecting the points that internally divide the conductor plate from the center to the edge portion in a ratio of 1:5. From another point of view, the central region corresponds to a region where concentric figures, in which the opposing conductive plate 53 is similarly reduced to about ⅙, overlap.

The circuit portion 55 is a circuit module that includes, for example, a transceiver 122, a communication microcomputer 123 and a power supply circuit. The circuit portion 55 is an electrical assembly of various parts such as an IC, an analog circuit element, and a connector. The circuit portion 55 is formed at a surface of the support plate 52 (hereinafter referred to a support plate upper surface 52a) at a side where the opposing conductive plate 53 is disposed. For example, the circuit portion 55 adopts a region of the support plate upper surface 52a located above an asymmetrical portion 511. The microstrip line 551 is a linear conductor for supplying power to the opposing conductive plate 53. One end of the microstrip line 551 is connected to the opposing conductive plate 53, and the other end of the microstrip line 551 is connected to the circuit portion 55. The microstrip line 551 may be formed inside the support plate 52.

The case 6 stores the circuit board 5. The case 6 is formed by combining, for example, an upper case and a lower case that are vertically separable. The case 6 is constructed using, for example, a polycarbonate (PC) resin. As the material of the case 6, various resins such as synthetic resin obtained by mixing acrylonitrile-butadiene-styrene copolymer (so-called ABS) with PC resin and polypropylene (PP) can be adopted.

The case 6 includes a case bottom portion 61, a case side wall portion 62, and a case top plate portion 63. The case bottom portion 61 is configured to provide the bottom of the case 6. The case bottom portion 61 is formed in a flat plate shape. The circuit board 5 inside the case 6 is disposed such that the ground plate 51 faces the case bottom portion 61 via the rib 611 (hereinafter referred to as a lower rib) formed at the case bottom portion 61. The lower rib 611 provides to regulate the position of the circuit board 5 in the case 6. The lower rib 611 has a convex structure integrally formed from a predetermined position of the case bottom portion 61 toward the upper side. The upper rib 611 is provided so as to come into contact with the edge portion of the ground plate 51. The lower rib 611 is formed so that the distance between the ground plate 51 and the case bottom portion 61 is $\lambda/25$ or less, in other words, 5 mm or less. The lower rib 611 may be formed such that the lower rib 611 protrudes from the inner surface of the case side wall portion 62 to the interior of the housing. The lower rib 611 may be formed to support the circuit board 6 from a lower side, or may be formed to be integrally with the case side wall portion 62.

The case side wall portion 62 is configured to provide the side surface of the case 6, and is put up from the edge portion of the case bottom portion 61 upwardly. The height of the case side wall portion 62 is designed so that, for example, the distance between the inner surface of the case top plate portion 63 and the opposing conductive plate 53 is $\lambda/25$ or less. The case top plate portion 63 is configured to provide an upper surface portion of the case 6. The case top plate portion 63 of this embodiment is formed in a flat plate shape. As the shape of the case top plate portion 63, various other shapes such as a dome shape can be adopted. The case top plate portion 63 is configured such that the inner surface faces a support plate upper surface 52a (and thus the opposing conductive plate 53). An upper rib 631 is formed on the inner surface of the case top plate portion 63.

The upper rib 631 has a convex structure formed downward from a predetermined position on the inner surface of the case top plate portion 63. The upper rib 631 is provided so as to come into contact with the edge portion of the opposing conductive plate 53. The upper rib 631 is integrally formed with the case 6. The upper rib 631 regulates the position of the support plate 52 in the case 6. A metal pattern such as copper foil may be arranged to the vertical surface (that is, the outer surface) of the upper rib 631 that is connected to the edge of the opposing conductive plate 53. The upper rib 631 may be an arbitrary element and may not be provided.

For example, a sealing material 7 is filled inside the case 6. The sealing material 7 corresponds to a sealing member. Various materials such as urethane resin (for example, polyurethane prepolymer), epoxy resin, and silicone resin can be adopted as the sealing material. Further, according to the configuration in which the sealing material 7 is filled in the case 6, waterproofness, dustproofness, and vibration resistance can be improved. According to the configuration in which the case 6 is filled with the sealing material 7, the sealing material 7 located above the opposing conductive plate 53 suppresses the wraparound of the vertical polarization of the ground plate from the end portion of the opposing conductive plate 53 to the upper side, so that it has the effect of improving the radiation gain in a ground plate horizontal direction. The ground plate horizontal direction refers to a direction from the center region toward the edge of the opposing conductive plate 53. According to another viewpoint, the horizontal direction of the ground plate refers to a direction perpendicular to a perpendicular line to the ground plate 51 passing through the center of the opposing conductive plate 53. The ground plate horizontal direction corresponds to a lateral direction, in other words, the side of the vehicle exterior communication device 12β. The sealing material 7 is an arbitrary element, not an essential element. In FIG. 6, hatching of the sealing material 7 is not shown in order to maintain the visibility of the drawing.

The upper rib 631 and the sealing material 7 correspond to a configuration (hereinafter, radio wave shield) that suppresses the vertical electric field radiated by the zeroth order resonance mode from wrapping around from the edge portion of the opposing conductive plate 53 to the upper side. The configuration disclosed as the second modification corresponds to a configuration in which a radio wave shield body configured by using a conductor or a dielectric material is arranged on the upper side of the opposing conductive plate 53. The case 6 including the upper rib 631 and the sealing material 7 may preferably have a high relative permittivity and a small dielectric loss tangent. For example, it may be preferable that the relative permittivity is 2.0 or more and the dielectric loss tangent is 0.03 or less. When the dielectric loss tangent is high, the amount of radiant energy lost as heat loss increases. Therefore, it may be preferable that the case 6 and the sealing material 7 are realized by using a material having a smaller dielectric loss tangent. The case 6 and the sealing material 7 function so as to much suppress the wraparound of the electric field as the dielectric constant increases. In other words, the higher the dielectric constant of the case 6 and the sealing material 7, the better the gain improving effect in the ground plate horizontal direction. Therefore, it may be preferable that the case 6 and the sealing material 7 are made of a dielectric having a high dielectric constant.

(The Operation of Vehicle Exterior Communication Device 12β)

The following describes the operation of the vehicle exterior communication device 12β configured as described above. The opposing conductive plate 53 in the vehicle exterior communication device 12β is short-circuited to the ground plate 51 by the short-circuit portion 54 provided in the center region of the opposing conductive plate 53, and the area of the opposing conductive plate 53 is equal to an area for forming an electrostatic capacitance that resonates in parallel with the inductance of the short-circuit portion 54 at the target frequency.

In the first frequency and the frequencies near the first frequency, a parallel resonance (so-called an LC parallel resonance) occurs due to an energy exchange between the inductance and the capacitance, and a vertical electric field perpendicular to the ground plate 51 and the opposing conductive plate 53 is generated between the ground plate 51 and the opposing conductive plate 53. This vertical electric field propagates from the short-circuit portion 54 toward the edge portion of the opposing conductive plate 53, and at the edge portion of the opposing conductive plate 53, the ground plate vertically polarized wave propagates in space. The ground plate vertically polarized wave here refers to a radio wave in which the vibration direction of the electric field is perpendicular to the ground plate 51 and the opposing conductive plate 53. When the vehicle exterior communication device 12β is used in a posture parallel to the horizontal plane, the ground plate vertically polarized wave refers to a polarized wave perpendicular to the ground plate (so-called an ordinary vertically polarized wave).

Figure 10:
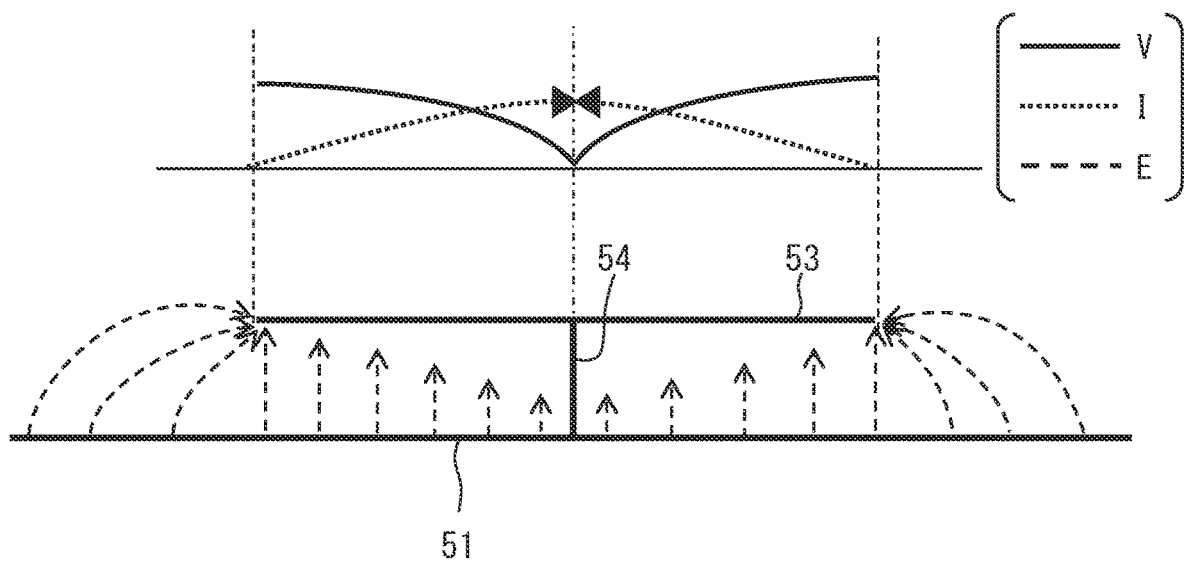
FIG. 10 illustrates a current, a voltage, and an electric field distribution in a zeroth order resonance mode.
Figure 11:
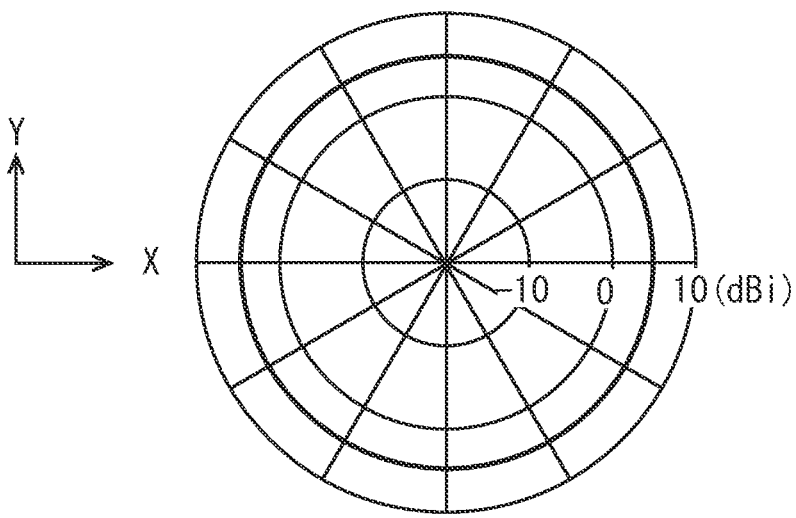
FIG. 11 illustrates a radiation characteristic in the zeroth order resonance mode.

As shown in FIG. 10, the propagation direction of the vertical electric field is symmetrical with respect to the short-circuit portion 54. As illustrated in FIG. 11, the radiation characteristic for the direction parallel to the ground plate is non-directional, in other words, omnidirectional. When the ground plate 51 is disposed so as to be horizontal, the vehicle exterior communication device 12β functions as an antenna having a main beam in the horizontal direction. The direction parallel to the ground plate corresponds to the radiation direction of the main polarized wave. The ground plate parallel plane refers to a plane parallel to the ground plate 51 and the opposing conductive plate 53.

Figure 12:
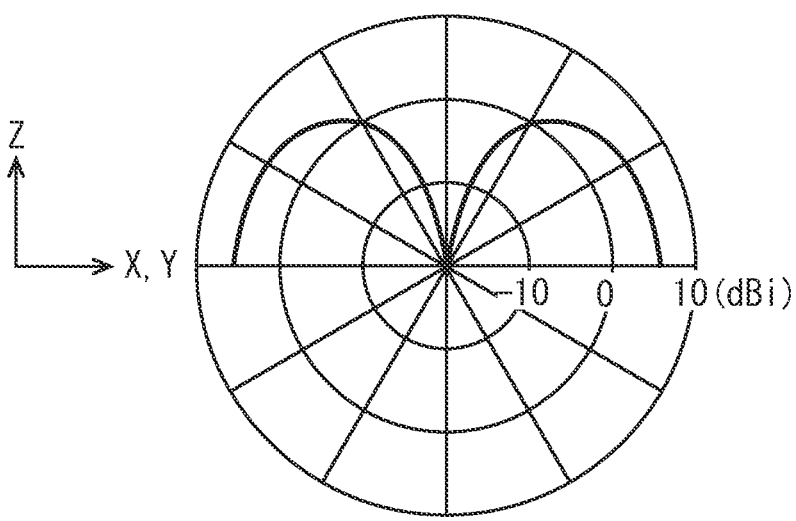
FIG. 12 illustrates a radiation characteristic in the zeroth order resonance mode.

Since the short-circuit portion 54 is disposed at the center of the opposing conductive plate 53, a current that flows through the opposing conductive plate 53 is symmetric about the short-circuit portion 54. Therefore, a radio wave in the antenna height direction generated by a current that flows through the opposing conductive plate 53 in a certain direction from the center of the opposing conductive plate 53 is canceled by a radio wave generated by the current that flows in the opposite direction. That is, the current excited by the opposing conductive plate 53 does not contribute to the emission of radio waves. As illustrated in FIG. 12, the radio wave is not radiated in a direction perpendicular to the ground plate 51 (hereinafter referred to as a direction perpendicular to the ground plate). The direction perpendicular to the ground plate corresponds to the Z-axis positive direction in the drawing. Hereinafter, for convenience, a mode operated by an LC parallel resonance having the capacitance formed between the ground plate 51 and the opposing conductive plate 53 and the inductance of the short-circuit portion 54 is referred to as a zeroth order resonance mode. The vehicle exterior antenna 121β in the zeroth order resonance mode corresponds to a voltage antenna. The antenna including the above configuration corresponds to an antenna in which the electrostatic capacitance formed by the opposing conductive plate 53 and the ground plate 51 and the inductance included in the short-circuit portion 54 are adopted for parallel resonance in the communication frequency as a frequency for wireless communication. The resonance frequency of the zeroth-order resonance mode may be adjusted by using a matching element.

The exterior antenna 121β also radiates radio waves from the ground plate 51 due to the fact that the ground plate 51 is asymmetrically formed when viewed from the opposing conductive plate 53. The following describes specific examples. In the vehicle exterior communication device 12β of the present embodiment, the opposing conductive plate 53 is arranged so as to be electrically deviated from a position concentric with the ground plate 53 in the X-axis direction by 0.04λ. According to the embodiment in which the ground plate offset amount ΔSa is set to 0.04λ, the region within 0.08λ from the edge portion in the X-axis direction is the asymmetrical portion 511 for the opposing conductive plate 53. The asymmetrical portion 511 here refers to a region of the ground plate 51 that is asymmetrical when viewed from the opposing conductive plate 53. The length of the asymmetrical portion 511 (hereinafter referred to as an asymmetrical portion width W) may be properly modified. The asymmetric portion width W may be set to, for example 0.1λ, 0.125λ, 0.25λ or 0.5λ. The asymmetric portion width W corresponds to twice the value of the ground plate offset amount ΔSa. Therefore, the configuration in which the asymmetric portion width W is 0.25λ corresponds to the configuration in which the ground plate offset amount ΔSa is set to 0.125λ.

Figure 13:
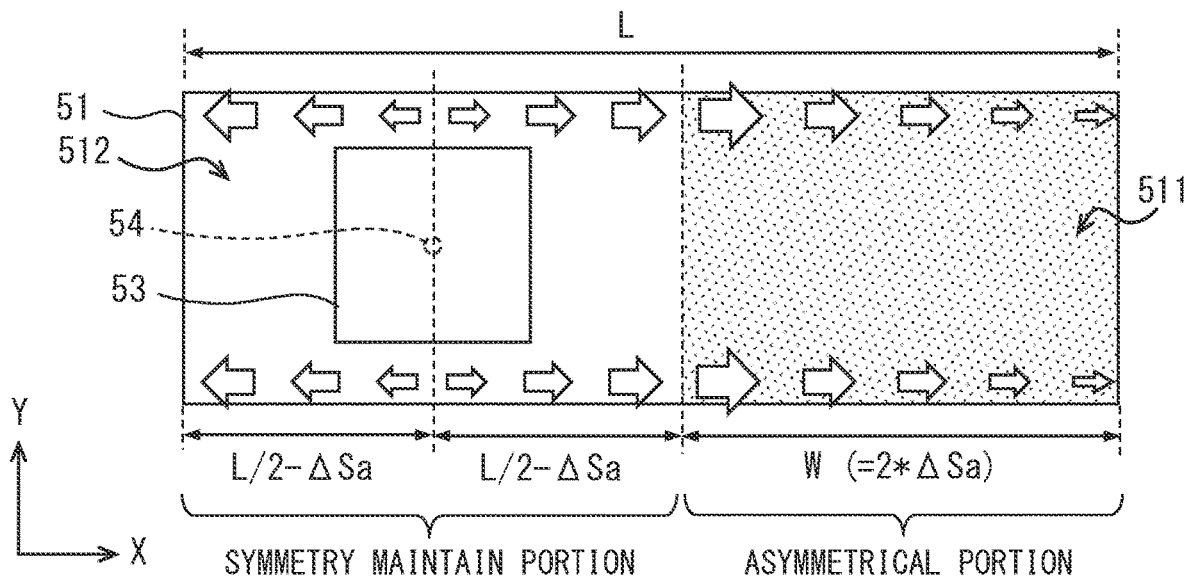
FIG. 13 is a diagram for explaining the operating principle of the ground plate excitation mode.
Figure 14:
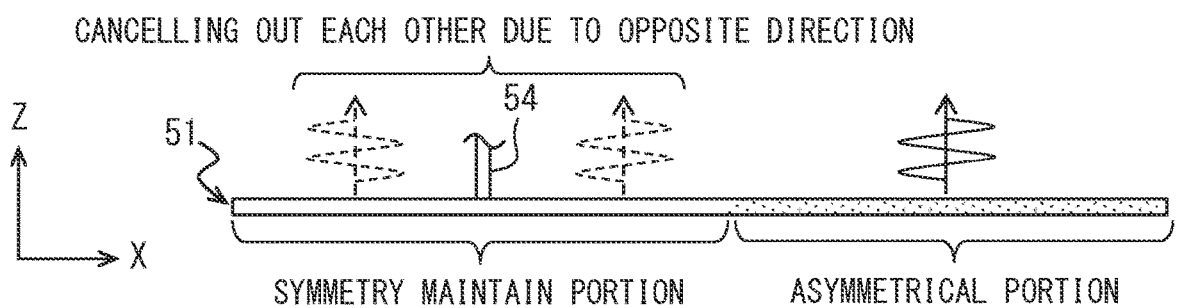
FIG. 14 is a diagram for explaining the operating principle of the ground plate excitation mode.

In FIGS. 13 and 14, the asymmetrical portion 511 is hatched with a dot pattern in order to clearly indicate the region. The maximum region of the ground plate 51 that has symmetry with respect to the opposing conductive plate 53 is also referred to as the symmetry maintain portion 512. The symmetry maintain portion 512 is set to include a part of the edge portion of the ground plate 51. The length of the symmetry maintain portion 512 from the central region to the end portion in the X-axis direction is (L/2−ΔSa). The center of the symmetry maintain portion 512 and the center of the opposing conductive plate 53 coincide with each other in the top view.

FIG. 13 is a diagram conceptually showing the current flowing through the ground plate 51. As a result of the simulation, it has been confirmed that the current flowing through the ground plate 51 due to the LC parallel resonance mainly flows along the edge of the ground plate 51. In FIG. 13, the magnitude of the arrow represents the amplitude of the current. In FIG. 13, the support plate 52 is drawn to be transparent (that is, not shown).

The current that flows from the opposite conductive plate 53 through the short-circuit portion 54 and into the ground plate 51 flows from the short-circuit portion 54 to both ends of the ground plate 51 in the X-axis direction. The short-circuit portion 54, which serves as the entrance and exit of the current for the ground plate 51, is provided at the center of the symmetry maintain portion 512 in the longitudinal direction. Therefore, in the symmetry maintain portion 512, the currents flowing from the short-circuit portion 54 toward both ends in the X-axis direction have opposite directions and the same magnitude. Therefore, the electromagnetic wave generated by the current flowing in a certain direction (for example, the X-axis positive direction) from the center of the symmetry maintain portion 512 is cancelled by the electromagnetic wave formed by the current flowing in the opposite direction (for example, the X-axis negative direction) as shown in FIG. 14. Therefore, the radio wave is not substantially emitted from the symmetry maintain portion 512.

However, the radio wave generated by the current flowing through the asymmetrical portion 511 remains without being canceled. In other words, the edge of the asymmetrical portion 511 functions as a radiating element (actually a linear antenna). The radio waves radiated from the ground plate 51 are linearly polarized waves in which the electric field oscillates in a direction parallel to the ground plate 51 (hereinafter referred to as ground plate horizontally polarized waves). Specifically, the radio wave radiated from the ground plate 51 is linearly polarized (hereinafter, X-axis parallel polarized wave) in which the vibration direction of the electric field is parallel to the X-axis. The ground plate horizontally polarized wave is radiated in a direction orthogonal to the X axis. That is, the ground plate horizontally polarized wave is also radiated in the upward direction (hereinafter, a direction perpendicular to the ground plate) for the vehicle exterior communication device 12β.

Figure 15:
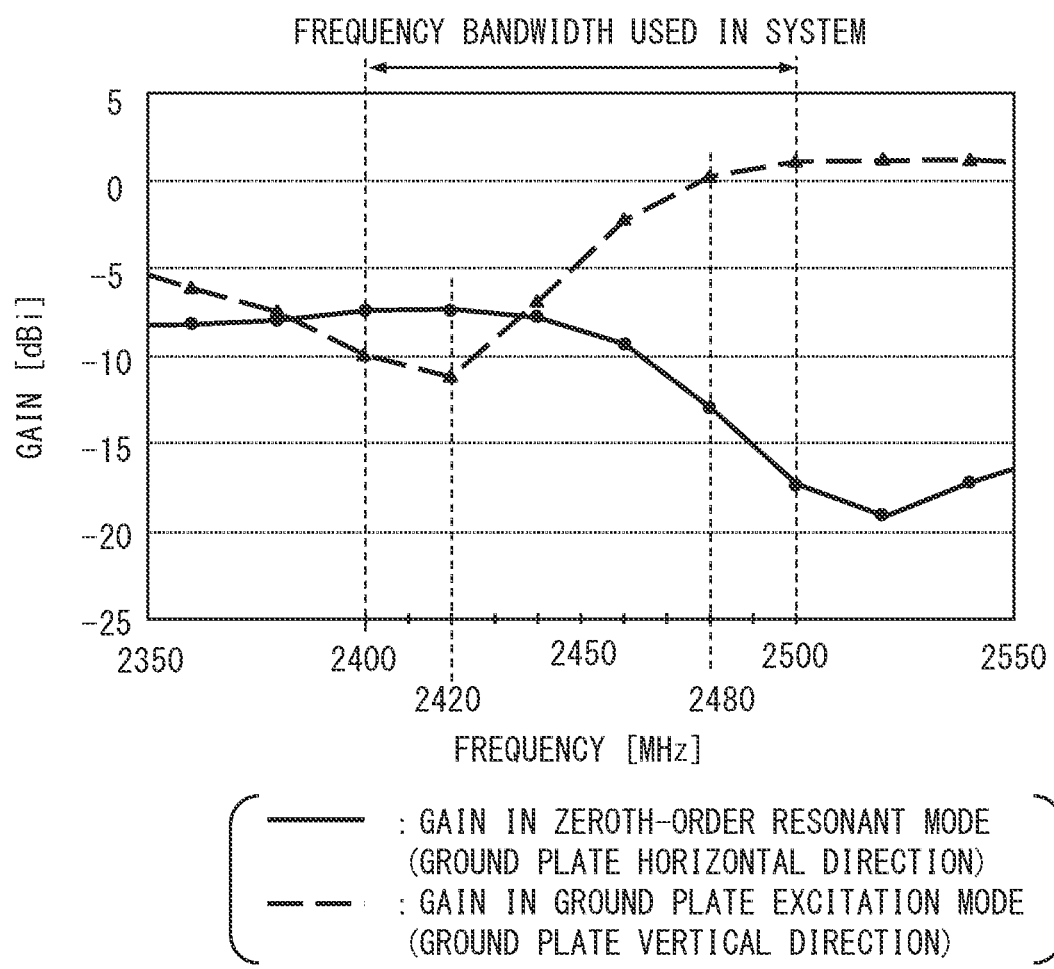
FIG. 15 illustrates an example of the frequency characteristics of gain in each mode.

Hereinafter, the operation mode using the linear current flowing through the edge of the asymmetrical portion 511 of the ground plate 51 is referred to as the ground plate excitation mode. The ground plate excitation mode corresponds to an operation mode in which linearly polarized waves whose electric field vibrates in the direction in which the asymmetric portion 511 and the symmetry maintain portion 512 are connected (here, the X-axis direction) are radiated in the direction perpendicular to the edge portion. The vehicle exterior communication device 12β as the ground plate excitation mode corresponds to a current-based antenna that radiates radio waves by an induced current. When the vehicle exterior communication device 12β is used in a posture parallel to the horizontal plane, the ground plate horizontally polarized wave corresponds to the linearly polarized wave (that is, the horizontal polarized wave) in which the electric field vibration direction is parallel to the ground. FIG. 15 illustrates a result of simulating the radiation characteristics of the vehicle exterior communication device 12β in which the electric length of the ground plate offset amount ΔSa is set to 0.05λ in the ground plate excitation mode.

The vehicle exterior communication device 12β in the present embodiment has the above structure to operate the zeroth-order resonance mode for forming a beam in the direction parallel to the ground plate and the ground plate excitation mode for forming a beam in the direction perpendicular to the ground plate simultaneously. Along with this situation, the ratio of the gain in the direction perpendicular to the ground plate to the gain in the direction parallel to the ground plate varies according to the asymmetric portion width W. The asymmetric portion width W may be appropriately adjusted so that a desired gain ratio can be obtained. The ratio of the gain in the ground plate perpendicular direction to the gain in the ground plate parallel direction may be affected by not only the width W of the asymmetric portion, but also the separation between the ground plate 51 and the metal (for example, B pillars 42B) existing at the rear surface of the vehicle exterior communication device 12β. In the present embodiment, the asymmetric portion width W is adjusted to a value at which the gain in the ground plate excitation mode is dominant over the gain in the zeroth-order resonance mode at a predetermined second frequency. The second frequency is a frequency different from the first frequency and is the frequency band adopted in the system. For example, the second frequency is 2480 MHz. As another aspect, the second frequency may be set to an advertising channel such as 2402 MHz, 2426 MHz, or 2450 MHz.

It may be preferable that the first frequency and the second frequency are separated from each other by 20 MHz or more, for example 10 channels or more. When it is necessary to distinguish between the wavelength of the radio wave of the second frequency and the target wavelength in the following, the wavelength of the radio wave of the second frequency may be also referred to as "λ2" in the following. However, the difference between λ2 and λ in air is about 1.5 mm, and the difference may be neglected in this embodiment. The fractional bandwidth of the frequency band adopted in the system is less than 25% (specifically, about 3.3%). The first frequency and the second frequency correspond to frequencies in which the distance in the frequency domain is less than a quarter of the center frequency (actually 3.3% or less). The positioning system of the present disclosure corresponds to a positioning system applicable to a wireless communication system in which the fractional bandwidth is set to be less than 25% such as 5% or 10% of the center frequency.

FIG. 15 shows the result of simulating the radiation gain in each operation mode for each frequency when the ground plate offset amount ΔSa is set to an arbitrary value (for example, 0.08λ). The above-mentioned first frequency corresponds to a frequency in which the gain in the zeroth-order resonance mode predominates over the gain in the ground plate excitation mode. The above-mentioned second frequency corresponds to a frequency in which the gain in the zeroth-order resonance mode predominates over the gain in the ground plate excitation mode. In other words, the first frequency corresponds to the frequency at which the antenna 121 mainly operates in the zeroth-order resonance mode, and the second frequency corresponds to the frequency at which the antenna 121 mainly operates in the ground plate excitation mode.

Figure 16:
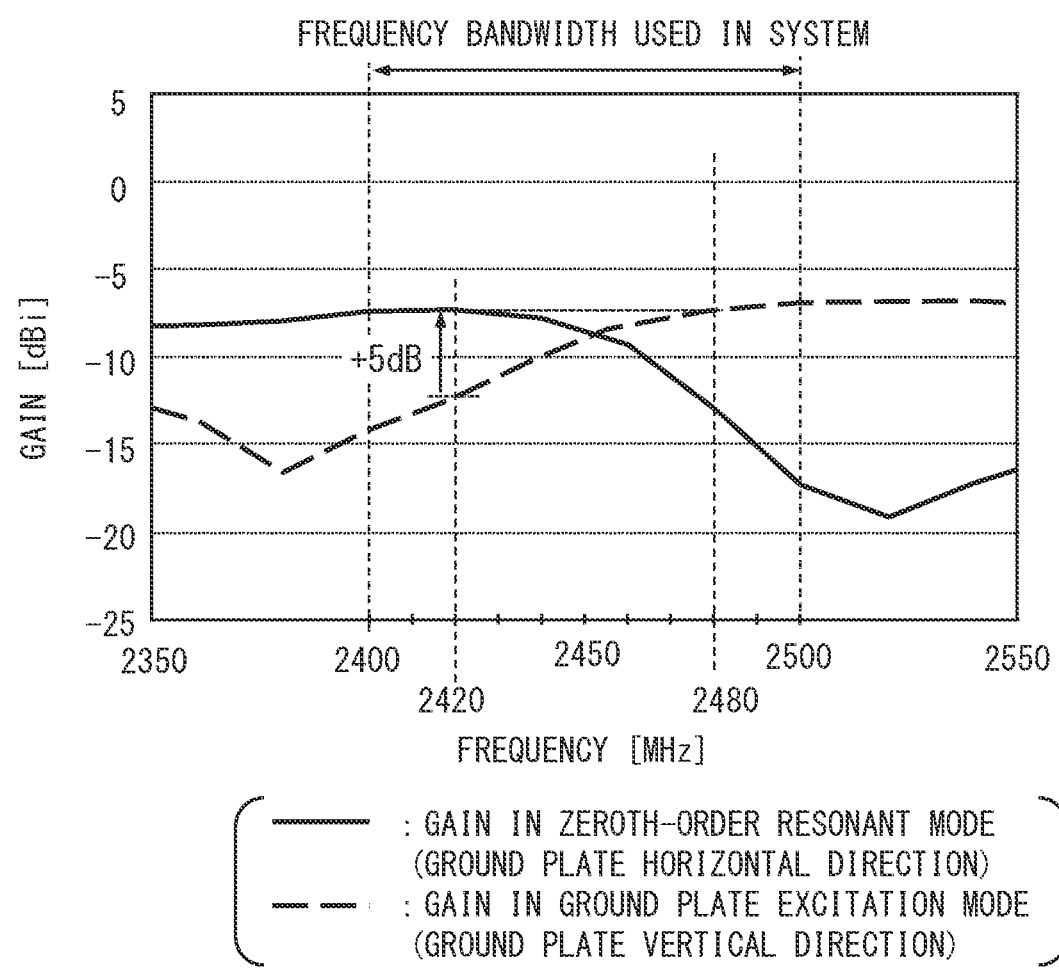
FIG. 16 illustrates an example of the frequency characteristics of gain in each mode.

FIG. 15 illustrates an example such that the gain in the zeroth-order resonance mode at the first frequency is larger than the gain in the ground plate excitation mode at the second frequency. However, it is not limited to this example. Since the operation principle of the zeroth-order resonance mode and the ground plate excitation mode are different, the respective resonance frequencies are determined independently. For example, the frequency characteristics of the ground plate excitation mode may be modified by adjusting separation between the ground plate 51 and the metal located at the rear surface or the asymmetric portion width W. The frequency characteristics in the zeroth-order resonance mode may also be modified by adjusting the area of the opposing conductive plate 53 or the diameter of the short-circuit portion 54. For example, as illustrated in FIG. 16, the gain in the zeroth-order resonance mode at the first frequency and the gain in the ground plate excitation mode at the second frequency may be made aligned. It is also possible to align the peak value of the gain in the ground plate excitation mode and the peak value in the zeroth-order resonance mode in the frequency band adopted in the system. The vehicle exterior antenna 121β may operate in the zeroth-order resonance mode at a side lower than a predetermined conversion frequency, and may operate in the ground plate excitation mode at a side higher than the conversion frequency. However, it may have the opposite radiation characteristics.

Additionally, the first frequency and the second frequency may be determined by back calculation of the frequency characteristics of each of the operation modes of the antenna 121. The second frequency may be set to a frequency in which the gain in the ground plate excitation mode is predominant over the gain in the zeroth-order resonance mode, and the same gain as the gain in the zeroth-order resonance mode at the first frequency may be obtained. In the present embodiment, for example, the first frequency is set to a frequency such that the gain in the zeroth-order resonance mode is 3 dB or more (for example, about 5 dB) than the gain in the ground plate excitation mode. The second frequency is set to a frequency in which the gain in the ground plate excitation mode is predominant over the gain in the zeroth-order resonance mode, and the same gain as the gain in the zeroth-order resonance mode at the first frequency may be obtained. The zeroth-order resonance mode corresponds to a first mode, and the ground plate excitation mode corresponds to a second mode. The first mode may include a state in which the zeroth-order resonance mode and the ground plate excitation mode coexist while the antenna 121 mainly or substantially operates in the zeroth-order resonance mode based on the relation of the difference in their gains. For example, the state in which the gain in the zeroth-order resonance mode is 3 dB or higher than the gain in the ground plate resonance mode also corresponds to the first mode. The above idea may also be applied to the second mode.

Further, the operation when the vehicle exterior communication device 12β transmits (i.e., radiates) radio waves and the operation when receiving radio waves have reversibility with each other. That is, according to the vehicle exterior communication device 12β, the ground plate vertically polarized wave arriving in the direction parallel to the ground plate can be received, and the ground plate horizontally polarized wave arriving in the direction perpendicular to the ground plate can be also received.

As described above, the vehicle exterior communication device 12β receives the ground plate vertically polarized wave in all of the direction parallel to the ground plate by operating in the zeroth-order resonance mode. At the same time, the exterior communication device 12 operates in the ground plate excitation mode, so that the ground plate horizontally polarized wave can be transmitted and received in the vertical direction of the ground. The vehicle exterior communication device 12β can transmit and receive radio waves having different planes of polarization in directions orthogonal to each other. Hereinafter, the antenna having the above structure may also be referred to as a ground plate extension zeroth-order antenna.

(Installation Position, Installation Posture, and Function of Vehicle Exterior Communication Device 12β)

The left exterior communication device 12 is the in-vehicle communication device 12 for bringing the periphery of the door for the front seat (hereinafter, referred to as a front left door) provided on the left side of the vehicle Hv into the strong electric field area. In this example, since the driver's seat is disposed on the left side of the vehicle Hv, the front left door corresponds to the driver's seat door.

Figure 17:
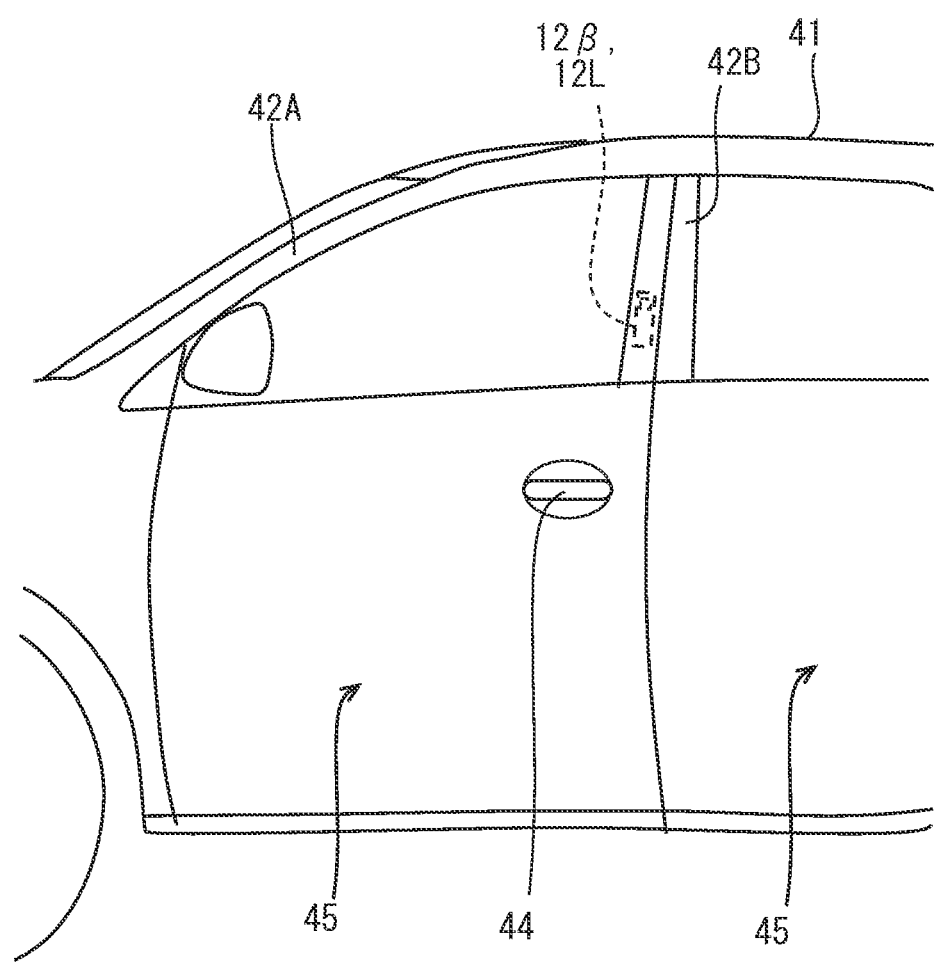
FIG. 17 illustrates an example of an installation position and an installation posture of a left exterior communication device.

As illustrated in FIG. 17, the left exterior communication device 12L is installed at the outer surface of the B pillar 42B disposed at the left side of the vehicle in a posture such that the ground plate 51 faces the surface of the B pillar 42B and the X-axis direction is along the longitudinal direction of the B pillar 42B. In other words, the left exterior communication device is installed in a posture such that the ground plate 51 faces the outer surface portion, for example, the surface of the B pillar 42 outside the compartment. Alternatively, the left exterior communication device 12L may be attached to have the above described posture on an inside portion of the door panel that overlaps with the B pillar 42B in the door module 45. The mode in which the ground plate 51 is installed to face the outer surface portion includes a state where the ground plate 51 is substantially parallel to the side surface portion of the vehicle. The installation posture may include the configuration in which the ground plate 51 is installed along the outer surface portion of the vehicle.

Figure 18A:
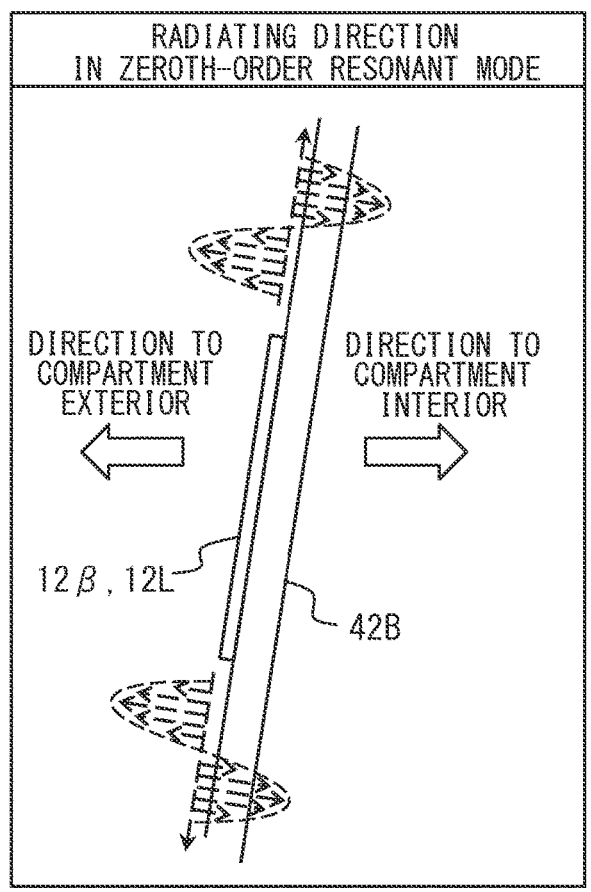
FIG. 18A illustrates the directivity and polarized wave in a zeroth-order resonant mode of the vehicle exterior communication device as a lateral communication device.
Figure 18B:
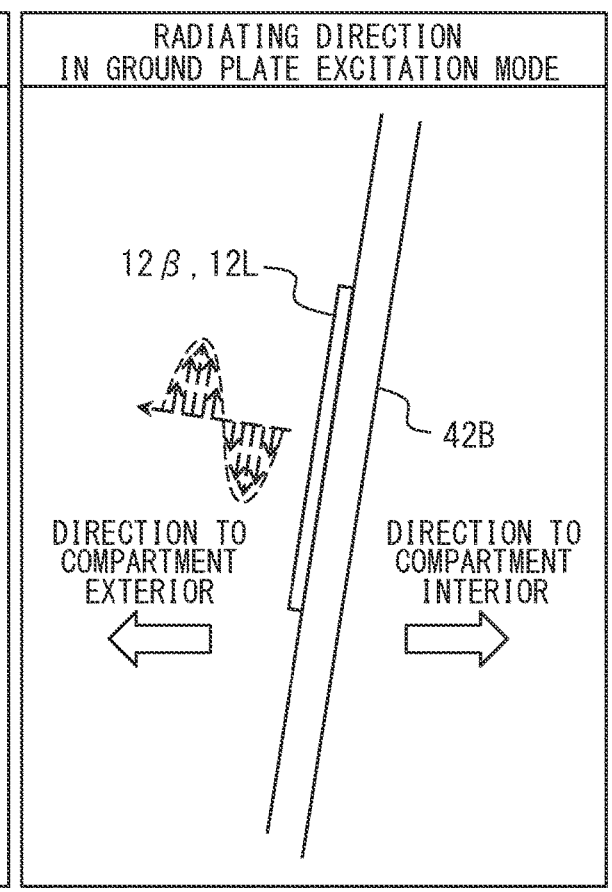
FIG. 18B illustrates the directivity and polarized wave in a ground plate excitation mode of the vehicle exterior communication device as a lateral communication device.

According to the installation posture, the direction perpendicular to the ground plate for the vehicle exterior communication device 12β is directed to a direction perpendicular to the side surface portion of the vehicle. The direction parallel to the ground plate is a direction along the side surface portion of the vehicle, in other words, a direction parallel to the side surface portion of the vehicle. In other words, as illustrated in FIG. 18A, the left exterior communication device 12L is installed in a posture such that the center of the directivity provided by the zeroth-order resonance mode is parallel to the side surface portion, in particular, the door panel and the center of the directivity provided by the ground plate excitation mode is perpendicular to the side surface portion. As illustrated in FIG. 18A, the electrical field vibration direction, in other words, the polarized plane of the linearly polarized wave radiated by the zeroth-order resonance mode is perpendicular to the side surface portion of the vehicle. As illustrated in FIG. 18B, The electrical field vibration direction of the linearly polarized wave radiated to the direction of compartment exterior in the ground plate excitation mode is parallel to the side surface portion of the vehicle.

The perpendicular may not be limited to a situation of exactly perpendicular, and may be tilted by about 30°. That is, perpendicular may also include a situation of substantially perpendicular. Similarly, expressions such as parallel and opposite also include a state of being tilted by about 30°. In the following, the direction perpendicular to the side surface portion of the vehicle and the direction moving away from the side surface portion of the vehicle may also be referred to as the direction to compartment exterior. According to other aspects, the direction to the compartment exterior corresponds to a direction parallel to the vehicular width direction and the direction moving away from the side surface portion of the vehicle.

Figure 19:
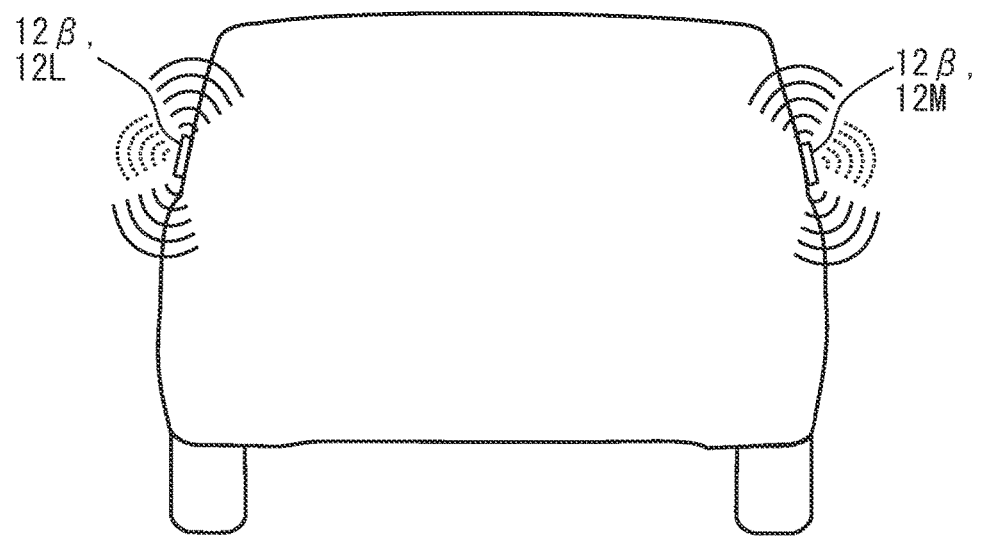
FIG. 19 illustrates radiation characteristics of the exterior communication device as the lateral communication device.
Figure 19:
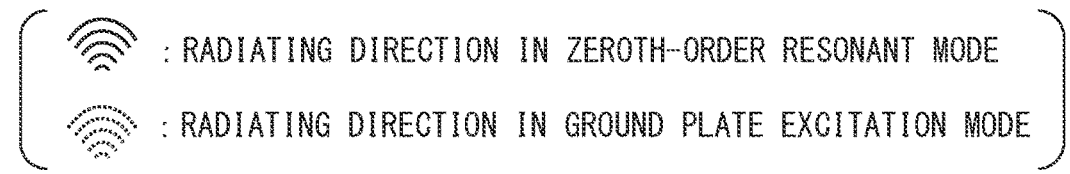

According to the installation posture and the installation position, as shown in FIG. 19, directivity can be formed in both the direction parallel to the vehicle side surface portion and the direction to the compartment exterior. The gain in the vehicular width direction is derived from the asymmetric portion width W. By adjusting the asymmetrical portion width W, it is possible to limit the substantial communication range of the vehicle exterior communication device 12β within 2 meters. As a result, the communication area in a substantially ellipsoidal shape having the vehicular width direction as the lateral direction may be formed at the side of the vehicle Hv, in other words, near the B pillar. According to the above installation mode, it is possible to further reduce the entering amount of radio waves radiated in the ground plate excitation mode into the vehicle compartment, since the B pillar 42B made of metal functions as the ground plate or reflection plate for the antenna 121 operating in the ground plate excitation mode.

According to the above installation position and the installation posture, as illustrated in FIG. 18A, the linearly polarized wave radiated by the left exterior communication device 12L in the zeroth-order resonance mode propagates along the metal plate provided for the side surface portion of the vehicle. The radio wave whose electrical field vibration direction is perpendicular to the metal plate has a property of propagating along the metal plate. Therefore, the radio wave radiated in the zeroth-order resonance mode propagates in the exterior operating area from the upper end to the lower end and maintains at a relatively strong level. The radio waves radiated in the zeroth-order resonance mode wrap around to some extent in the vehicle compartment through the edge of the side window.

Figure 20:
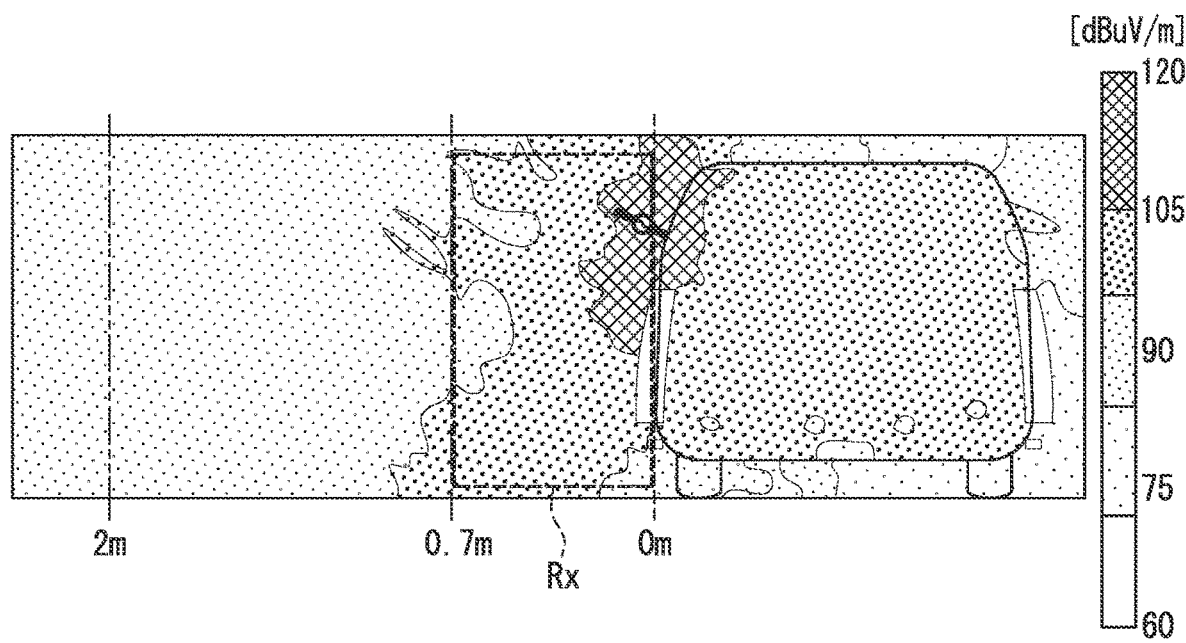
FIG. 20 illustrates the electrical field strength distribution when the left exterior communication device operates in the zeroth-order resonance mode.

As a result, according to the zeroth-order resonance mode, as illustrated in FIG. 20, it is possible to set almost the entire region of the exterior operating area Rx to the strong electrical field area. Since the electrical field perpendicular to the B pillar 42B easily wraps around the vehicle compartment, the electrical field strength inside the vehicle compartment is also at a relatively high level. The electrical field strength and the reception strength of the transmitted signal are different physical quantities. However, due to the reversibility of transmission and reception, these physical quantities are in a proportional relationship and can be adopted as alternative characteristics. The electrical field strength shown in FIG. 20 indicates the maximum value of the respective electrical field strengths of three channels at 2402 MHz, 2442 MHz, and 2480 MHz. FIG. 20 indicates a simulation result of an electrical field distribution in a case where a dipole antenna is installed perpendicular to the B pillar 42B, in other words, in a posture substantially along the vehicular width direction. It has been confirmed by the simulation such that the propagation mode of the radio wave radiated by the vehicle exterior communication device 12β installed at the above position and posture in the zeroth-order resonance mode is almost identical to a case in which the dipole antenna is installed in a posture perpendicular to the B pillar 42B. Therefore, FIG. 20 can be regarded as a diagram showing the radiation characteristics when the left and right exterior communication devices 12β are operated in the zeroth-order resonance mode.

Figure 21:
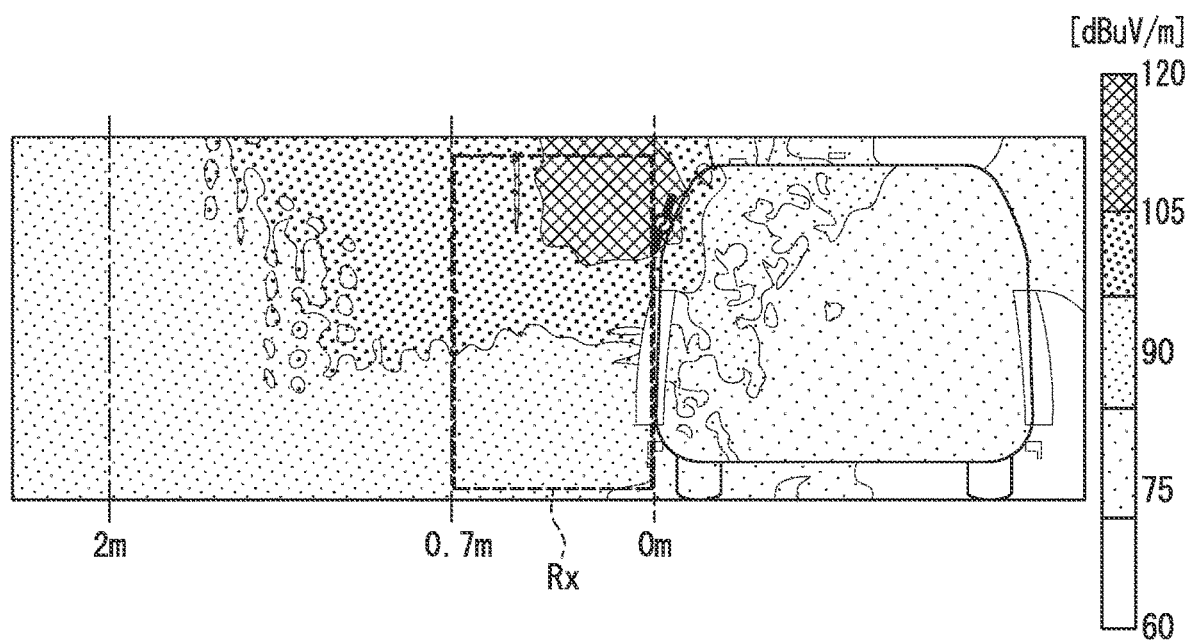
FIG. 21 illustrates the electrical field strength distribution when the left exterior communication device operates in the ground plate excitation resonance mode.

The linearly polarized wave radiated by the left exterior left communication device 12L in the ground plate excitation mode in the direction to the compartment exterior is easily launched in the direction to the compartment exterior through the reflection at the metal portion of the vehicle, for example, the door panel. The radio wave whose electrical field vibration direction is parallel to the metal plate has a property of being easily repelled by the metal plate. Therefore, the radio waves radiated in the ground plate excitation mode are difficult to enter the vehicle compartment. As a result, as shown in FIG. 21, the electric field strength inside the vehicle compartment can be suppressed to a relatively low level. FIG. 21 indicates a simulation result of an electrical field distribution in a case where a dipole antenna is installed along the longitudinal direction of the B pillar 42B, in other words, in a posture substantially along the vehicular height direction. It has been confirmed by the simulation such that the propagation mode of the radio wave radiated by the vehicle exterior communication device 12β installed at the above position and posture in the ground plate excitation mode is almost identical to a case in which the dipole antenna is installed in a posture along the B pillar 42B. The operation principle of the ground plate excitation mode is similar to a pole-type antenna such as a dipole antenna or monopole antenna. Therefore, FIG. 21 can be regarded as a diagram showing the radiation characteristics when the left and right exterior communication devices 12β are operated in the ground plate excitation mode. The dipole antenna has a donut-shaped radiation directivity (a figure "8"-shaped characteristic) toward the axis of the radiation element. Therefore, in a case where the dipole antenna is installed in a posture along the vehicular height direction, the electrical field strength at the lower half of the exterior operating area Rx is at a low level. The lower half of the exterior operating area Rx corresponds to a region where the user's torso to legs are located.

The right exterior communication device 12M is an in-vehicle communication device 12 for bringing the periphery of the door for the front seat (hereinafter, referred to as a front right door) provided on the right side of the vehicle Hv into the strong electric field area. In this example, since the driver assistant's seat is disposed on the right side of the vehicle Hv, the front right door corresponds to the driver assistant's seat door.

The right exterior communication device 12M at the right surface portion of the vehicle Hv is disposed at a position opposite to the left exterior communication device 12L. The right exterior communication device 12M corresponds an in-vehicle communication device 12 paired with the left exterior communication device 12L. The right exterior communication device 12M is installed at the outer surface of the B pillar 42B disposed at the right side of the vehicle in a posture such that the ground plate 51 faces the surface of the B pillar 42B and the X-axis direction is along the longitudinal direction of the B pillar 42B.

The rear exterior communication device 12M is the in-vehicle communication device 12 for a strong electric field in the vicinity of the trunk door. The rear exterior communication device 12M is disposed at a central portion of the rear end portion of the vehicle in the vehicular width direction. For example, it is possible to adopt the door handle for the trunk, the vicinity of a license plate, the interior portion or a lower edge portion of a rear bumper, or an upper edge portion of the rear bumper as the installation position of the rear exterior communication device 12N. For example, the rear exterior communication device 12N is stored inside the outer door handle for the trunk in a posture where the X-axis is along the vehicular width direction and the Z-axis faces the rear side of the vehicle.

According to the installation posture, it is possible to form the directivity in both of the direction along the rear surface portion of the vehicle and the direction perpendicular to the rear surface portion of the vehicle. As a result, the communication area in a substantially oblong ellipsoidal shape having the rear exterior communication device 12N as the center and the vehicular direction as the longitudinal direction is formed. The direction along the rear surface portion of the vehicle includes the vehicular width direction or the height direction. The direction perpendicular to the rear portion of the vehicle corresponds to the rear of the vehicle. Since the gain for the rear of the vehicle is derived from the asymmetric width portion W, it is possible to limit the substantial communication range of the rear exterior communication device 12N for the rear of the vehicle within 2 meters form the rear end portion of the vehicle.

With regard to the vehicle exterior communication device 12β, the in-vehicle communication device 12 disposed at the left side surface portion and the right side surface portion such as the left exterior communication device 12L and the right exterior communication device 12M may also be referred to as a side communication device. The number of vehicle exterior communication devices 12β included in the in-vehicle system 1 can be properly changed. The number of vehicle exterior communication devices 12β may be two, three, or four. The number of vehicle exterior communication devices 12β included in the in-vehicle system 1 may be five or more.

Both the vehicle interior communication device 12α and the vehicle exterior communication device 12β are configured to mainly report the reception strength of the signal from the portable terminal 2 to the smart ECU 11. Therefore, hereinafter, various types of the vehicle interior communication device 12α and the vehicle exterior communication device 12β are also referred to as strength observation devices. Each of the strength observation devices provides the reception strength of the signal transmitted from the portable terminal 2 along with the channel number of the reception signal and the transmission source of the reception signal to the smart ECU 11.

(Function of Smart ECU 11)

Figure 22:
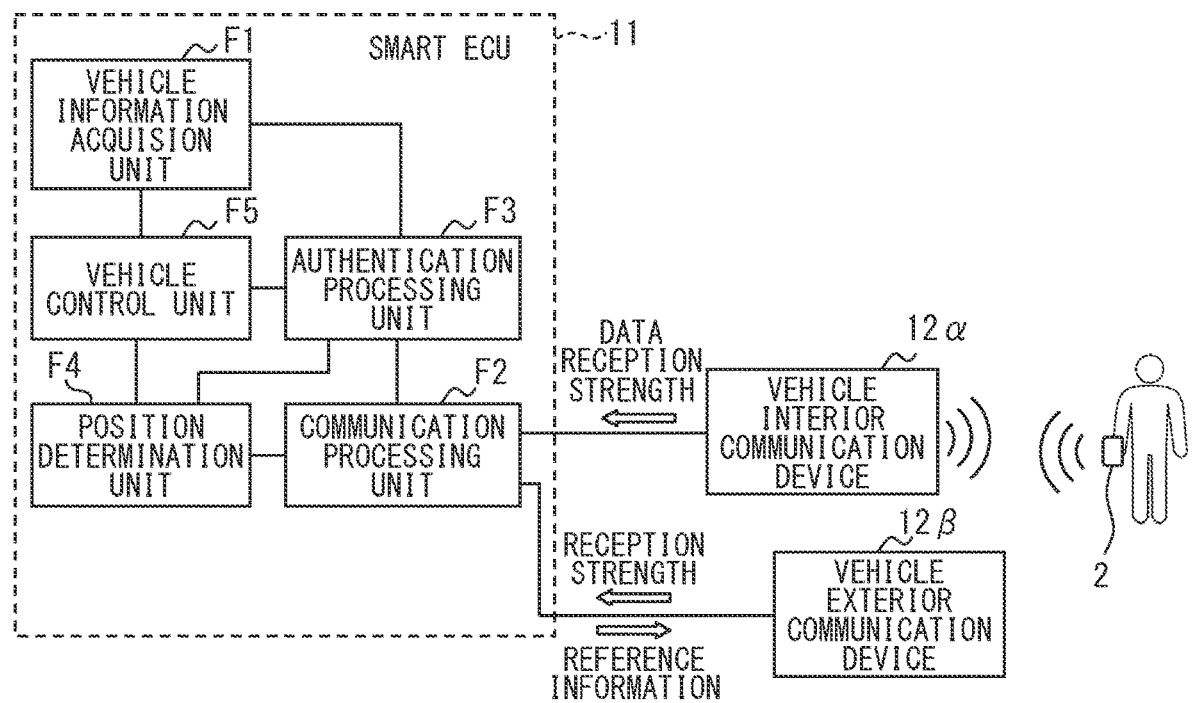
FIG. 22 illustrates the function of a smart ECU.

The smart ECU 11 executes the position determination programs described above to provide functions corresponding to various functional blocks shown in FIG. 22. In other words, the smart ECU 11 includes, as functional blocks, a vehicle information acquisition unit F1, a communication processing unit F2, an authentication processing unit F3, a position determination unit F4, and a vehicle control unit F5. A position determination unit F4 may also be referred to as a positioning device.

The vehicle information acquisition unit F1 acquires various pieces of information indicating the state of the vehicle Hv (hereinafter, referred to as vehicle information) from sensors, ECUs (for example, body ECU 16), switches, and the like mounted on the vehicle Hv. The vehicle information includes, for example, an open/closed state of the door, a locked/unlocked state of each door, whether or not the door button 13 is pressed, whether or not the start button 14 is pressed, and the like. The vehicle information acquisition unit F1 identifies a current state of the vehicle Hv based on the various information described above. For example, when the engine is off and all the doors are locked, the vehicle information acquisition unit F11 determines that the vehicle Hv is parked. It is needless to say that the condition for determining that the vehicle Hv is parked may be designed as appropriate, and various determination conditions and the like can be applied.

The acquisition of the information indicating the locked/unlocked state of each door corresponds to the determination of the locked/unlocked state of each door and the detection of the locking operation/unlocking operation of the door by the user. The acquisition of electric signals from the door button 13 and the start button 14 corresponds to detection of the user operation on those buttons. The vehicle information acquired by the vehicle information acquisition unit F1 includes the user operation on the vehicle Hv. In addition, the types of information included in the vehicle information are not limited to the examples described above. The vehicle information also includes, for example, a shift position detected by a shift position sensor (not shown), a detection result of a brake sensor for detecting whether or not a brake pedal is pressed, and the operating state of a parking brake.

The communication processing unit F2 is configured to perform transmission and reception of data to and from the portable terminal 2 in cooperation with the in-vehicle communication device 12 (hereinafter referred to as the vehicle interior communication device 12α) as the data communication device. For example, the communication processing unit F2 generates data addressed to the portable terminal 2, and outputs the data to the vehicle interior communication device 12α. As a result, the communication processing unit F2 transmits a signal corresponding to desired data as a radio wave. In addition, the communication processing unit F12 receives data from the portable terminal 2 received by the vehicle interior communication device 12α. In the present embodiment, for example, the wireless communication between the smart ECU 11 and the portable terminal 2 is configured to be executed in an encrypted manner. In the present embodiment, the smart ECU 11 and the portable terminal 2 encrypt and perform a data communication for authentication or the like in order to improve security. However, it is not limited to this. As another aspect, the smart ECU 11 and the portable terminal 2 may perform the data communication without encryption.

The communication processing unit F2 recognizes that the user is present in the vicinity of the vehicle Hv based on the establishment of the communication connection with the portable terminal 2 and the vehicle interior communication device 12α. Further, the communication processing unit F2 acquires the terminal ID of the communicably connected portable terminal 2 from the vehicle interior communication device 12α. According to such a configuration, even when the vehicle Hv is a vehicle shared by multiple users, the smart ECU 11 can specify a user who is present in the vicinity of the vehicle Hv based on the terminal ID of the portable terminal 2 to which the vehicle interior communication device 12α is communicatively connected.

The smart ECU 11 as the communication processing unit F2 acquires channel information from the vehicle interior communication device 12α. As a result, the smart ECU 11 specifies a channel used by the vehicle interior communication device 12α for a communication with the portable terminal 2. In addition, the communication processing unit F12 distributes the channel information and the terminal ID acquired from the vehicle interior communication device 12α to each of the strength observation devices as reference information. The channel information shown in the reference information enables each strength observation device to recognize the channel to be received among the many channels included in the Bluetooth standard in order to receive the signal from the portable terminal 2. Even when the strength observation device receives signals from the multiple devices, the strength observation device can specify which device should report the reception strength of the signal to the smart ECU 11, based on the terminal ID indicated in the reference information.

The authentication processing unit F3 executes a process of confirming that the communication partner is the portable terminal 2 of the user (in other words, authenticating the portable terminal 2) in cooperation with vehicle interior communication device 12α. The communication for authentication is performed in the encrypted manner via the vehicle interior communication device 12α. In other words, the authentication process is performed by a cryptographic communication. The authentication process itself may be performed by use of various methods such as a challenge-response method. A detailed description of the authentication process will be omitted in this example. It is assumed that data (for example, encryption key) required for the authentication process is stored in each of the portable terminal 2 and the smart ECU 11. A timing at which the authentication processing unit F3 performs the authentication process may be, for example, a timing at which the communication connection between the vehicle interior communication device 12α and the portable terminal 2 is established. The authentication processing unit F3 may be configured to perform the authentication process at a predetermined cycle while the vehicle interior communication device 12α and the portable terminal 2 are in communication connection. The authentication processing unit F13 may be configured such that a cryptographic communication for the authentication process is performed by using a predetermined user operation on the vehicle Hv as a trigger, for example, when the start button 14 is pressed by the user.

In the Bluetooth standard, the communication connection between the vehicle interior communication device 12α and the portable terminal 2 is established means that a communication partner of the vehicle interior communication device 12α is the portable terminal 2 registered in advance. Therefore, the smart ECU 11 may be configured to determine that the portable terminal 2 has been successfully authenticated based on the condition that the communication connection between the vehicle interior communication device 12α and the portable terminal 2 has been established.

The position determination unit executes processing for estimating the position of the portable terminal 2 based on the communication status between each of the in-vehicle communication devices 12 and the portable terminal 2. As an example, the position determination unit F4 in the present embodiment determines whether the portable terminal 2 exists inside the vehicle compartment, inside the exterior operating opera Rx or outside the area, based on the reception status and the reception strength of the signal of the portable terminal 2 provided from each of the in-vehicle communication devices 12. The term "outside the area" refers to a region of an area outside the vehicle compartment area as a region outside the exterior operating area Rx. A region outside the area that is at least a predetermined prohibited distance from the outer door handle may be referred to as a prohibiting area. The prohibited distance is set to 2 meters from the viewpoint of theft prevention described hereinafter. Since the portable terminal 2 is basically carried by the user, the determination of the position of the portable terminal 2 corresponds to the determination of the position of the user. The prohibited distance may be, for example, 1.6 meters or 3 meters. The prohibited distance, which defines the magnitude of the prohibiting area, may be appropriately modified according to, for example, a region where the vehicle is used.

As a preparatory process for determining the position of the portable terminal 2, the position determination unit F4 sequentially acquires the reception strengths of the signals from the portable terminal 2 from multiple in-vehicle communication devices 12 respectively as the multiple strength observation devices, and stores the acquired reception strengths in the RAM 113 by distinguishing the acquired reception strengths for each acquisition source. Then, the position determination unit F4 determines whether or not the portable terminal 2 is present in the vehicle compartment based on the reception strength for each strength observation device stored in the RAM 113 and various determination thresholds registered in the flash memory 112. The specific operation of the position determination unit F4, that is, the method of determining the position of the portable terminal 2 based on the reception strength of each strength observation device by the position determination unit F4 will be described in detail later. The determination result of the position determination unit F4 is referred to by the vehicle control unit F5.

The vehicle control unit F5 is configured to execute a vehicle control according to the position of the portable terminal 2 (in other words, the user) and the state of the vehicle Hv in cooperation with the body ECU 16 or the like when the authentication of the portable terminal 2 by the authentication processing unit F3 is successful. The state of the vehicle Hv is determined by the vehicle information acquisition unit F1. The position of the portable terminal 2 is determined by the position determination unit F4.

For example, when the portable terminal 2 is present outside the vehicle compartment and the user presses the door button 13 while the vehicle Hv is parked, the vehicle control unit F15 unlocks the door locking mechanism in cooperation with the body ECU 16. For another example, when the portable terminal 2 is determined to be present in the vehicle compartment by the position determination unit F4 and it is detected that the start button 16 has been pressed by the user, the vehicle control unit F5 starts the engine in cooperation with the engine ECU 15. In such a manner, the vehicle control portion F5 executes a vehicle control according to the position of the user and the state of the vehicle Hv with the user operation on the vehicle Hv as a trigger. However, some vehicle controls that can be executed by the vehicle control unit F5 may be automatically executed according to the position of the user without requiring the user's operation on the vehicle Hv.

(Connection Related Process)

Figure 23:
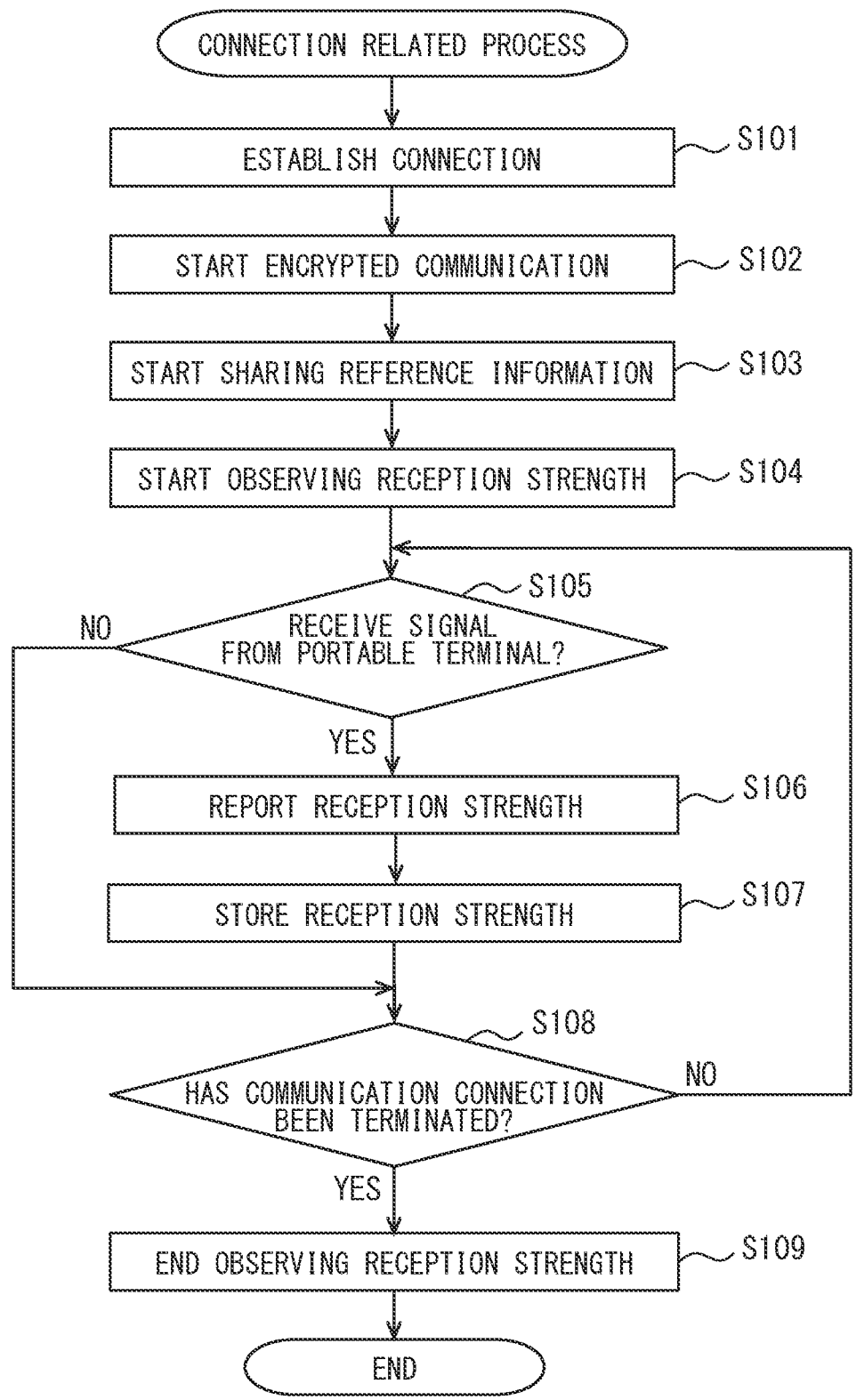
FIG. 23 is a flowchart showing a connection related process.

Next, a connection-related process performed by the in-vehicle system 1 will be described with reference to a flowchart shown in FIG. 23. The connection related process shown in FIG. 23 is related to the establishment of the communication connection between the in-vehicle system 1 and the portable terminal 2. The connection-related process shown in FIG. 19 may be started, for example, when the vehicle interior communication device 12α as a data communication device receives an advertisement packet from the portable terminal 2.

In S101, the vehicle interior communication device 12α establishes a communication connection (in other words, a connection) with the portable terminal 2, and proceeds to S102. When the vehicle interior communication device 12α establishes the communication connection with the portable terminal 2, the vehicle interior communication device 12α provides the terminal ID of the portable terminal 2 which is in a communication connection to the smart ECU 11. Further, in the smart ECU 11, when the strength observation device is in an idle mode at the time when the communication connection with the portable terminal 2 is established, the vehicle interior communication device 12α outputs a predetermined control signal to the strength observation device and shifts to the standby mode. A pause mode is, for example, a state in which the receiving function of a signal is stopped. The pause mode includes a state in which the power is turned off.

In S102, the vehicle interior communication device 12α periodically performs an encrypted communication based on an instruction from the smart ECU 11. The content of the data exchanged at this time may be any content as long as the content requests the portable terminal 2 to transmit a response signal. The data content may be data for authenticating the portable terminal 2, such as a challenge code. The wireless communication with the portable terminal 2 is periodically executed so that the smart ECU 11 can confirm that the portable terminal 2 is present inside the vehicle compartment or around the vehicle.

In S103, the vehicle interior communication device 12α and the smart ECU 11 cooperate with one other to start sharing of the reference information. Specifically, the vehicle interior communication device 12α sequentially provides the terminal ID and the channel information of the portable terminal 2 connected by communication to the smart ECU 11. The smart ECU 11 sequentially distributes the channel information and the terminal ID provided from the vehicle interior communication device 12α to the respective strength observation devices as reference information.

In S104, each strength observation device starts observing of the reception strength of signal from the portable terminal 2 by use of the reference information provided by the smart ECU 11. In other words, the strength observation device sets a channel having a number indicated in the channel information as a reception target among a large number of channels included in the Bluetooth standard. The strength observation device sequentially changes the channel to be received in accordance with the channel information provided from the smart ECU 11.

Even when the portable terminal 2 and the vehicle interior communication device 12α perform the wireless communication of the frequency hopping system with each other, the reception strength of the signal from the portable terminal 2 is acquired, and the reception strength is sequentially reported to the smart ECU 11. That is, the in-vehicle communication devices 12 included in the in-vehicle system 1 can detect the reception strength of a signal transmitted from the portable terminal 2 in a state where the confidentiality (in other words, security) of the communication between the in-vehicle system 1 and the portable terminal 2 is ensured.

In S105, the strength observation device determines whether or not a signal including the terminal ID indicated in the reference information has been received by the strength observation device. When a signal including the terminal ID indicated in the reference information has been received, the process proceeds to S106. In S106, the reception strength of the received signal is reported to the smart ECU 11. In S105 and S106, each strength observation device reports, to the smart ECU 11, the reception strength of the signal including the terminal ID indicated in the reference information in correspondence with the channel number indicating frequency at which the signal is received. If the signal from the portable terminal 2 has not been received for a predetermined period in S105, S108 may be performed.

In S107, the smart ECU 11 executes a process of storing, in the RAM 113, the reception strength provided from each strength observation device by distinguishing the reception strength from one other corresponding to each strength observation device serving as the provider. The reception strength provided from the strength observation device is stored separately for each number channel, in other words, each frequency used for reception. In particular, the smart ECU 11 in the present embodiment classifies the reception intensity for each of the frequencies provided from each of the strength observation devices in the reception strength of the first frequency band and the reception strength of the second frequency band.

The first frequency band is a region in which the vehicle exterior communication device 12β mainly operates in the zeroth-order resonance mode, and refers to a frequency within a certain range around the first frequency. The second frequency band is a region in which the vehicle exterior communication device 12β mainly operates in the ground plate resonance mode, and refers to a frequency within a certain range around the second frequency. In the frequency band adopted in the system, the first frequency band and the second frequency band are set so as not to overlap each other. For example, when the vehicle exterior antenna 121β has the radiation characteristics as illustrated in FIG. 16, it is possible to adopt 2400 MHz to 2440 MHz as the first frequency band. As an example herein, 2402 MHz to 2438 MHz are set as the first frequency band. When the vehicle exterior antenna 121β has the radiation characteristics as illustrated in FIG. 16, it is possible to adopt 2460 MHz to 2500 MHz as the second frequency band. As an example herein, 2460 MHz to 2480 MHz are set as the second frequency band. Additionally, the range in which the gain difference from the first frequency is within ±3 dB in the simulation may be defined as the first frequency band. Similarly, the range in which the gain difference from the second frequency is within ±3 dB in the simulation may be defined as the first frequency band. The respective ranges of the first frequency band and the second frequency band may be properly modified according to the operating characteristics of the antenna 121.

In S108, the smart ECU 11 and the vehicle interior communication device 12α cooperate with one other to determine whether the communication connection with the portable terminal 2 has been terminated. The case in which the communication connection with the portable terminal 2 is terminated is, for example, a case in which the vehicle interior communication device 12α cannot receive a signal from the portable terminal 2. When the communication with the portable terminal 2 is terminated, an affirmative determination is made in S108, and S109 is executed. On the other hand, when the communication with the portable terminal 2 is still maintained, the process returns to S105.

In S109, the smart ECU 11 outputs a predetermined control signal to the strength observation device, and ends observing of the reception strength of the signal transmitted from the portable terminal 2. For example, the smart ECU 11 may cause, for example, the strength observation device to transition to the pause mode. When the process in S109 is completed, the present flow ends.

(Position Determination Process)

Figure 24:
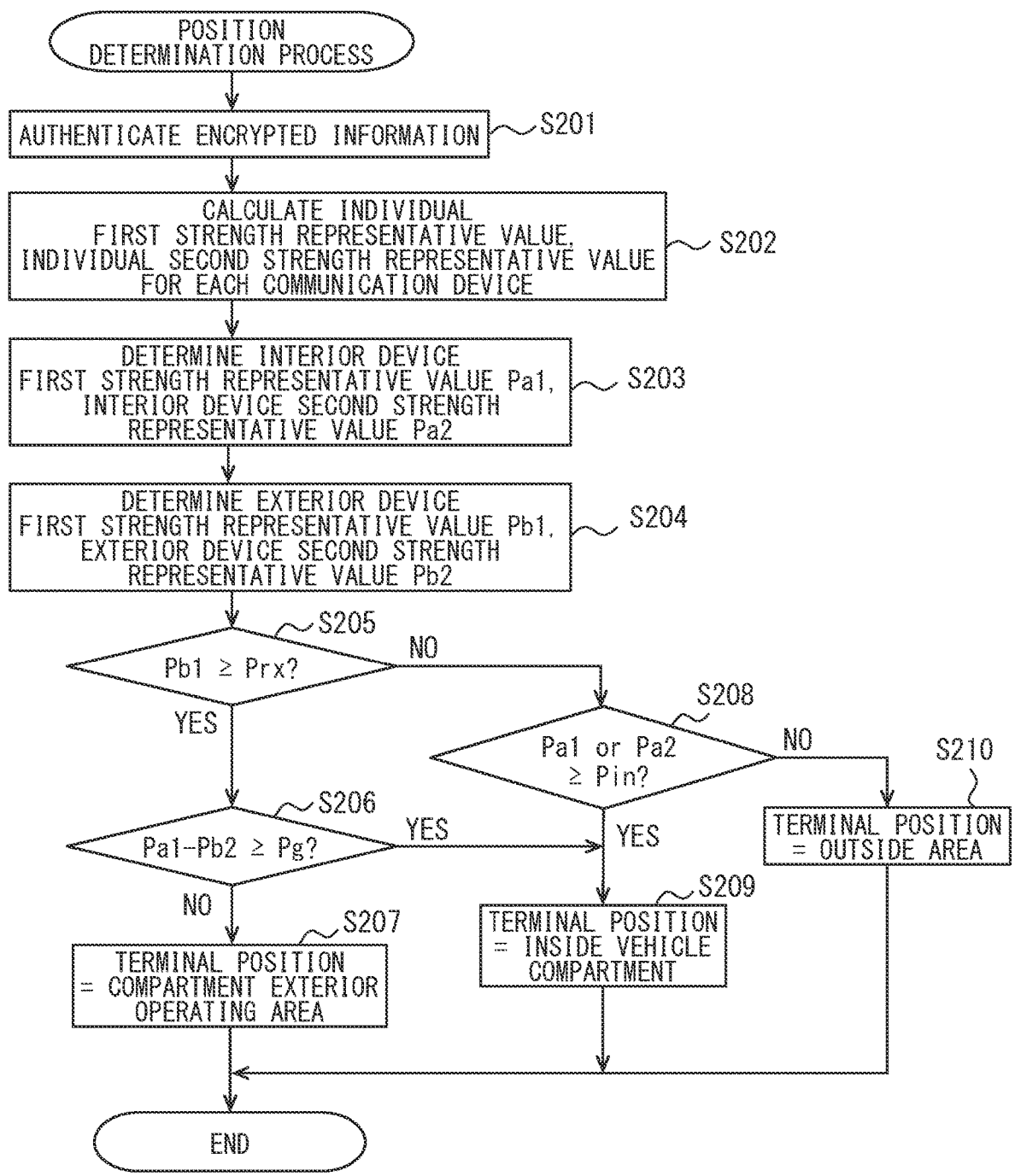
FIG. 24 is a flowchart showing a location determination process.

Next, the position determination process executed by the smart ECU 11 will be described with reference to a flowchart shown in FIG. 24. The position determination process is a process for determining the position of the portable terminal 2. The position determination process is performed, for example, at a predetermined position determination cycle in a state in which the communication connection between the vehicle interior communication device 12α and the portable terminal 2 is established. The position determination cycle is, for example, 200 milliseconds. It is needless to say the position determination cycle may be 100 milliseconds or 300 milliseconds.

In S201, the authentication processing unit F3 executes a process of authenticating the portable terminal 2 in cooperation with the vehicle interior communication device 12α, and proceeds to S202. S201 can be omitted. The authentication process can be appropriately changed according to an authentication time of the portable terminal 2. In S202, the position determination unit F4 calculates the representative value of the reception strength of the signal in the first frequency band and the representative value of the reception strength of the signal in the second frequency band for each of the strength observation devices based the reception strength of each of the strength observation devices stored in the RAM 113. In other words, the representative value of the reception intensity of each of the strength observation devices is calculated for each frequency band.

The representative value for the signal in the first frequency band at the strength observation device is a value representative of the reception strength of the signal in the first frequency band within a last predetermined time in the strength observation device. Hereinafter, the representative value of the reception strength of the signal in the first frequency band at each strength observation device is referred to as an individual first strength. The first frequency band for the vehicle exterior communication device 12β corresponds to the frequency band mainly operated in the zeroth-order resonance mode, in other words, the frequency band dominated by the zeroth-order resonance mode. Therefore, the individual first strength corresponds to the reception strength in the zeroth-order resonance mode for the vehicle exterior communication device 12β.

As an example, the individual first strength is an average value of the respective reception strengths of the signals of last N pieces in the first frequency band. Such an individual first strength corresponds to a moving average value of the reception strengths of the signals in the first frequency band. N may be a natural number of 2 or more, and is 5 in the present embodiment. In this case, the position determination unit F4 calculates the moving average value by use of the reception strength of the signal in the first frequency band transmitted from the portable terminal 2 acquired (in other words, sampled) at the last five points in time. It is needless to say that N may be 10, 20, or the like. As another mode, N may be 1. The configuration in which N=1 corresponds to a configuration in which the latest reception strength is directly adopted as the representative value.

The representative value for the signal in the second frequency band at the strength observation device is a value representative of the reception strength of the signal in the second frequency band within a last predetermined time in the strength observation device. Hereinafter, the representative value of the reception strength of the signal in the second frequency band at each strength observation device is referred to as an individual second strength. The second frequency band for the vehicle exterior communication device 12β corresponds to the frequency band mainly operated in the ground plate excitation mode, in other words, the frequency band dominated by the ground plate excitation mode. Therefore, the individual second strength corresponds to the reception strength in the ground plate excitation mode for the vehicle exterior communication device 12β. The individual second strength may be calculated by the method identical to the one for the individual first strength. In other words, the individual second strength of the strength observation device corresponds to an average value of the reception strengths of the signals in the second frequency band taken from the most recent N pieces at the strength observation device.

Hereinafter, the reception strength of the signal in the first frequency band transmitted from the portable terminal 2 may also be referred to as the first frequency reception strength. Similarly, the reception strength of the signal in the second frequency band transmitted from the portable terminal 2 may also be referred to as the second frequency reception strength.

More specifically, the position determination unit F4 in S202 calculates, as the individual first strength of the vehicle interior communication device 12α, an average value of the first frequency reception strengths with the latest five reception strengths provided from the vehicle interior communication device 12α as a population. As the individual second strength of the vehicle interior communication device 12α, an average value of the second frequency reception strengths with the latest five reception strengths provided from the vehicle interior communication device 12α as a population. In a situation where multiple vehicle interior communication devices 12α are provided, for each of the vehicle interior communication devices 12α, an average value of the first frequency reception strengths with the latest five first frequency reception strengths provided from the vehicle interior communication device 12α as a population. The same applies to the individual second strength. The position determination unit F4 in S202 calculates, also for the individual first strength of the vehicle exterior communication device 12β, an average value of the first and second frequency reception strengths with the latest five first and second reception strengths provided from the vehicle interior communication device 12β as a population, as similar to the vehicle interior communication device 12α.

The individual first strength of the strength observation device in which the number of first reception strengths stored in the RAM 113 is less than N may be calculated by adding a value corresponding to a lower limit value of the reception strength detectable by the in-vehicle communication device 12 as the missed reception strength representative value. For example, the lower limit value of the reception strength detectable by the in-vehicle communication device 12 may be determined by the configuration of the in-vehicle communication device 12. For example, the lower limit may be set to −60 dBm or the like. The same applies to the individual second strength.

According to the above mode, for example, even when only a part of the multiple strength observation devices included in the in-vehicle system 1 can receive the signal from the portable terminal 2 due to the position of the portable terminal 2, a subsequent process can be performed. For example, even when the right exterior communication device 12M cannot receive the signal from the portable terminal 2 because the portable terminal 2 is present on the right side of the vehicle Hv, the individual first and second strengths for the respective strength observation devices can be calculated.

In the present embodiment, the average value of the last N first frequency reception strengths is used as the individual first strength, but the present disclosure is not limited to the above example. The individual first strength may be a median value or a maximum value of the last N first frequency reception strengths. The individual first strength may be an average value of the reception strengths obtained by removing the maximum value and the minimum value from the last N reception strengths. The individual first strength is preferably a value obtained by removing a variation component of the instantaneous reception strength. The same applies to the individual second strength. When the process in S202 is completed, the process proceeds to S203.

In S203, the position determination unit F4 determines an interior device first strength representative value Pa1 based on the individual first strengths of the respective vehicle interior communication devices $12\alpha$. As an example, since there is only a single vehicle interior communication device $12\alpha$, the individual first strength for one vehicle interior communication device $12\alpha$ is adopted as the interior device first strength representative value Pa1. In S203, the position determination unit F4 determines an interior device second strength representative value Pa2 based on the individual second strengths of the respective vehicle interior communication devices $12\alpha$, as similar to the interior device first strength representative value Pa1. As another aspect, in a situation where there are multiple interior communication devices $12\alpha$, the maximum value of the first strength representative values acquired from the respective interior communication devices $12\alpha$ may be adopted as the interior device first strength representative value Pa1. In a situation where there are multiple interior communication devices $12\alpha$, the interior device first strength representative value Pa1 may be an average value or a median value of the respective first strengths of the vehicle interior communication devices $12\alpha$. The same applies to the interior device second strength representative value Pa2. In a situation where the interior device first strength representative value Pa1 and the interior device second strength representative value Pa2 are not distinguished, both of them are referred to as an interior device strength representative value.

In S204, the position determination unit F4 determines an exterior device first strength representative value Pb1 based on the individual first strengths of the vehicle exterior communication devices $12\beta$. The position determination unit F4 according to the present embodiment adopts the maximum value of the individual first strengths for each vehicle exterior communication device $12\beta$ as the exterior device first strength representative value Pb1. The maximum value of the individual second strengths for each vehicle exterior communication device $12\beta$ is adopted as the exterior device second strength representative value Pb2. When the process in S204 is completed, the process proceeds to S205. The exterior device strength representative value Pb1 may also be an average value or a median value of the individual first strengths acquired from the respective the vehicle exterior communication devices $12\beta$. The same applies to the exterior device second strength representative value Pb2. In a situation where the exterior device first strength representative value Pb1 and the exterior device second strength representative value Pb2 are not distinguished, both of them are referred to as an exterior device strength representative value.

In S205, the position determination unit F4 determines whether the exterior device first strength representative value Pb1 is equal to or greater than the operating threshold value Prx. The operating threshold value Prx is a threshold value for determining whether or not the portable terminal 2 exists in the exterior operating area Rx outside the vehicle compartment. The operating threshold value Prx may be designed based on the minimum value of the exterior device first strength representative value Pb1 which can be observed when the portable terminal 2 is present in the exterior operating area Rx. The minimum value of the exterior device first strength representative value Pb1 that is observed in a state where the portable terminal 2 is existing in the exterior operating area Rx may be determined based on the result of a test that measures the exterior device first strength representative value Pb1 at each observation point where the portable terminal 2 is disposed in the exterior operating area Rx.

The operating threshold value Prx may be preferably designed to a value obtained by giving a predetermined margin to the maximum value of the exterior device first strength representative value Pb1 which can be observed when the portable terminal 2 is present in the prohibiting value. According to the setting of the operating threshold value Prx based on such a technical idea, the situation of the exterior device first strength representative value Pb1 being larger than or equal to the operating threshold value Prx refers to a situation where the portable terminal 2 is present at the exterior operating area Rx or inside the vehicular compartment. In other words, it means that the portable terminal 2 does not exist in at least the prohibiting area.

In the determination process of S205, when the exterior device first strength representative value Pb1 is equal to or larger than the operating threshold value Prx, an affirmative determination is made in S205, and the process proceeds to S206. On the other hand, when the exterior device first strength representative value Pb1 is less than the operating threshold value Prx, a negative determination is made in S205, and S208 is executed.

In S206, it is determined whether or not the second strength difference $\Delta P2$, which is the value obtained by subtracting the exterior device second strength representative value Pb2 from the interior device second strength representative value Pa2, is larger than or equal to a predetermined threshold value (hereinafter referred to as a strength difference threshold value Pg). If the portable terminal 2 is present inside the vehicle compartment, the interior device second strength representative value Pa2 is at the high level, and the exterior device second strength representative value Pb2 is at the low level. Therefore, the second strength difference $\Delta P2$ is relatively large value. If the portable terminal 2 is present below the exterior operating area Rx, the interior device second strength representative value Pa2 and the exterior device second strength representative value Pb2 are at the low level, and the second strength difference $\Delta P2$ is a relatively small value. If the portable terminal 2 is present above the exterior operating area Rx, the exterior device second strength representative value Pb2 has a higher level than the interior device second strength representative value Pa2, and the second strength difference $\Delta P2$ is anticipated to be a negative value. Therefore, it is possible to distinguish whether the portable terminal 2 is present at the exterior operating area Rx or inside the vehicle compartment based on whether the second strength difference $\Delta P2$ is larger than or equal to the predetermined strength difference threshold value Pg. The second strength difference $\Delta P2$ is a threshold value for distinguishing whether the portable terminal 2 exists in the vehicle compartment or at the exterior operating area Rx, and may be appropriately set based on the results of the simulation or test. The strength difference threshold value Pg may also be zero. When the second strength difference $\Delta P2$ is larger than or equal to the predetermined strength difference threshold value Pg, the mode in which the portable terminal 2 is determined to be present inside the vehicle compartment corresponds to an example in which the portable terminal 2 is inside the vehicle compartment based on a condition that the interior device second strength representative value is larger than or equal to the exterior device second strength representative value.

When the second strength difference $\Delta P2$ is equal to or greater than the intensity difference threshold value Pg, an affirmative determination is made in S206 and then S209 is executed. On the other hands, when the second strength difference $\Delta P2$ is smaller than the strength difference threshold value Pg, a negative determination is made in S206 and then S207 is executed. In S207, the position determination unit F4 determines that the portable terminal 2 is existing inside the exterior operating area Rx, and the process is ended.

In S208, the position determination unit F4 determines whether or not at least one of the interior device first strength representative value Pa1 and the interior device second strength representative value Pa2 is equal to or greater than a predetermined interior corresponding value Pin. As described above, the interior corresponding value Pin is a threshold for determining that the portable terminal 2 is present in the vehicle compartment. The interior corresponding value Pin may be designed by, for example, an appropriate test. The interior corresponding value Pin may be set with reference to, for example, the minimum value of the interior device representative strength that can be observed when only the portable terminal 2 is present at the vehicle compartment in a vacant state. The interior corresponding value Pin may be determined based on the result of the test for mearing the interior device representative values at the respective observation locations inside the vehicle compartment set to, for example, the vacant state. The vacant state may be referred to a situation where there is no luggage carried by a user or a situation where there are no any passengers. In other words, the vacant state refers to a situation there are no any objects other than the objects preliminarily installed inside the vehicle compartment. The interior corresponding value Pin may be designed with reference to, for example, the minimum value of the interior device representative strengths that can be observed when a person with an average physical size is seating on the driver seat. According to the setting of the interior corresponding value Pin based on such a technical idea, the situation of the interior device representative strength being larger than or equal to the interior corresponding value Pin implies that the portable terminal 2 is present inside the vehicle compartment.

In the determination process of S208, when at least one of the interior device first strength representative value Pa1 and the interior device second strength representative value Pa2 is equal to or larger than the interior corresponding value Pin, an affirmative determination is made in S208, and the process proceeds to S209. On the other hand, when both of the interior device first strength representative value Pa1 and the interior device second strength representative value Pa2 are less than the interior corresponding value Pin, a negative determination is made in S208, and S210 is executed. In S209, the position determination unit F4 determines that the portable terminal 2 is present in the vehicle compartment, and the process flow ends. In S210, the position determination unit F4 determines that the portable terminal 2 is existing outside of the area, and the process flow ends.

The respective determination results in S207, S209 and S210 are stored in the RAM 113 as the position information of the portable terminal 2, and are referred to by the vehicle control unit F5 or the like.

(Requirements for Vehicular Electronic Key System)

Figure 25:
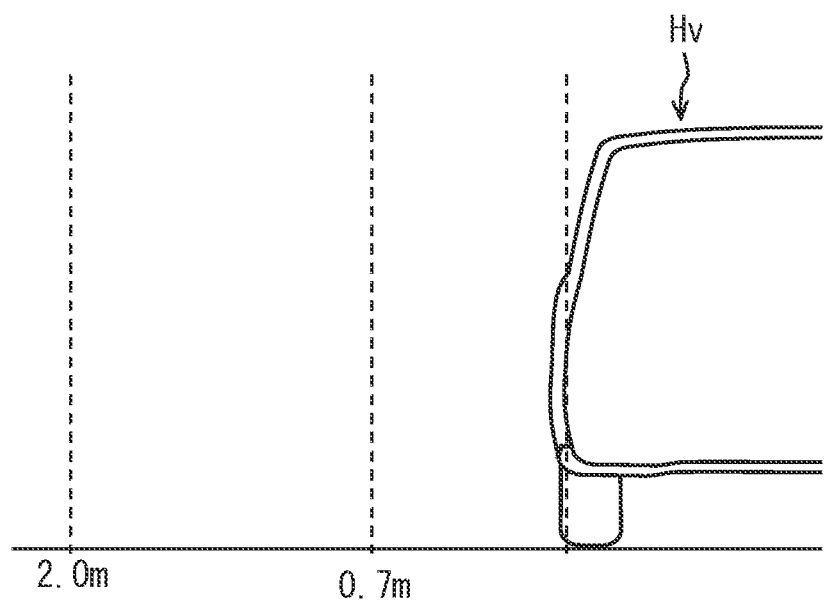
FIG. 25 illustrates requirements for the vehicular electronic key system.

As a prelude to explain the effects of the embodiment, the requirements for the vehicular electronic key are described. In the vehicular electronic key system, in a situation where a user is located within a certain distance (for example, 2 meters) or longer from the exterior surface of the vehicle (for example, the outer door handle) as illustrated in FIG. 25 in view of theft prevention, it is demanded that the unlocking of the automatic door through the wireless communication is prohibited. The requirements are based on the provisions of The Motor Insurance Repair Research Centre as an organization founded by the Association of British Insurers. Therefore, the in-vehicle system 1 may determine whether or not the portable terminal 2 is present within 2 meters from the vehicle Hv. The above-mentioned prohibiting area is set according to the requirement.

The range within 2 meters from the outer surface of the vehicle is one of the indexes. The exterior operating area Rx set by a vehicle manufacturer is often limited to a narrower range in view of enhanced security. For example, the exterior operating area Rx is often within 0.7 meter from the vehicle Hv. In other words, on the premise that the vehicular electronic key system can at least determine whether or not the portable terminal 2 is within two meters from the vehicle Hv with better precision, it is further demanded for the vehicular electronic key system to determine whether or not the portable terminal 2 is present within the exterior operating area Rx. In addition, the precision of determining whether or not the portable terminal 2 is present in the vehicle compartment is also an important requirement for the vehicular electronic key system.

In the vehicular electronic key system, the vehicle exterior communication device 12β may be configured such that a significant difference in the reception strength of a signal from the portable terminal 2 is generated according to whether the portable terminal 2 is present within the exterior operating area Rx or the prohibiting area. In the vehicular electronic key system, the vehicle exterior communication device 12β may be preferably configured such that a remarkable difference in the reception strength of a signal from the portable terminal 2 is generated according to whether or not the portable terminal 2 is present within the vehicle compartment. The general reference plane of the exterior operating area and the prohibiting area is the side surface portion of the vehicle. The reference plane, in other words, the plane regarded as the side surface portion for the exterior operating area or the prohibiting area upon evaluating the position determination accuracy may be a plane perpendicular to the vehicular width direction through, for example, the outer door handle. The region between the exterior operating area Rx and the prohibiting area corresponds to a buffering region (in other words, a gray zone).

According to the structure and the installation of the vehicle exterior communication device 12β disclosed in the present embodiment, the main beam is not directed to the direction toward the exterior of the compartment when the vehicle exterior communication device 12β operates in the zeroth-order resonance mode. The linearly polarized wave whose electrical field vibration direction is radiated to the side surface portion of the vehicle in both directions at the time of the zeroth-order resonance mode. According to such radiation characteristics, as illustrated in FIG. 20, it is possible to set almost the entire of a three-dimensional space within 0.7 meter from the B pillar 42B for the strong electrical field area, and it is possible to suppress the prohibiting area to be the strong electrical field area. The vehicle exterior communication device 12β may be configured such that a significant difference in the reception strength of a signal from the portable terminal 2 is generated according to whether the portable terminal 2 is present within the exterior operating area Rx or the prohibiting area. Although not shown, the strong electrical field area can be formed along the vehicular front-rear direction from the vicinity of the front seat door to the vicinity of the rear seat door. Therefore, it is possible to determine the position of the portable terminal 2 by adopting the reception strength of the signal received at the vehicle exterior communication device 12β from the portable terminal 2 with enhanced accuracy. Since the portable terminal 2 is unlikely to be present in a region near the road surface within 0.1 meter from the road surface or in a region where the height from the road surface is 2 meters or larger, these regions can be excluded from the exterior operating area Rx.

In the vehicle exterior communication device 12β according to the present embodiment, the linearly polarized wave whose electrical vibration direction is parallel to the side surface portion of the vehicle is radiated in a direction perpendicular to the side surface portion, in other words, the direction toward compartment exterior, at the time of operating in the ground plate excitation mode. According to such a configuration, in the ground plate excitation mode, the interior of the vehicle compartment becomes the weak electrical field area based on the relationship between the directivity and the polarization. Therefore, it is possible to determine whether or not the portable terminal 2 is inside the vehicle compartment based on the reception strength of the vehicle exterior communication device 12β operating in the ground plate excitation mode and the vehicle interior strength representative value.

According to the configuration in the present embodiment, it is possible to set the strong electrical field area evenly at the exterior operating area Rx as compared with the comparative configuration. Since it has an elliptical radial characteristic in which the direction along the ground plate 51 is the longitudinal direction as a whole, according to the configuration in which the ground plate 51 is installed in a posture parallel to the side surface portion, it is possible to form the communication area having the vehicular front-rear direction as the longitudinal direction and the strong electrical field area. The vehicle exterior communication device 12β may be configured such that a significant difference in the reception strength of a signal from the portable terminal 2 is generated according to whether the portable terminal 2 is present within the exterior operating area Rx or the prohibiting area. Therefore, it is possible to determine the position of the portable terminal 2 by adopting the reception strength of the signal received at the vehicle exterior communication device 12β from the portable terminal 2 with enhanced accuracy. The antenna 121 included in the vehicle exterior communication device 12β is configured to be a plate having a thickness of several millimeters. Therefore, it is possible to reduce the possibility in which the antenna 121 protrudes from the side surface portion.

Although the embodiment of the vehicular communication apparatus in the present disclosure has been described above, the present disclosure is not limited to the above-mentioned embodiment, and various modifications described below are also included in the technical scope of the present disclosure. Furthermore, in addition to the following, various changes can be made within the range that does not deviate from the scope. For example, various modifications to be described below can be implemented in combination as appropriate within a scope that does not cause technical inconsistency. Members having a function identical to that of the members described in the above embodiment will be denoted by identical reference signs and will not be described repeatedly. When only a part of the configuration is described, the configuration described in the above embodiment can be applied to the other part.

(First Modification)

According to the above vehicle exterior communication device 12β, when the portable terminal 2 is present below the exterior operating area or inside the vehicle compartment, a significant difference in the reception strength of the signal sent from the portable terminal 2 between the operation of the zeroth-order resonance mode and the operation of the ground plate excitation mode is generated. When the portable terminal 2 is present below the exterior operating area or inside the vehicle compartment, the reception strength at the time of the ground plate excitation mode largely deteriorates (for example, 5 dB or more) as compared with the reception strength at the time of the zeroth-order resonance mode. Therefore, as comparing the reception strength at the zeroth-order resonance mode with the reception strength at the ground plate excitation mode, it is possible to detect the portable terminal is present at the upper half of the exterior operating area Rx. As a result, it is possible to identify that the portable terminal is not present inside the vehicle compartment. For example, when the reception strength at the zeroth-order resonance mode and the reception strength at the ground plate excitation mode are larger than or equal to a threshold value, it is determined that the portable terminal 2 is present above the exterior operating area, in other words, portable terminal 2 is not present inside the vehicle compartment. When the reception strength at the zeroth-order resonance mode is larger than the predetermined threshold value and the reception strength at the ground plate excitation mode is smaller than or equal to the predetermined threshold value, it may be determined that the portable terminal 2 is present below the exterior operating area or inside the vehicle compartment. As the reception strength in the zeroth-order resonance mode, the above-mentioned individual first strength or the exterior device first strength representative value may be adopted. As the reception strength in the ground plate excitation mode, the above-mentioned individual second strength or the exterior device second strength representative value may be adopted.

(Second Modification)

The second modification is a modification to a positioning algorithm. The above embodiment describes an aspect in which the position determination unit F4 determines whether or not the portable terminal 2 is present inside the vehicle compartment, in a situation where the interior device representative is larger than or equal to the interior corresponding value Pin. However, the determination algorithm is not limited to this situation. A variety of algorithms may be adopted as the algorithm for determining whether or not the portable terminal 2 is present inside the vehicle compartment.

For example, the position determination unit F4 can determine that the portable terminal 2 is present in the vehicle compartment based on a condition that: the interior device representative strength is equal to or larger than the interior corresponding value Pin; and the exterior device second strength representative value Pb2 is less than the exterior corresponding value Pout. The exterior corresponding value Pout described herein is a threshold value for determining that the portable terminal 2 is present outside the vehicle compartment, and is a parameter different from the operating threshold value Prx. The exterior corresponding value Pout may be set to a value for adding a predetermined margin (for example, −3 dBm) to the maximum value of the exterior device second strength representative value Pb2 which can be observed in a situation where the portable terminal 2 is present inside the vehicle compartment. The maximum value of the exterior device second strength representative value Pb, which can be observed when the portable terminal 2 is present in the vehicle compartment, may be designed based on the simulation or test. Since the exterior corresponding value Pout is set to be equal to or greater than the maximum value of the exterior device second strength representative value Pb2 which is observed when the portable terminal 2 is present in the vehicle compartment, the situation in which the exterior device second strength representative value Pb2 is equal to or greater than the exterior corresponding value Pout suggests that the portable terminal 2 is present outside of the vehicle compartment.

The position determination unit F4 may determine that the portable terminal 2 is present outside the vehicle compartment based on a condition that: the interior device representative strength is equal to or larger than the exterior corresponding value Pout; and the exterior device first strength representative value Pb1 is equal to or larger than the exterior corresponding value Pout. The exterior corresponding value Pout may be set to the minimum value of the exterior device second strength representative value Pb2 to be observed in a situation where the portable terminal 2 is present inside a leakage area where the interior communication device 12α is formed outside the vehicle compartment. The leakage region is a region where the interior device second strength representative value Pa2 is larger than or equal to the interior corresponding value Pin outside the vehicle compartment. The region that can be a leakage region is mainly in the vicinity of the window portion 43. The vicinity of the window portion 43 refers to a range within a few centimeters to a few tens of centimeters from a window frame.

The position determination unit F4 may determine whether or not the portable terminal 2 is present inside the vehicle compartment by adopting the interior device representative strength, the high-level threshold value and the low level threshold value. The high-level threshold value is a threshold value for determining whether or not the portable terminal 2 is present inside the vehicle compartment. The high-level threshold value is set to a value higher than the low-level threshold value. For example, the high-level threshold value may be designed based on the interior device representative strength as reference in a situation where the portable terminal 2 is present inside the vehicle compartment (in particular, the surrounding of the driver seat), which is specified by, for example, a test. The high-level threshold value may be set to a value sufficiently larger than the interior device representative strength to be observed in a situation where the portable terminal 2 is present at the prohibited area based on a result of the above test. For example, the high-level threshold value may be set to a minimum value of the interior device representative strengths observed when the portable terminal 2 is present inside the vehicle compartment. The low-level threshold value is a threshold value for determining whether or not the portable terminal 2 is present outside the vehicle compartment. It may be preferable that the low-level threshold value is set to a value 10 dBm or more lower than the high-level threshold value. In the above configuration, the position determination unit F4 determines that, in a situation where the interior device representative strength becomes larger than or equal to the high-level threshold value, determines that the portable terminal 2 is present inside the vehicle compartment until the interior device representative strength becomes less than the low-level threshold value. In a situation where the interior device representative strength becomes less than the low-level threshold value, the position determination unit F4 may determine that the portable terminal 2 is present outside the vehicle compartment until the interior device representative strength becomes larger than or equal to the high-level threshold value. A variety of the determination algorithms may be applied to determine whether or not the portable terminal 2 is present inside the vehicle compartment also for determining whether or not the portable terminal 2 is present at the exterior operating area Rx.

Even if the position determination of the portable terminal 2 is divided into several phases. For example, it is determined whether or not the portable terminal 2 is inside the vehicle compartment. Subsequently, only in a situation where it is determined that the portable terminal 2 is present outside the vehicle compartment, it may be determined whether or not the portable terminal 2 is at the exterior operating area Rx. In other words, when the absence of the portable terminal 2 inside the vehicle compartment is confirmed by the predetermined algorithm, another algorithm determines whether or not the portable terminal exists at the exterior operating area. Therefore, it is possible to reduce the erroneous determination of the presence of the portable terminal inside the vehicle compartment regardless of whether or not the portable terminal 2 exists at the exterior operating area Rx, as the radio wave of the exterior communication device 12β easily wraps around the interior of the vehicle compartment.

(Third Modification)

Figure 26A:
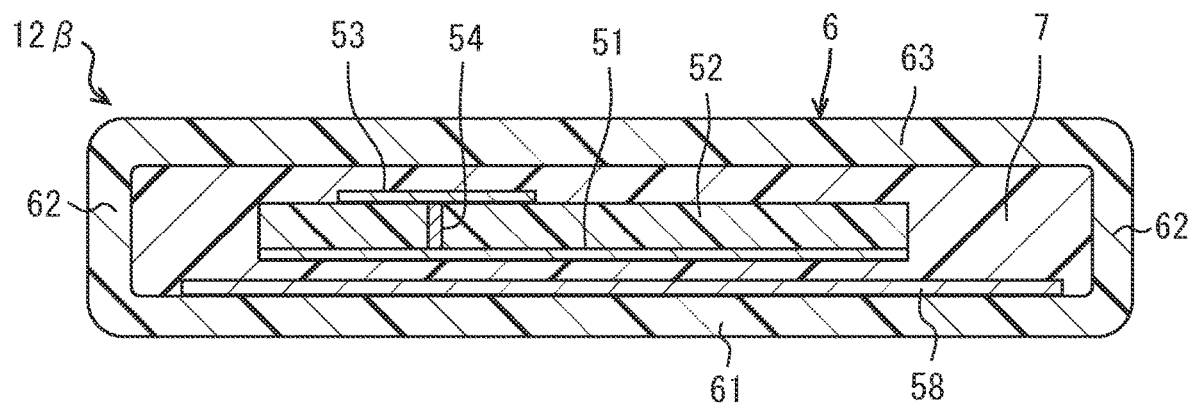
FIG. 26A illustrates a modified example of the configuration of the vehicle exterior communication device.
Figure 26B:
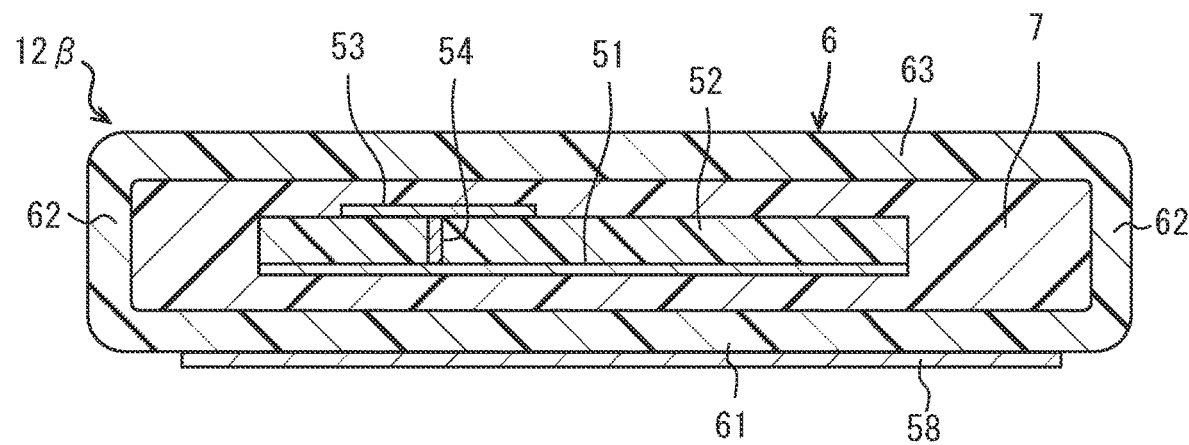
FIG. 26B illustrates a modified example of the configuration of the vehicle exterior communication device.

The third modification is a modification of the configuration of the vehicle exterior communication device. As illustrated in FIGS. 26A, 26B, the vehicle exterior communication device 12β may have a master ground plate 58 as a metal plate larger than the ground plate 51 to be arranged at the inner bottom surface portion of the case 6 made of resin. As shown in FIG. 26B, the master ground plate 58 may be arranged on the outer bottom surface portion of the case 6 of the vehicle exterior communication device 12β. The case 6 and the master ground plate 58 may be integrally formed. The bottom portion of the case 6 may be made of metal. In that case, a case bottom portion 61 made of metal corresponds to the master ground plate 58. In addition, the vehicle metal body can be used as the master ground plate 58. If the sealing material 7 maintains a solid state within the assumed operating temperature, either the case top plate portion 63 and the case bottom portion 61 can be omitted. The case 6 may be formed as a flat box shape in which the upper surface or the bottom surface is formed as an opening. The opening surface of the case 6 may be brought into contact with a member to which the case 6 is attached, such as the B pillar 42B and the inner door panel.

The above embodiment describes that the in-vehicle communication device 12 integrally includes the antenna 121 and an electronic component such as the transceiver 122, in other words, a circuit integrated antenna. However, it is not limited to this situation. The transceiver 122 and the communication microcomputer 123 may be stored in a housing different from the antenna 121. The vehicle interior communication device 12α and the vehicle exterior communication device 12β may have identical configurations, or may have different configurations. Among the multiple vehicle exterior communication devices 12β, the rear exterior communication device 12N may have configuration different from other lateral communication devices such as the left exterior communication device 12L.

Figure 27:
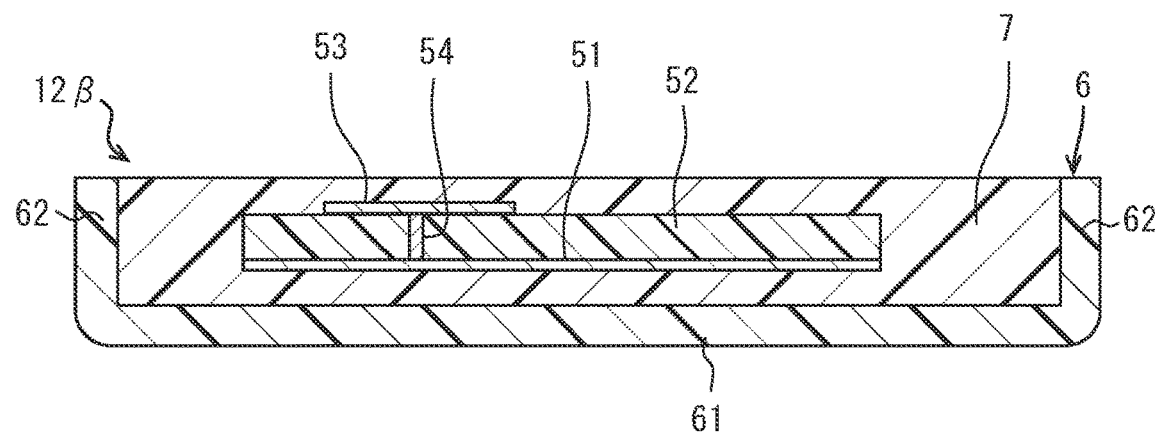
FIG. 27 illustrates a modified example of the configuration of the vehicle exterior communication device.

The case top plate portion 63 may be omitted as in FIG. 27. The case bottom portion 61 may be omitted in the case 6. When either the case top plate portion 63 or the case bottom portion 61 of the case 6 is omitted, the sealing material 7 may be preferably realized by using a resin that maintains solidity in the range assumed as the temperature of the environment in which the vehicle exterior communication device 12β is used (hereinafter, the operating temperature range). The operating temperature range can be, for example, −30° C. to 100° C.

(Fourth Modification)

The fourth modification is a modification of the installation position of the vehicle exterior communication device. The installation position and the installation posture of the vehicle exterior communication device 12β as the lateral communication device may not be limited to the above example. The vehicle exterior communication device 12β can be installed at an arbitrary position of the outer surface portion of the vehicle such as the upper end of the A pillar 42A, C pillar 42C, the upper end portion of the door panel, interior or vicinity of the outer door handle 44. For example, the vehicle exterior communication device 12β may be stored in a posture such that the X-axis direction is along the longitudinal direction of the handle and the Y-axis is along the vehicular height direction inside the outer door handle 44. In addition, the vehicle exterior communication device 12β as the lateral communication device may also be installed in a posture such that the ground plate 51 is along the side surface of the vehicle at a portion of the door module 45 acting as the window frame of the side window. However, it may be preferable that the vehicle exterior communication device 12β is installed in a posture such that the flat metal body (hereinafter referred to as the vehicle metal portion 4) included in a vehicle faces the ground plate 51. According to the mode in which the vehicle exterior communication device 12β is installed at the outer side surface of the vehicle metal portion, the vehicle metal portion acts as the master ground plate 58 for the ground plate 51, the operation of the vehicle exterior communication device 12β can be stable. For example, in a situation where the left exterior communication device 12L is installed inside the door module 45 having the combination of the inner door panel and the outer door panel, it may be preferable that the outer door panel is made of resin and the inner door panel is made of metal. The inner door panel made of metal can function as the master ground plate 58 for the vehicle exterior communication device 12β. In a situation where the inner door panel is made of resin, the left exterior communication device 12L may be installed at a portion inside the door module 45 overlapping a metal frame such as the B pillar 42. This also applies to the right exterior communication device 12M. The installation position may be modified for the rear exterior communication device 12N. It may also be preferable that the rear exterior communication device 12N is in vicinity of the flat vehicle metal portion or is in contact with the flat vehicle metal portion.

(Fifth Modification)

Figure 28:
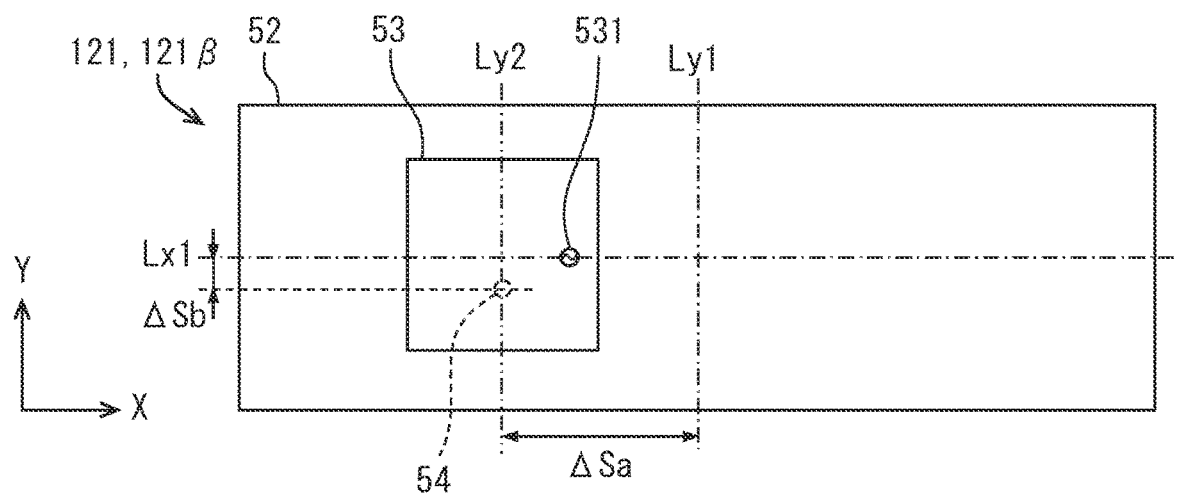
FIG. 28 illustrates a modified example of the configuration of the vehicle exterior antenna.

The configuration of the antenna 121 of the vehicle exterior communication device 12β, in other words, the vehicle exterior antenna 121β is not limited to the above-described configuration. As shown in FIG. 28, the short-circuit portion 54 included in the vehicle exterior antenna 121β may be arranged at a position deviated from the center of the opposing conductive plate 53 by a predetermined amount (hereinafter, a short-circuit portion offset amount ΔSb) in the Y-axis direction. According to this configuration, the symmetry of the current distribution on the opposing conductive plate 53 is broken, and linearly polarized waves parallel to the Y-axis direction are radiated from the opposing conductive plate 53. The following describes specific examples.

Figure 29:
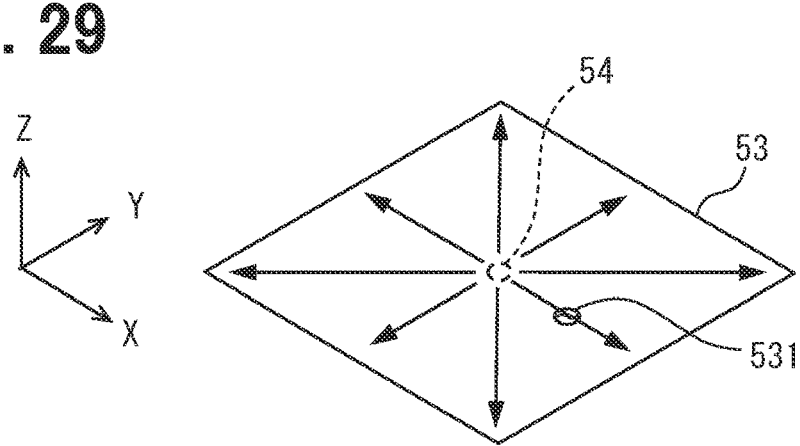
FIG. 29 illustrates a current distribution on an opposing conductive plate when a short-circuit portion is formed in the center of the opposing conductive plate.

In the configuration in which the short-circuit portion 54 is arranged at the center of the opposing conductive plate 53, the current flowing through the opposing conductive plate 53 is symmetric with a center on the short-circuit portion 54 as shown in FIG. 29. Therefore, the radio waves generated by the current flowing in a certain direction when viewed from the connection point of the opposing conductive plate 53 (hereinafter, the short-circuited point) between the short-circuit portion 54 and the opposing conductive plate 53 are canceled by the radio waves generated by the current flowing in the opposite direction.

Figure 30A:
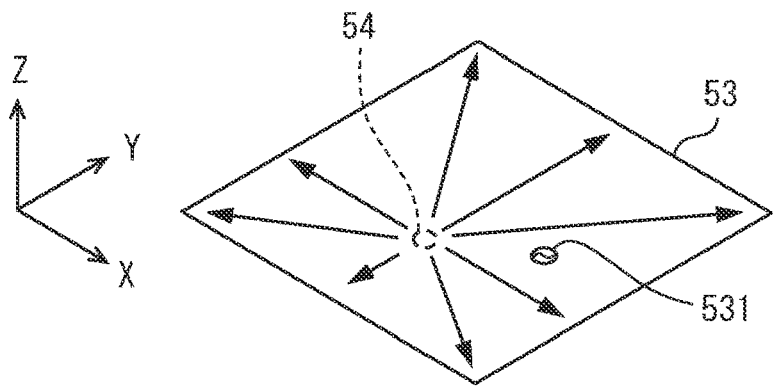
FIG. 30A illustrates a current distribution on the opposing conductive plate and its operation when a short-circuit portion is formed at a position spaced apart from the center of the opposing conductive plate.
Figure 30B:
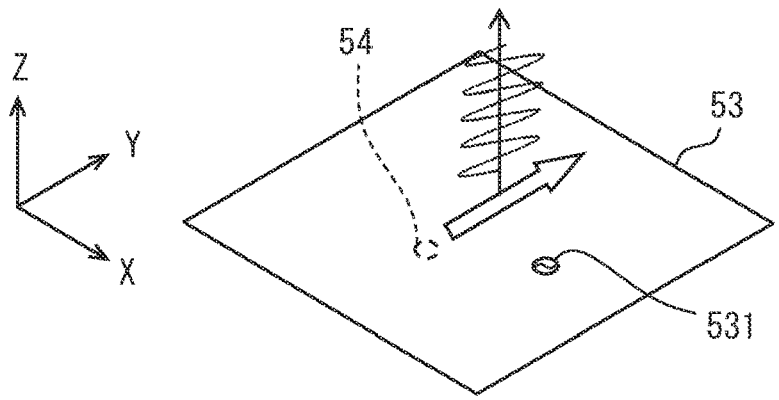
FIG. 30B illustrates a current distribution on the opposing conductive plate and its operation when a short-circuit portion is formed at a position spaced apart from the center of the opposing conductive plate.

On the other hand, in the configuration in which the short-circuit portion 54 is arranged at a position deviated by a predetermined amount in the Y-axis direction from the center of the opposing conductive plate 53, the symmetry in the current distribution flowing through the opposing conductive plate 53 as shown in FIG. 30A is broken. Therefore, as shown in FIG. 30B, the radio waves radiated by the current component in the Y-axis direction remain uncancelled. That is, in the configuration in which the short-circuit portion 54 is arranged at a position deviated by a predetermined amount in the Y-axis direction from the center of the opposing conductive plate 53, the linearly polarized waves in which the electric field vibrates in the parallel direction along the Y-axis (hereinafter referred to as Y-axis parallel direction) are radiated upward from the opposing conductive plate 53. Since the symmetry of the current component in the X-axis direction is maintained, the linearly polarized waves in which the electric field oscillates in the X-axis direction cancel each other. That is, the linearly polarized wave whose electric field oscillates in the X-axis direction is not radiated from the opposing conductive plate 53.

The vertical polarization of the ground plate in the horizontal direction of the ground plate is radiated by the parallel resonance of the capacitance formed between the opposing conductive plate 53 and the ground plate 51 and the inductance provided by the short-circuit portion 54. That is, according to the above configuration, the vertical polarization of the ground plate in the direction parallel to the ground plate, the X-axis parallel polarization in the direction perpendicular to the ground plate, and the Y-axis parallel polarization in the direction perpendicular to the ground plate can be radiated at the same time. The X-axis parallel polarization radiation in the direction perpendicular to the ground plate is provided by the asymmetric portion 511 of the ground plate 51. The radiation of Y-axis parallel polarization in the direction perpendicular to the ground plate is provided by the offset arrangement of the short-circuit portion 54 in the Y-axis direction.

Figure 31:
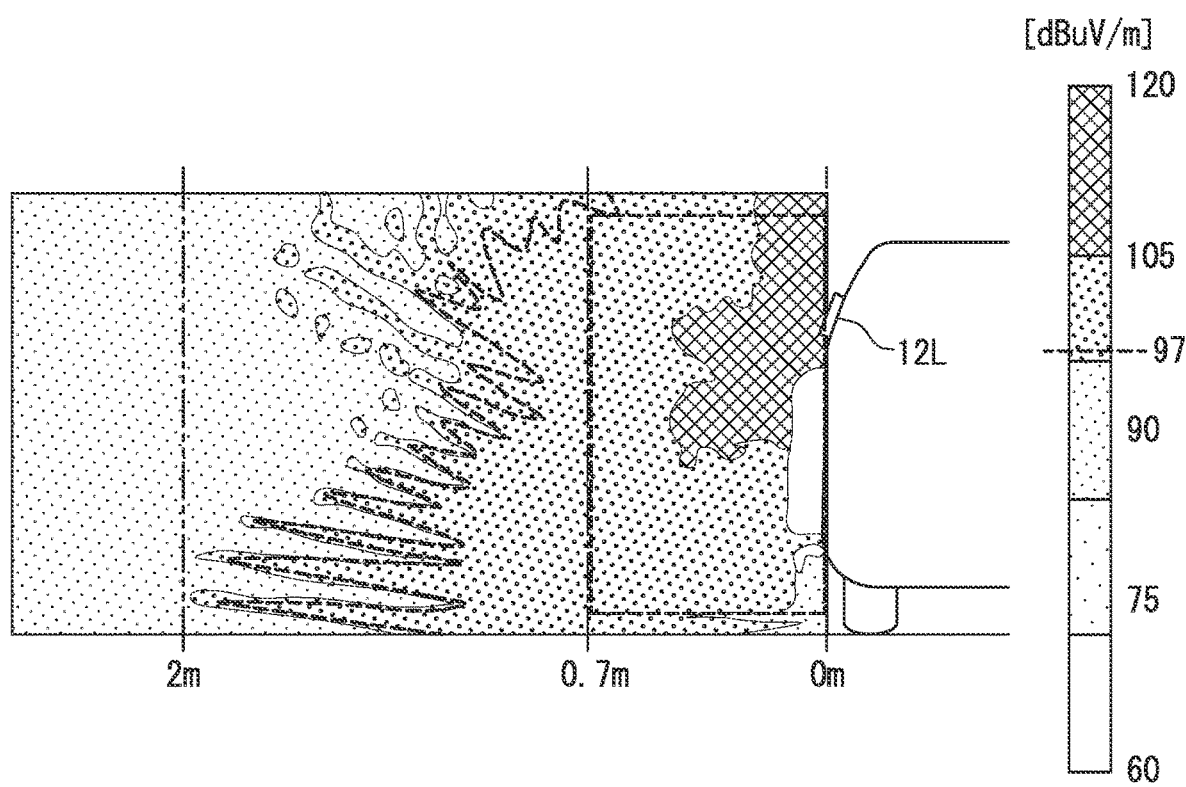
FIG. 31 illustrates the electrical field strength distribution when the vehicle exterior antenna operates in the zeroth-order resonance mode.

When the vehicle exterior antenna 121β in the zeroth-order resonance mode, the Y-axis parallel polarization provided by the offset arrangement of the short-circuit portion 54 is radiated in a direction perpendicular to the ground plate (the direction to the compartment exterior as viewed from the vehicle Hv). In other words, the region that cannot be covered only by the polarized wave perpendicular to the ground plate radiated from the edge portion of the opposing conductive plate 53 is covered by the Y-axis parallel polarization. As a result, according to the zeroth-order resonance mode, as illustrated in FIG. 31, it is possible to set the entire region of the exterior operating area Rx to the strong electrical field area evenly. The contour lines shown by the broken lines in FIG. 31 represent points equal to the minimum value of the electric field strength in the exterior operating area Rx. The above-mentioned operating threshold value Prx is set to the electrical field strength of the contour line. According to the configuration described above, the possibility of erroneously determining that the portable terminal 2 is present in the vehicle compartment can be reduced even though the portable terminal 2 is present in the prohibiting area.

The direction of deviating the short-circuit portion 54 with respect to the center of the opposing conductive plate 53 (hereinafter, the short-circuit portion offset) may be a direction orthogonal to the conductive plate offset direction. It is possible to radiate two types of linearly polarized waves whose electric field vibration directions are orthogonal to each other as linearly polarized waves radiated in the direction perpendicular to the ground plate.

The short-circuit portion 54 may be formed in a center region of the opposing conductive plate 53. The short-circuit offset amount ΔSb may be preferably set to 0.04λ or less in order to maintain all-around directionality (in other words, omni-directionality) in the horizontal direction of the ground plate. It may be preferable that the short-circuit offset amount ΔSb is 0.02λ (=2.5 mm) or less, for example, 0.004λ (=0.5 mm), 0.008λ (=1.0 mm), 0.012λ (=1.5 mm), etc. By changing the short-circuit offset amount ΔSb, the radiation gain of Y-axis parallel polarization in the ground plate perpendicular direction can be adjusted. The operating frequency does not change even when the short-circuit offset amount ΔSb is changed. When the position of a feeder point 531 is fixed, the voltage standing wave ratio (VSWR) may fluctuate according to the short-circuit portion offset amount ΔSb. Here, since the feeder point 531 can be set to an arbitrary position, the VSWR at the first frequency band can be suppressed to a practical level (for example, 3 or less) by providing the power supply point 31 at a position corresponding to the short-circuit offset amount ΔSb. That is, the return loss can be suppressed to a desired allowable level by adjusting the position of the feeder point 531 according to the position of the short-circuit portion 54.

(Sixth Modification)

Figure 32:
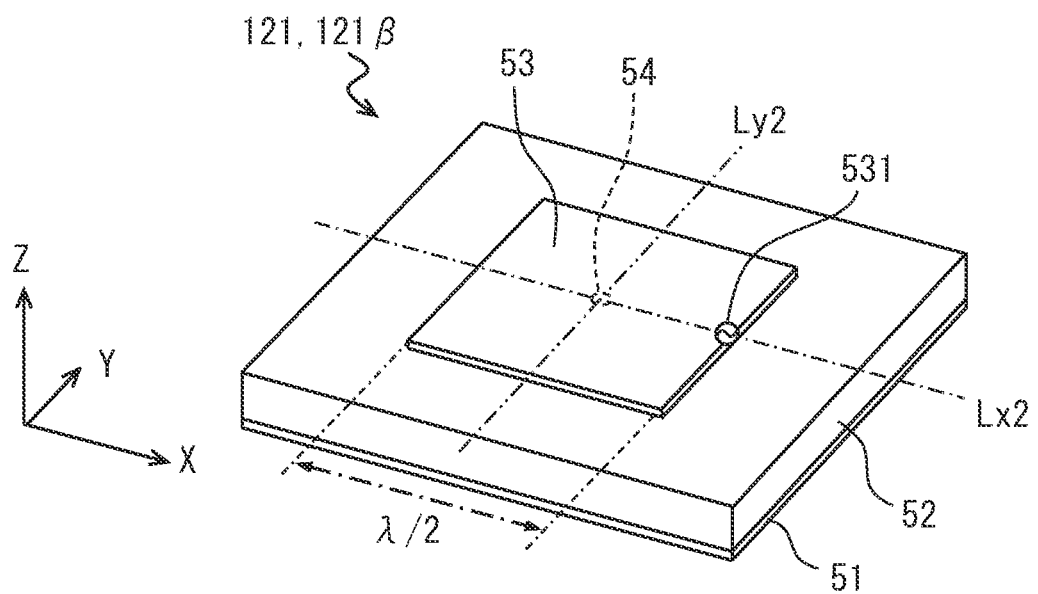
FIG. 32 illustrates a modified example of the configuration of the vehicle exterior antenna.

The sixth modification is a modification of the antenna structure. The vehicle exterior antenna 121β may have a configuration shown in FIG. 32. As shown in FIG. 32, by setting the length of the opposing conductor plate 53 in the X-axis direction to $0.5\lambda_2$ and providing the feeder point 531 on the axis of symmetry parallel to the X-axis, the antenna 121 can also be operated as a patch antenna at the second frequency. Such a zeroth-order resonant antenna is referred to as a half-wavelength zeroth-order resonant antenna in this specification. In the half-wavelength type zeroth-order resonant antenna, the feeder point 531 can also function as a feeder point in the zeroth-order resonance mode.

The opposing conductive plate 53 in this modification may have a set of diagonally cut portions formed as degeneracy separation elements. According to this configuration, circularly polarized waves can be radiated, and the influence of the posture of the portable terminal 2 can be mitigated. In the above example, the X-axis corresponds to the first symmetrical axis. The direction in which the electrical length of the opposing conductive plate set to $0.5\lambda_2$ may be in the Y-axis direction. That is, the first symmetrical axis may also be the Y-axis.

The antenna 121 includes a mode operating as the zeroth-order resonant antenna, in other words, the zeroth-order resonance mode, and a mode operating as a patch antenna (hereinafter referred to as a patch antenna mode). The patch antenna forms a main beam in a direction perpendicular to the ground plate, in other words, the Z-axis direction. The electrical field vibration direction is parallel to the ground plate 51, the X-axis herein. Therefore, the patch antenna mode corresponds to the second mode. A filter or the like may be used for separating the reception signal in the zeroth-order resonance mode input from the feeder point 531 (in other words, the signal in the first frequency band) form the reception signal in the patch antenna mode (in other words, the signal in the second frequency band).

(Seventh Modification)

Figure 33:
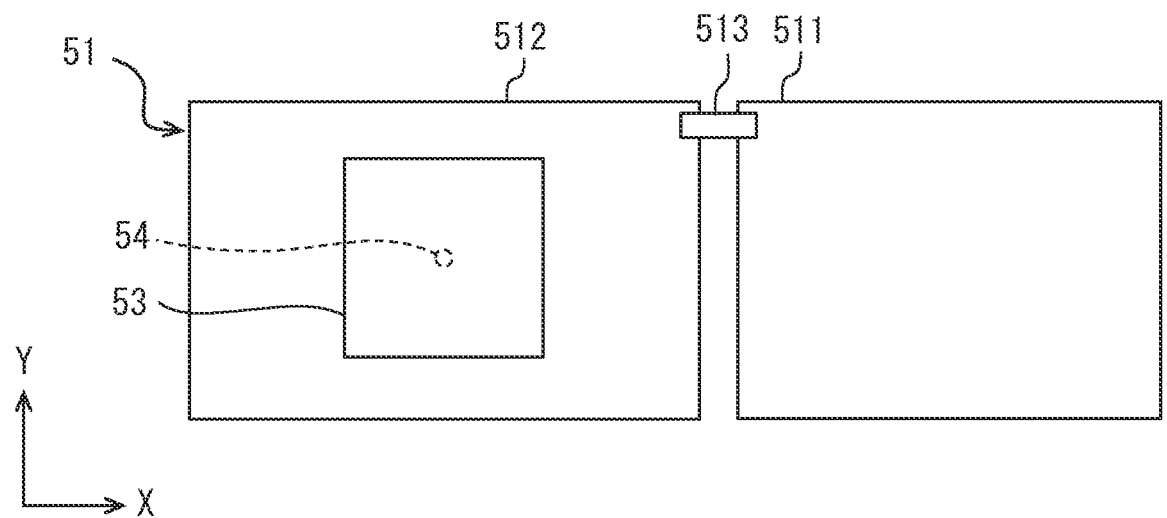
FIG. 33 illustrates a vehicle exterior antenna whose operation mode is switchable.

In the ground-plate extension-type resonant antenna, the symmetry maintain portion 512 and the asymmetric portion 511 may be physically separated as shown in FIG. 33, and the electrical connection state between the two portions may be switchable by using a switch 513. The separation between the symmetry maintain portion 512 and the asymmetric portion 511 may be set to a value that does not cause electromagnetic coupling at the first frequency, based on a simulation. The switch 513 is disposed at the edge portion of the ground plate 51.

The symmetry main portion 512 corresponds to a plate-shaped conductive member disposed concentrically with the opposing conductive plate 53 having a rectangular shape. The asymmetric portion 511 corresponds to a plate-shaped conductive member disposed at a lateral side of the symmetry main portion 512. When the switch 513 is turned off, since the asymmetric portion 511 is electrically separated, the vehicle exterior antenna 121β operates only in the zeroth-order resonance mode. When the switch 513 is turned on, the vehicle exterior antenna 121β operates in both the zeroth-order resonance mode and the ground plate excitation mode.

The gain ratio between the zeroth-order resonance mode and the ground plate excitation mode in a situation where the switch 513 is turned on may be modified by adjusting the asymmetric portion width W and the separation between the rear surface metal (B pillar 42B herein) and the ground plate. In other words, it is possible to substantially operate only in the ground plate excitation mode by adjusting the above parameters, in a situation where the switch 513 is turned on. As an example herein, in a situation where the switch 513 is turned on, the antenna 121 operates substantially only in the ground plate excitation mode since the gain in the zeroth-order mode is sufficiently smaller than the gain in the ground plate excitation mode. For example, the asymmetric portion width W may be preferably set to an integral multiple of λ/4, such as λ/4 or λ/2. According to such a setting, the gain as the ground plate excitation mode can be increased. According to the above configuration, it is possible to control the operation mode of the vehicle exterior communication device 12β by turning on and off the switch 513. In other words, it is possible to control the vehicle exterior communication device 12β between the zeroth-order resonance mode and the ground plate excitation mode by turning on and off the switch 513.

Figure 34:
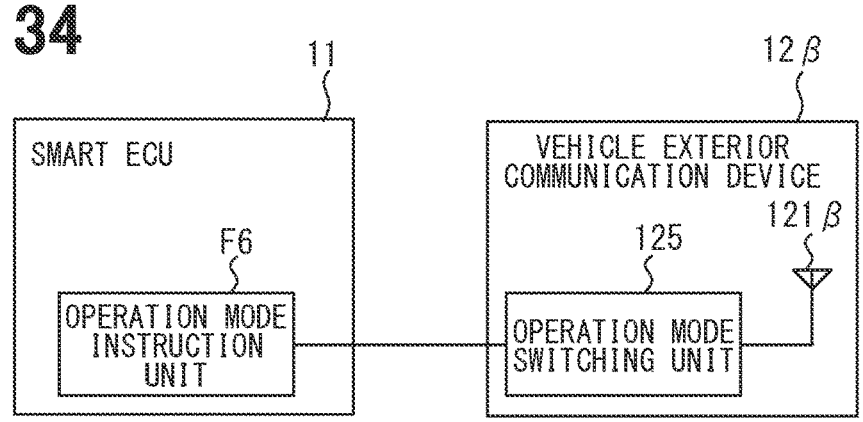
FIG. 34 illustrates the modified example of the smart ECU and the vehicle exterior communication device.

As illustrated in FIG. 34, the smart ECU 11 in this modification includes an operation mode instruction unit F6 for intentionally switching the operation mode of the vehicle exterior communication device 12β. Each vehicle exterior communication device 12β includes an operation mode switching unit 125. FIG. 34 omits the illustration of the configuration already described in the preceding embodiment.

The operation mode instruction unit F6 collectively controls the operation mode of each vehicle exterior communication device 12β, substantially the operation mode of the vehicle exterior antenna 121β. For example, the operation mode instruction unit F6 instructs each vehicle exterior communication device 12β to operate in the ground plate excitation mode, in a situation of determining whether or not the portable terminal 2 is inside the vehicle compartment. The operation mode instruction unit F6 instructs each vehicle exterior communication device 12β to operate in the zeroth-order resonance mode, in a situation of determining whether or not the portable terminal 2 is at the exterior operating area Rx.

The operation mode switching unit 125 switches the operation mode of the vehicle exterior antenna 121β based on the instruction from the smart ECU 11. For example, the operation mode switching unit 125 switches on the switch 513 in a situation of the smart ECU 11 provides an instruction to operate in the ground plate excitation mode. The operation mode switching unit 125 switches off the switch 513 in a situation of the smart ECU 11 provides an instruction to operate in the zeroth-order resonance mode.

It is possible to operate the vehicle exterior communication device 12β in an operation mode according to the determination target of the position determination unit F4. The matter of switching the operation mode of the vehicle exterior communication device 12β substantially corresponds to the matter of switching the operation mode of the vehicle exterior antenna 121β. The matter of switching the operation mode of the vehicle exterior antenna 121β corresponds to the matter of switching the directivity and polarization plane of the vehicle exterior antenna 121β. In other words, the matter of switching the operation mode of the vehicle exterior antenna 121β corresponds to the matter of switching the polarization and the reception direction of the vehicle exterior communication device 12β to be a reception target.

Figure 35:
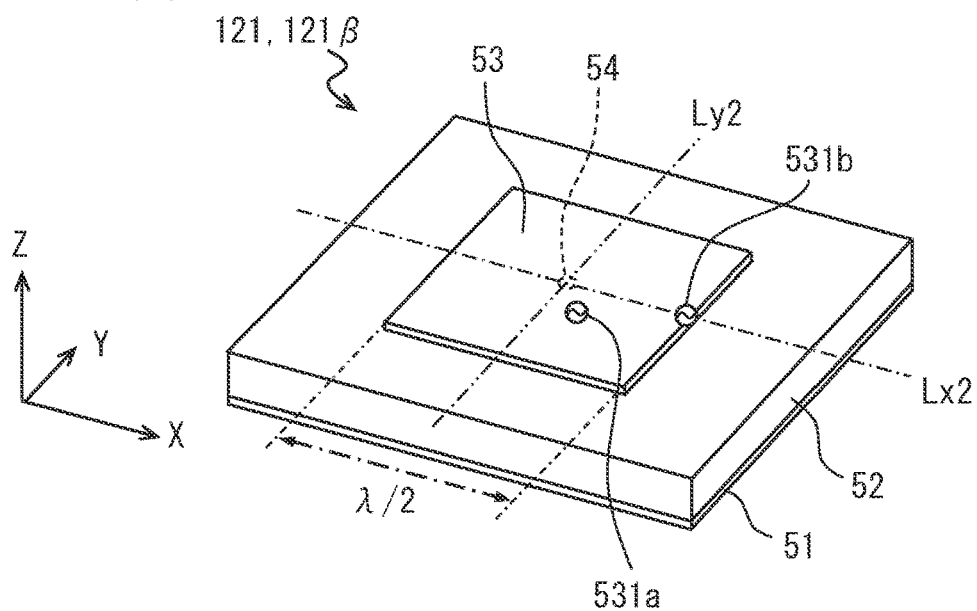
FIG. 35 illustrates a modified example of the configuration of the vehicle exterior antenna.

The technical idea disclosed in this modification may also be applied to the vehicle exterior antenna 121β configured as the half-wavelength type zeroth-order resonant antenna disclosed in the sixth modification. For example, as illustrated in FIG. 35, a feeder point 531a for the zeroth-order resonance and a feeder point 531b to be operated as a patch antenna may be separately provided for the opposing conductive plate 53 of the half-wavelength type zeroth-order resonant antenna. By properly using the two feeder points 531a and 531b, the operation mode of the antenna 121 can be properly used. The operation mode instruction unit F6 collectively controls through the operation mode switching unit 125 to determine which of the feeder points 531 is used. The feeder point 531a corresponds to a first feeder point, and the feeder point 531b corresponds to a second feeder point.

Figure 36:
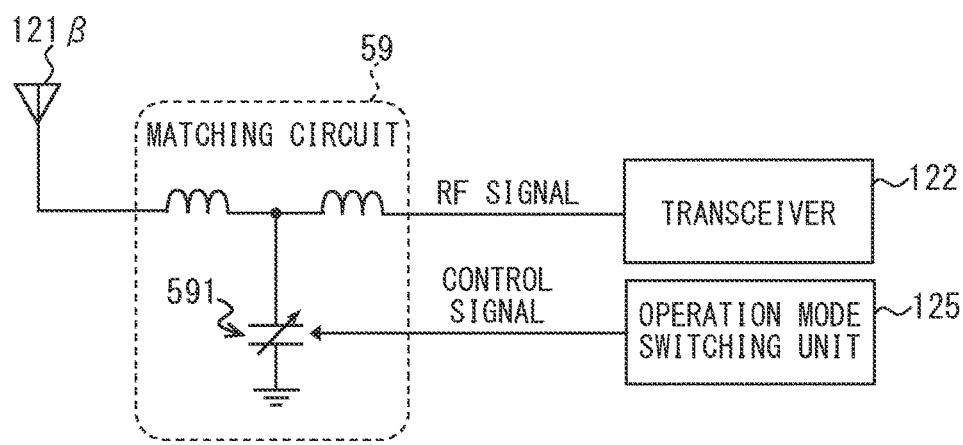
FIG. 36 illustrates a modified example of the configuration for switching the operation mode of the vehicle exterior communication device.

In the half-wavelength type zeroth-order antenna, as illustrated in FIG. 36, the antenna 121 and the transceiver 122 may be connected through a matching circuit 59 for adjusting an internal inductance or an electrostatic capacitance. In the above configuration, it is possible to switch the operation mode by adjusting the internal inductance or the electrostatic capacitance of the matching circuit 59. The example illustrated in FIG. 36 indicates the configuration of changing the resonance frequency of the antenna 121 by adjusting the electrostatic capacitance of a variable capacitor 591. As the variable capacitor 591, for example, an element as a variable capacitor in which the electrostatic capacitance is changed by modifying a voltage level applied to a predetermined input terminal may be adopted. The particular configuration of the matching circuit 59 for modifying the internal inductance or the electrostatic capacitance may be properly modified, and is not restricted to the configuration illustrated in FIG. 36. For example, in the configuration in which the matching circuit 59 includes a variable coil, the resonance frequency of the antenna 121 may be changed by adjusting the inductance of the variable coil. The inductance or the electrostatic capacitance of the matching circuit 59 may be collectively controlled by the operation mode instruction unit F6. The variable capacitor 591 or the variable coil corresponds to an impedance variable element.

(Eighth Modification)

The eighth modification is a modification of the index of the distance between the portable terminal 2 and the in-vehicle communication device 12. The above embodiment describes that the existence of the portable terminal 2 is determined based on the reception strength of the signal received from the portable terminal with reference to the index of the distance from each of the in-vehicle communication devices 12 to the portable terminal 2. However, it is not limited to this example. As an index of the distance from each of the in-vehicle communication devices 12 to the portable terminal 2, one-way/round-trip propagation time of the wireless signal from the in-vehicle communication device 12 to the portable terminal 2 can also be used. In other words, the position determination unit F4 may also determine the position of the portable terminal 2 by adopting the one-way/round-trip propagation time of the wireless signal from the in-vehicle communication device 12 to the portable terminal 2. The propagation time of the wireless signal can be measured by receiving the signal from the portable terminal 2. In other words, the configuration in which the position of the portable terminal 2 is determined by adopting the one-way/round-trip propagation time of the wireless signal from the in-vehicle communication device 12 to the portable terminal 2 also corresponds to the configuration in which the position of the portable terminal 2 is determined based on the reception status of the signal from the portable terminal 2.

(Ninth Modification)

The ninth modification is a modification of the communication method with the portable terminal 2. The above embodiment describes that the portable terminal 2 and the in-vehicle communication device 12 execute bidirectional wireless communication according to the Bluetooth standard, however, the communication method between the portable terminal 2 and the in-vehicle communication device 12 is not limited to this example. The portable terminal 2 and the in-vehicle system 1 may be configured to perform a wireless communication by using an impulse signal used in an ultra-wideband (UWB: Ultra Wide Band) communication. In other words, the in-vehicle communication device 12 may be a communication module that executes UWB communication. The impulse signals used in the UWB communication are signals having extremely short pulse widths (for example, 2 ns) and bandwidths of 500 MHz or more (that is, ultra-wide bandwidths). Examples of frequency bands (hereinafter, referred to as UWB bands) which can be used for the UWB communication include 3.1 GHz to 16 GHz, 3.4 GHz to 4.8 GHz, 7.25 GHz to 16 GHz, and 22 GHz to 29 GHz.

The standard for the portable terminal 2 and the in-vehicle system 1 to perform the wireless communication and the frequency of the radio wave used for the wireless communication (hereinafter, referred to as the radio wave used in the system) may be appropriately selected.

(Tenth Modification)

The tenth modification is a modification of the material of the vehicle body. In the foregoing embodiments, the position determination system for vehicle according to the present disclosure is applied to the vehicle Hv having the metal body. However, the vehicle suitable as an application target of the position determination system for vehicle is not limited to the vehicle having the metal body. For example, the various body panels configuring the body of the vehicle Hv may be made of a carbon-based resin filled with a sufficient amount of carbon to attenuate the propagation of radio waves by 5 dB or more. A vehicle having the body described above is also suitable as an application target of the position determination system for vehicle. The body of the vehicle Hv may be made of a general-purpose resin containing no carbon. It may be preferable that the vehicle exterior communication device 12β has a configuration for blocking radio waves at the rear side, and the vehicle exterior communication device 12β is installed at a position where the radio waves are not blocked at the lateral side and the upper side.

The controller and the method therefor which have been described in the present disclosure may be also realized by a dedicated computer which constitutes a processor programmed to execute one or more functions concretized by computer programs. The device and the method therefor which have been described in the present disclosure may be also realized by a special purpose hardware logic circuit. Also, the device and the method therefor which have been described in the present disclosure may be also realized by one or more dedicated computers which are constituted by combinations of a processor for executing computer programs and one or more hardware logic circuits. The computer programs may be stored, as instructions to be executed by a computer, in a tangible non-transitory computer-readable medium.

Here, the controller is, for example, the smart ECU 11. The methods or functions provided by the smart ECU 11 may be provided by software stored in a tangible memory device and a computer executing the software, only software, only hardware, or a combination of the software and the hardware. Some or all of the functions of the smart ECU 11 may be configured as hardware. A configuration in which a certain function is implemented as hardware includes a configuration in which the function is implemented by using one or more ICs or the like. In the above-described embodiment, the smart ECU 11 is implemented by using the CPU. However, the configuration of the smart ECU 11 is not limited to this. The smart ECU 11 may be implemented by using a MPU (Micro Processor Unit), a GPU (Graphics Processing Unit), or a DFP (Data Flow Processor), instead of the CPU 111. Further, the smart ECU 11 may be implemented by a combination of various processors such as the CPU 111, the MPU, the GPU, and the DFP. Further, for example, some of the functions to be provided by the smart ECU 11 may be implemented by using a FPGA (Field-Programmable Gate Array), an ASIC (Application Specific Integrated Circuit), or the like.

Here, the flowchart described in this application or the process of the flowchart is composed of a plurality of sections (or referred to as steps), and each section is expressed as, for example, S101. Each section may be divided into several subsections, while several sections may be combined into one section. Furthermore, each section thus configured may be referred to as a device, module, or means.

What is claimed is:

1. A positioning system comprising:
    a vehicle exterior communication device configured to be disposed at an outer surface portion of a vehicle being at least one of a side surface portion of the vehicle or a rear side surface portion of the vehicle, and including an antenna configured to receive a wireless signal transmitted from a portable terminal, the wireless signal being a radio wave of 1 GHz or higher; and
    a positioning device configured to determine a position of the portable terminal, based on a reception status of the wireless signal received by the vehicle exterior communication device from the portable terminal,
    wherein the vehicle exterior communication device includes an operation mode having a first mode and a second mode,
    wherein, in the first mode of the operation mode, a linearly polarized wave whose electrical field vibration direction is perpendicular to the outer surface portion is radiated toward a direction parallel to the outer surface portion at which the vehicle exterior communication device is attached,
    wherein, in the second mode of the operation mode, a linearly polarized wave whose electrical field vibration direction is parallel to the outer surface portion is radiated, and
    wherein the positioning device is further configured to:
        determine whether or not the portable terminal exists at an exterior operating area being a region outside a vehicle compartment within a predetermined operating distance from the vehicle, based on the reception status of the wireless signal received by the vehicle exterior communication device from the portable terminal in the first mode of the operation mode; and
        determine whether or not the portable terminal exists inside the vehicle compartment, based on the reception status of the wireless signal received by the vehicle exterior communication device from the portable terminal in the second mode of the operation mode.

2. The positioning system according to claim 1,
    wherein the antenna of the vehicle exterior communication device is further configured to radiate a linearly polarized wave whose electrical field vibration direction is parallel to the outer surface portion toward a direction perpendicular to the outer surface portion at which the vehicle exterior communication device is attached, in the second mode of the operation mode.

3. The positioning system according to claim 1,
    wherein the vehicle exterior communication device is further to be operated at a predetermined first frequency belonging to a frequency band adopted in the wireless communication with the portable terminal in the first mode of the operation mode,
    wherein the vehicle exterior communication device is further to be operated at a predetermined second frequency as a frequency belong to the frequency band adopted in the wireless communication with the portable terminal in the second mode of the operation mode, and
    wherein the predetermined second frequency is different from the predetermined first frequency.

4. The positioning system according to claim 3,
    wherein the antenna includes:
        a ground plate made of a conductor with a flat plate shape;
        an opposing conductive plate made of another conductor with a flat plate shape and having a feeder point electrically connected to a feeder line, and configured to be disposed to space apart from the ground plate with a predetermined distance; and
        a short-circuit portion configured to be disposed at a central region of the opposing conductive plate and electrically connect the opposing conductive plate and the ground plate,
    wherein the ground plate is configured to be disposed asymmetric with respect to the opposing conductive plate, wherein the antenna is further configured to generate parallel resonance in the predetermined first frequency by adopting an electrostatic capacitance between the opposing conductive plate and the ground plate and an inductance in the short-circuit portion, and wherein the vehicle exterior communication device is further configured to be attached at the outer surface portion in a posture such that the ground plate faces the outer surface portion.

5. The positioning system according to according to claim 4, wherein the ground plate of the antenna includes:
a symmetry maintain portion with a rectangular shape, the symmetry main portion configured to be disposed concentrically with the opposing conductive plate; and
an asymmetric portion configured to be disposed at a lateral side of the symmetry maintain portion,
wherein the symmetry maintain portion and the asymmetric portion are connected through a switch, and
wherein the vehicle exterior communication device is further configured to be operated in the first mode in a condition that the switch is turned off, and to be operated in the second mode in a condition that the switch is turned on.

6. The position system according to claim 4,
wherein the short-circuit portion in the antenna is further configured to be disposed at a position deviated from a center of the opposing conductive plate with a predetermined distance.

7. The position system according to claim 3,
wherein the antenna includes:
a ground plate made of a conductor with a flat plate shape;
an opposing conductive plate made of another conductor with a flat plate shape and having a feeder point electrically connected to a feeder line, and configured to be disposed to space apart from the ground plate with a predetermined distance; and
a short-circuit portion configured to be disposed at a central region of the opposing conductive plate and electrically connect the opposing conductive plate and the ground plate,
wherein the opposing conductive plate is shaped to be linearly symmetrical with respect to each of two straight lines orthogonal to each other,
wherein an electrical length of the opposing conductive plate in a direction parallel to a first axis of symmetry being one of the two straight lines included in the opposing conductive plate is a half of a wavelength of the radio wave at the predetermined second frequency,
wherein the feeder point is located at a straight line parallel to the first axis of symmetry through a center of the opposing conductive plate,
wherein the antenna is configured to generate parallel resonance in the predetermined first frequency by adopting an electrostatic capacitance between the opposing conductive plate and the ground plate and an inductance in the short-circuit portion, and
wherein the vehicle exterior communication device is further configured to be attached at the outer surface portion in a posture such that the ground plate faces the outer surface portion.

8. The positioning system according to claim 7,
wherein, in the vehicle exterior communication device, the antenna is connected to a transceiver through an impedance variable element configured to change at least one of an electrostatic capacitance or an inductance, the positioning system further comprising:
an operation mode switching unit configured to change the operation mode of the vehicle exterior communication device by changing at least one of the electrostatic capacitance or the inductance of the impedance variable element, and wherein the positioning device is further configured to:
operate the vehicle exterior communication device in the first mode in collaboration with the operation mode switching unit, based on a condition that the positioning device determines whether or not the portable terminal exists at the exterior operating area; and
operate the vehicle exterior communication device in the second mode in collaboration with the operation mode switching unit, based on a condition that the positioning device determines whether or not the portable terminal exists in the vehicle compartment.

9. The positioning system according to claim 7,
wherein the opposing conductive plate has a first feeder point for transmitting and receiving a signal at the predetermined first frequency and a second feeder point being the feeder point for transmitting and receiving a signal at the predetermined second frequency,
wherein the second feeder point is disposed on a straight line parallel to the first axis of symmetry through the center of the opposing conductive plate, and
wherein the vehicle exterior communication device is further configured to:
determine whether or not the portable terminal exists at the exterior operating area by adopting a reception strength of the wireless signal from the portable terminal acquired through the first feeder point; and
determine whether or not the portable terminal exists in the vehicle compartment by adopting a reception strength of the wireless signal from the portable terminal acquired through the second feeder point.

10. The positioning system according to claim 3, further comprising:
a vehicle interior communication device configured to be disposed inside the vehicle compartment of the vehicle, and further configured to receive the wireless signal and detect a reception strength of the wireless signal received by the vehicle interior communication device,
wherein the vehicle exterior communication device further includes a strength detector configured to detect a reception strength of the wireless signal received by the antenna, and
wherein the positioning device is further configured to:
determine that the portable terminal exists at the exterior operating area, based on a condition that the reception strength of the wireless signal at the predetermined first frequency detected by the vehicle exterior communication device is equal to or larger than a predetermined operating threshold value; and
determine that the portable terminal exists in the vehicle compartment, based on a condition that the reception strength of the wireless signal at the predetermined second frequency detected by the vehicle interior communication device is larger than the reception strength of the wireless signal at the predetermined second frequency detected by the vehicle exterior communication device with a predetermined threshold value or more.

11. The positioning system according to claim 3, further comprising:
- a vehicle interior communication device configured to be disposed inside the vehicle compartment of the vehicle, and further configured to receive the wireless signal and detect a reception strength of the wireless signal received by the vehicle interior communication device,
- wherein the vehicle exterior communication device further includes a strength detector configured to detect a reception strength of the wireless signal received by the antenna, and
- wherein the positioning device is further configured to:
  - determine that the portable terminal exists at the exterior operating area, based on a condition that the reception strength of the wireless signal at the predetermined first frequency detected by the vehicle exterior communication device is equal to or larger than a predetermined operating threshold value; and
  - determine that the portable terminal exists inside the vehicle compartment, based on a condition that the reception strength of the wireless signal at the predetermined second frequency detected by the vehicle interior communication device is larger than or equal to a predetermined interior corresponding value.

12. The positioning system according to claim 1, wherein the vehicle exterior communication device is further configured to be disposed at a window frame portion of a side window of the vehicle.

13. A positioning system comprising:
- a vehicle exterior communication device configured to be disposed at an outer surface portion of a vehicle being at least one of a side surface portion of the vehicle or a rear side surface portion of the vehicle, and including an antenna configured to receive a wireless signal transmitted from a portable terminal, the wireless signal being a radio wave of 1 GHz or higher; and
- a processor and a memory that stores instructions configured to, when executed by the processor, cause the processor to determine a position of the portable terminal, based on a reception status of the wireless signal received by the vehicle exterior communication device from the portable terminal,
- wherein the vehicle exterior communication device includes an operation mode having a first mode and a second mode,
- wherein, in the first mode of the operation mode, a linearly polarized wave whose electrical field vibration direction is perpendicular to the outer surface portion is radiated toward a direction parallel to the outer surface portion at which the vehicle exterior communication device is attached,
- wherein, in the second mode of the operation mode, a linearly polarized wave whose electrical field vibration direction is parallel to the outer surface portion is radiated,
- wherein the instructions are configured to, when executed by the processor, further cause the processor to:
  - determine whether or not the portable terminal exists at an exterior operating area being a region outside a vehicle compartment within a predetermined operating distance from the vehicle, based on the reception status of the wireless signal received by the vehicle exterior communication device from the portable terminal in the first mode of the operation mode; and
  - determine whether or not the portable terminal exists inside the vehicle compartment, based on the reception status of the wireless signal received by the vehicle exterior communication device from the portable terminal in the second mode of the operation mode.

* * * * *